US009385784B2

(12) United States Patent
Kim et al.

(10) Patent No.: US 9,385,784 B2
(45) Date of Patent: Jul. 5, 2016

(54) MOBILE TERMINAL, HOME APPLIANCE AND METHOD FOR OPERATING THE SAME

(71) Applicant: LG ELECTRONICS INC., Seoul (KR)

(72) Inventors: Yanghwan Kim, Changwon-si (KR); Chulgon Tak, Changwon-si (KR); Chansung Jeon, Changwon-si (KR); Hyoungjun Park, Changwon-si (KR); Jongmi Choi, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 14/029,091

(22) Filed: Sep. 17, 2013

(65) Prior Publication Data

US 2014/0087660 A1 Mar. 27, 2014

(30) Foreign Application Priority Data

Sep. 24, 2012 (KR) ........................ 10-2012-0106031
Jan. 3, 2013 (KR) ........................ 10-2013-0000710
Jan. 7, 2013 (KR) ........................ 10-2013-0001761
Jan. 7, 2013 (KR) ........................ 10-2013-0001837

(51) Int. Cl.
*H04L 12/28* (2006.01)
*H04B 5/00* (2006.01)

(52) U.S. Cl.
CPC ............ *H04B 5/0025* (2013.01); *H04L 12/282* (2013.01); *H04L 12/2803* (2013.01); *H04L 12/2827* (2013.01); *H04L 2012/285* (2013.01); *H04L 2012/2841* (2013.01)

(58) Field of Classification Search
CPC .... H04B 5/0025; H04B 5/02; H04L 12/2803; H04L 12/282; H04L 12/2827; H04L 12/2642; H04L 12/2807
See application file for complete search history.

(56) References Cited

U.S. PATENT DOCUMENTS 6,108,693 A * 8/2000 Tamura ........................ 709/213
2002/0073183 A1 6/2002 Yoon et al.
2007/0152048 A1* 7/2007 Jung et al. .................... 235/385
2009/0262710 A1* 10/2009 Doi .................... H04W 56/001 370/336
2013/0052946 A1* 2/2013 Chatterjee et al. ........... 455/41.1
2013/0069794 A1* 3/2013 Terwilliger et al. ...... 340/815.45
2013/0203346 A1* 8/2013 Han ............................ 455/41.1
2014/0087661 A1* 3/2014 Kim et al. .................... 455/41.1
2014/0106672 A1* 4/2014 Jeon et al. .................... 455/41.1
2014/0279479 A1* 9/2014 Maniar et al. .................. 705/41
2015/0182088 A1* 7/2015 Kim ...................... A47L 9/2894 15/319

FOREIGN PATENT DOCUMENTS

CN 1343806 4/2002
CN 101814227 8/2010
CN 102449915 5/2012

* cited by examiner

*Primary Examiner* — Andrew Wendell
(74) *Attorney, Agent, or Firm* — Dentons US LLP

(57) ABSTRACT

A mobile terminal, a home appliance and a method for operating the same are disclosed. The mobile terminal includes a display configured to display a predetermined screen, a near field communication (NFC) module configured to transmit or receive information related to the screen to or from a home appliance by tagging to the home appliance, and a controller configured to control display of the information received from the home appliance on the display. Accordingly, it is possible to transmit information between the home appliance and the mobile terminal via NFC.

22 Claims, 63 Drawing Sheets

270
CONTROLLER
Read(B2)
262
Read(B3)
263
261
260
FIRST MEMORY REGION
SECOND MEMORY REGION
THIRD MEMORY REGION
217
200
211
MODULE RECOGNIZER
Read(B1)
Write(A)
617
FIRST COMMUNICATION MODULE
600
680
TERMINAL CONTROLLER

MOBILE TERMINAL, HOME APPLIANCE AND METHOD FOR OPERATING THE SAME

CROSS-REFERENCE TO RELATED APPLICATION

This application claims the priority benefit of Korean Patent Application Nos. 10-2012-0106031, filed on Sep. 24, 2012, 10-2013-0001761, filed on Jan. 7, 2013, 10-2013-0000710, filed on Jan. 3, 2013 and 10-2013-0001837, filed on Jan. 7, 2013, the disclosure of which is incorporated herein by reference.

BACKGROUND OF THE INVENTION

1. Field of the Invention

The present invention relates to a mobile terminal, a home appliance and a method for operating the same, and more particularly to a mobile terminal, a home appliance and a method for operating the same, which are capable of transmitting information between the home appliance and the mobile terminal via near-field communication (NFC).

2. Description of the Related Art

Among home appliances provided in a building, a refrigerator stores food, a laundry processing machine processes laundry, an air conditioner adjusts indoor temperature, and a cooker cooks food.

As various communication methods have been developed, a variety of research in hopes of increasing user convenience in terms of communication with a home appliance has been conducted.

SUMMARY OF THE INVENTION

Therefore, the present invention has been made in view of the above problems, and it is an object of the present invention to provide a mobile terminal, a home appliance and a method for operating the same, which are capable of transmitting information between the home appliance and the mobile terminal via near-field communication (NFC).

Another object of the present invention is to provide a mobile terminal, a home appliance and a method for operating the same, which are capable of selectively transmitting information between the home appliance and the mobile terminal via NFC.

Another object of the present invention is to provide a home appliance controllable using a mobile terminal.

In accordance with an aspect of the present invention, the above and other objects can be accomplished by the provision of a mobile terminal including display for displaying a predetermined screen, a near field communication (NFC) module configured to transmit or receive information related to the screen to or from a home appliance by tagging to the home appliance, and a controller configured to control display of the information received from the home appliance on the display. Accordingly, it is possible to transmit information between the home appliance and the mobile terminal via NFC In accordance with another aspect of the present invention, there is provided a home appliance including a driving unit, a near field communication (NFC) module configured to transmit stored information to a mobile terminal or receive information related to a screen displayed on the mobile terminal, if the mobile terminal is tagged, and a controller configured to control the driving unit according to the received information.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

The terms "module" and "unit" used in description of components are used herein to aid in the understanding of the components and thus should not be misconstrued as having specific meanings or roles. Accordingly, the terms "module" and "unit" may be used interchangeably.

Figure 1:
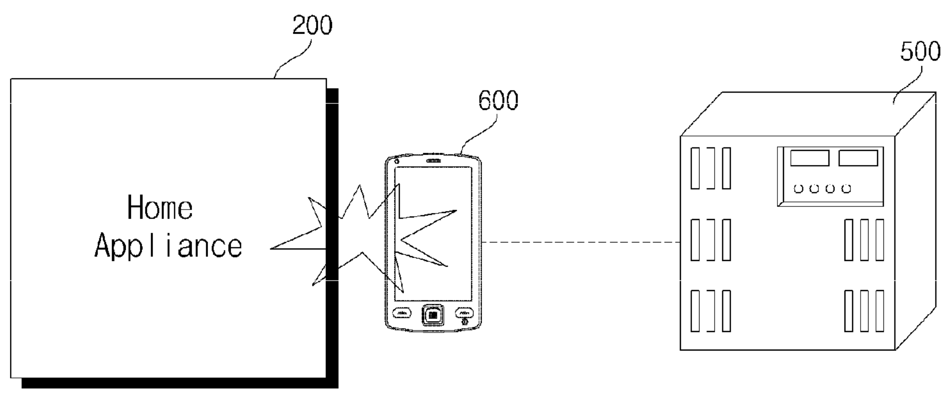
FIG. 1 is a diagram showing an example of a communication system according to an embodiment of the present invention.

FIG. 1 is a diagram showing an example of a communication system according to an embodiment of the present invention.

Referring to FIG. 1, the communication system 10 according to the embodiment of the present invention may include a home appliance 200, a mobile terminal 600 and a server 500.

In particular, in the embodiment of the present invention, the home appliance 200 and the mobile terminal 600 may perform near field communication (NFC).

The mobile terminal 600 may transmit information related to a screen displayed on the mobile terminal 600 via NFC when being tagged to the home appliance 200. Thus, the mobile terminal 600 can transmit information to the home appliance 200, thereby increasing user convenience.

For example, if the screen displayed on the mobile terminal 600 is a power information screen related to the home appliance, the mobile terminal 600 may transmit power information related to the home appliance to the home appliance 200.

As another example, if the screen displayed on the mobile terminal 600 is a recipe screen related to the home appliance, the mobile terminal 600 may transmit recipe information to the home appliance 200.

As another example, if the screen displayed on the mobile terminal 600 is an operation course screen or operation course list screen related to the home appliance, the mobile terminal 600 may transmit operation course information or operation course list information related to the home appliance to the home appliance 200.

As another example, if the screen displayed on the mobile terminal 600 is a firmware screen related to the home appliance, the mobile terminal 600 may transmit firmware information related to the home appliance to the home appliance 200.

As another example, if the screen displayed on the mobile terminal 600 is an access point device list screen, the mobile terminal 600 may transmit network information of an access point device to the home appliance 200.

If the mobile terminal 600 is tagged to the home appliance 200, the mobile terminal 600 may receive information pre-stored in the home appliance 200 from the home appliance 200 via NFC. Thus, the mobile terminal can conveniently receive related information from the home appliance 200, thereby increasing user convenience.

In another embodiment of the present invention, if the mobile terminal 600 is tagged to the home appliance 200 in a state in which a security level of screen related data is a first level, the mobile terminal 600 may transmit information related to the screen displayed on the mobile terminal 600 to the home appliance 200.

If the mobile terminal 600 is tagged to the home appliance 200 in a state in which a security level of screen related data is a second level, the mobile terminal 600 may transmit information related to the screen displayed on the mobile terminal 600 and security information to the home appliance 200.

In particular, the mobile terminal 600 transmits security information to the home appliance 200 based on tagging to the home appliance 200. If authentication information corresponding to the security information is received from the home appliance 200, the mobile terminal transmits screen related information to the home appliance 200 in response to authentication information reception and, if authentication information corresponding to the security information is not received from the home appliance 200, the mobile terminal does not transmit screen related information to the home appliance. Accordingly, the screen related information can be selectively transmitted according to authentication information reception.

Therefore, related information can be conveniently and selectively transmitted to the home appliance 200 to increase user convenience.

According to another embodiment of the present invention, if the mobile terminal 600 is tagged to the home appliance 200 in a state in which a display screen is an information transmission request related screen and a security level of screen related data is a first level, the mobile terminal receives the screen related information from the home appliance 200 via NFC. If the mobile terminal 600 is tagged to the home appliance 200 in a state in which a display screen is an information transmission request related screen and a security level of screen related data is a second level, the mobile terminal receives the screen related information and security information from the home appliance 200 via NFC such that information is selectively transmitted between the home appliance 200 and the mobile terminal 600 via NFC. Therefore, related information can be conveniently and selectively received from the home appliance 200 to increase user convenience.

According to another embodiment of the present invention, the home appliance 200 receives a request for transmission of information related to the screen displayed on the mobile terminal 600 based on tagging of the mobile terminal 600, transmits screen related information to the mobile terminal 600 if the security level of the screen related information is a first level and transmits screen related information and security information to the mobile terminal 600 if the security level of the screen related information is a second level. Thus, information can be selectively transmitted between the home appliance 200 and the mobile terminal 600.

Upon the request for transmission of the information related to the screen received from the mobile terminal 600, if the screen related information is remote control information, the home appliance 200 determines that the security level of the screen related information is a first level and, if the screen related information is failure diagnosis information, the home appliance determines that the security level of the screen related information is a second level.

That is, upon the request for transmission of the information related to the screen received from the mobile terminal 600, if the screen related information is remote control information, the home appliance 200 transmits remote control information to the mobile terminal 600 without security information and, if the screen related information is failure diagnosis information, the home appliance transmits failure diagnosis related information and security information to the mobile terminal 600. Thus, information can be selectively transmitted between the home appliance 200 and the mobile terminal 600.

The home appliance 200 may frequently store home appliance related information, for example, operation state information, operation history information, product information, failure information, power consumption information, stored article information or recipe information of the home appliance. In particular, this information may be stored in a memory 218 of an NFC module 217.

Here, the operation state information may include operation period information, current operation time information, remaining operation time information, current operation type information, etc. if the home appliance currently operates.

The operation history information may include operation history information of the home appliance for a specific period of time For example, the operation history information may include door open/close information of a refrigerator 200*a*, frequently used course operation information when a washing machine 200*b* operates, water use information when the washing machine 200*b* operates, information about the number of times of air conditioning, air-conditioning temperature setting information and information about the number of times of cleaning of an air conditioner 200*c*, frequently used course operation information and frequent cooking time operation information of a cooker 200*d*, information about the number of times of cleaning, cleaning time information and cleaning course information of a cleaner 200*e*, etc.

The product information may include product type information (a refrigerator, a washing machine, etc.), product manufacture date information, product serial number, and type/version information of firmware installed in a product of the home appliance.

The failure information may include information about a part which does not operate upon failure, failure time information, operation information upon failure, etc., if the home appliance has failed.

The power consumption information may include consumed power information, cost information based on consumed power, etc.

The stored article information may include type information of food stored in the refrigerator 200*a*, location information of the stored food, information about the amount of food, food expiration date information, food storage date information, etc. if the home appliance is a refrigerator 200*a*. The recipe information may be recipe information of cooking using types of food stored in the refrigerator if the home appliance is a refrigerator 200*a*. Alternatively, if the home appliance is a cooker 200*d*, the recipe information may be recipe information regarding cooking using the cooker.

The mobile terminal 600 may display the information received from the home appliance 200. Thus, a user may easily confirm the received information.

The mobile terminal 600 may transmit the information received from the home appliance 200 to the server 500 and receive a transmission result. Accordingly, it is possible to simply manage the home appliance 200 using the mobile terminal 600.

For example, if the information received from the home appliance 200 is failure information, the mobile terminal 600 may transmit failure information to the server 500 and receive failure result information from the server 500.

As another example, if the information received from the home appliance 200 is product information, the mobile terminal 600 may transmit the product information to the server 500 and receive product result information from the server 500.

As another example, if the information received from the home appliance 200 is power consumption information, the mobile terminal 600 may transmit the power consumption information to the server 500 and receive power-saving operation information or power information from the server 500. The power information may include power price information, on peak time power information, off peak time power information and real-time power information.

The home appliance is an electronic device used by a user and may include a refrigerator 200*a*, a washing machine 200*b*, an air conditioner 200*c*, a cooker 200*d*, a cleaner 200*e*, etc., for example. The home appliance may further include a TV, etc.

The mobile terminal 600 may include a mobile phone, a smartphone, a laptop, a tablet PC, etc.

FIGS. 2*a* to 2*e* are diagrams illustrating various examples of near field communication (NFC) between a mobile terminal and a home appliance.

Figure 2A:
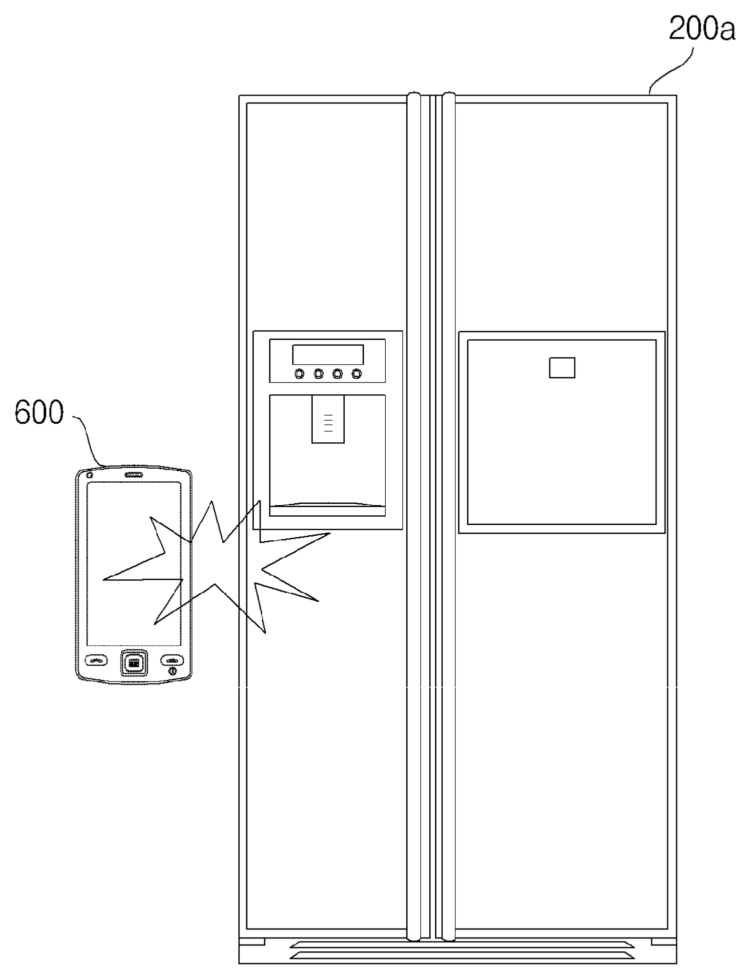
FIG. 2*a* is a diagram illustrating various examples of near field communication (NFC) between a mobile terminal and a home appliance.
Figure 2B:
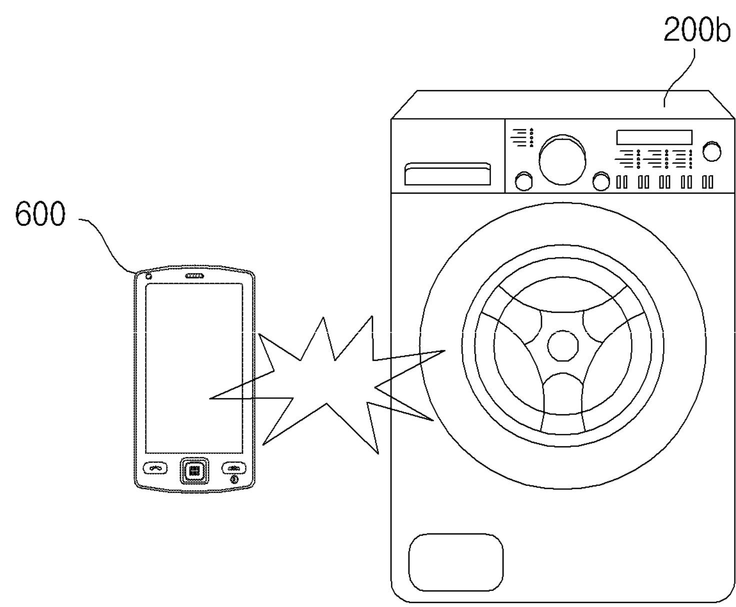
FIG. 2*b* is a diagram illustrating various examples of near field communication (NFC) between a mobile terminal and a home appliance.
Figure 2C:
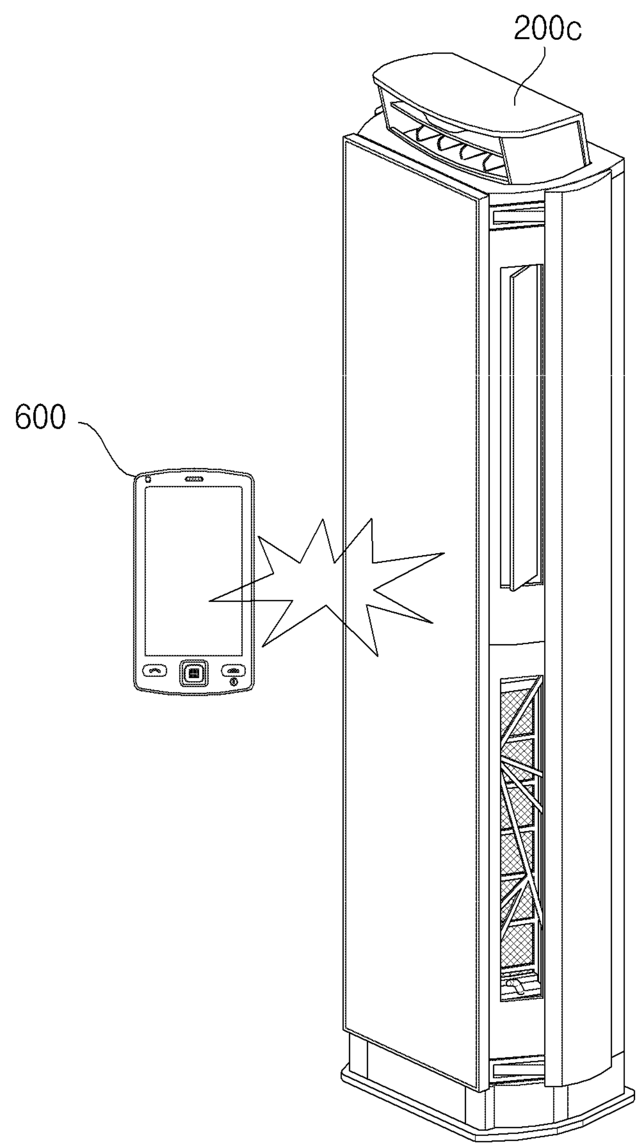
FIG. 2*c* is a diagram illustrating various examples of near field communication (NFC) between a mobile terminal and a home appliance.
Figure 2D:
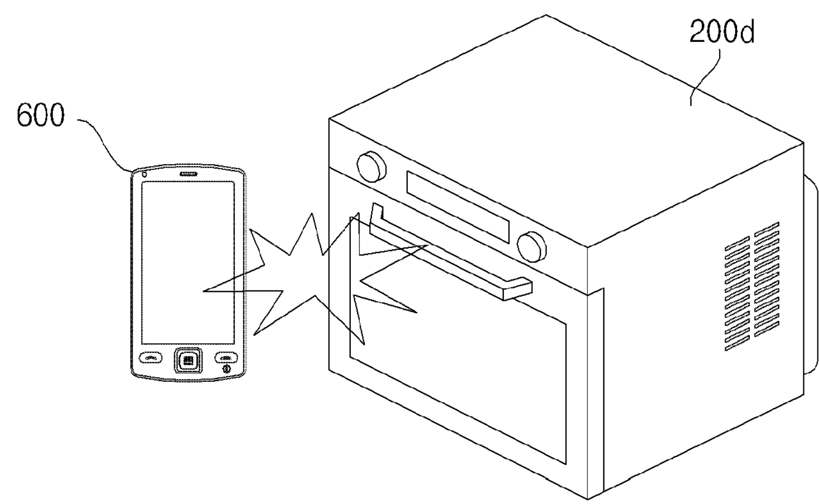
FIG. 2*d* is a diagram illustrating various examples of near field communication (NFC) between a mobile terminal and a home appliance.
Figure 2E:
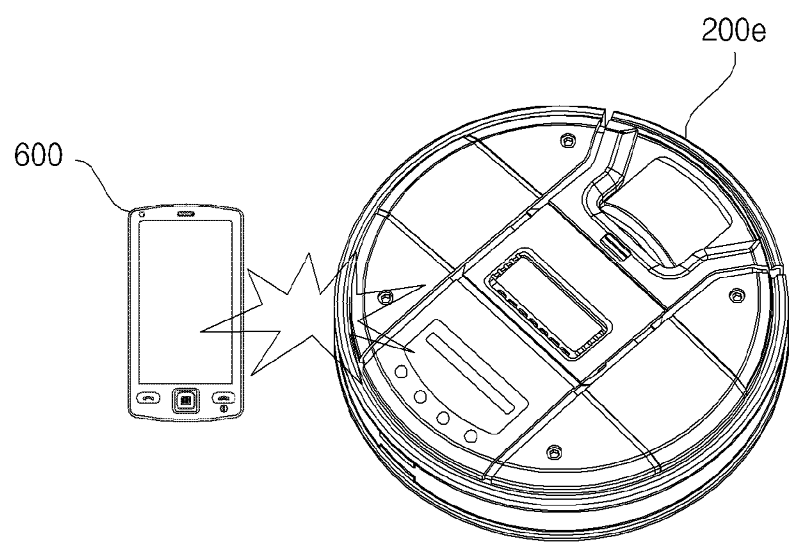
FIG. 2*e* is a diagram illustrating various examples of near field communication (NFC) between a mobile terminal and a home appliance.

FIG. 2*a* shows NFC performed between the mobile terminal 600 and the refrigerator 200*a*, FIG. 2*b* shows NFC performed between the mobile terminal 600 and the washing machine 200*b*, FIG. 2*c* shows NFC performed between the mobile terminal 600 and the air conditioner 200*c*, FIG. 2*d* shows NFC performed between the mobile terminal 600 and the cooker 200*d*, and FIG. 2*e* shows NFC performed between the mobile terminal 600 and the cleaner 200*e*.

Figure 3A:
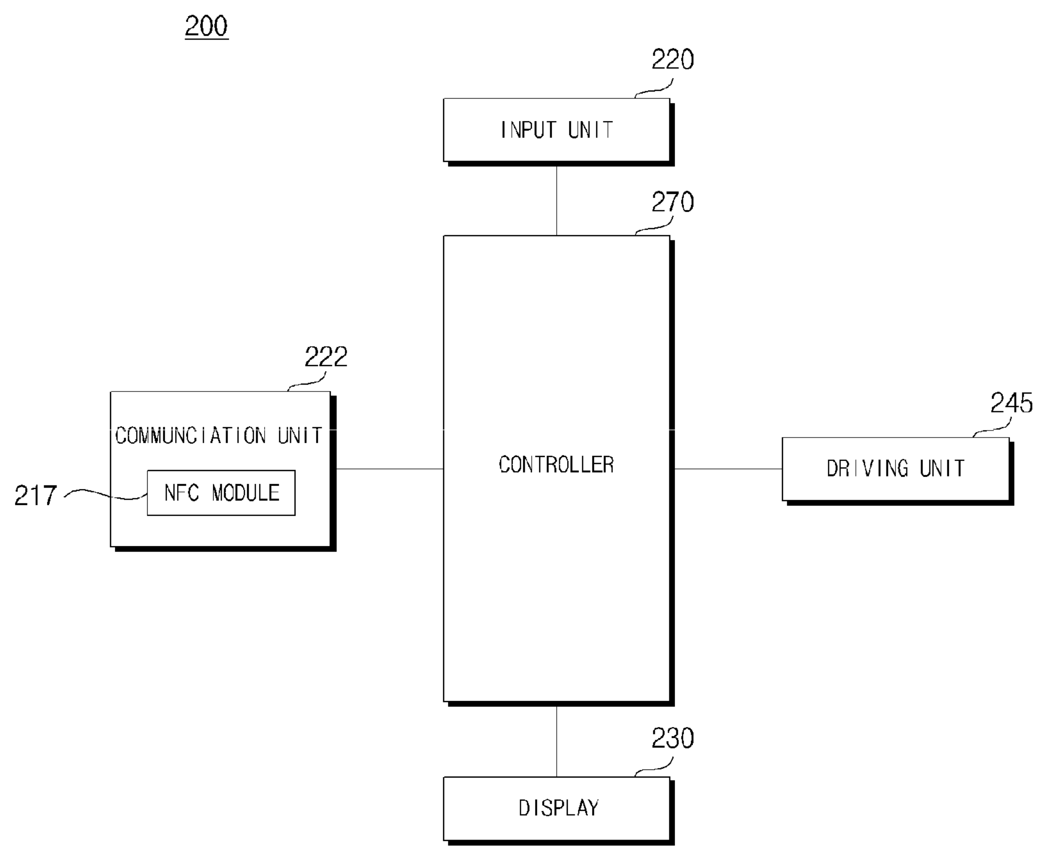
FIG. 3*a* is a block diagram showing the internal configuration of an example of a home appliance of FIG. 1.

FIG. 3*a* is a block diagram showing the internal configuration of an example of a home appliance of FIG. 1.

Referring to FIG. 3*a*, the home appliance 200 may include an input unit 220 for user input, a display 230 for displaying an operation state of the home appliance, a communication unit 222 for communication with another external device, a driving unit 245 for driving the home appliance and a controller 270 for internal control.

For example, if the home appliance is a refrigerator, the driving unit 245 may include a refrigerating compartment driving unit and a freezer compartment driving unit.

As another example, if the home appliance is a washing machine, the driving unit 245 may include a driving unit for driving a drum or a tub.

As another example, if the home appliance is an air conditioner, the driving unit 245 may include a compressor driving unit in an outdoor unit, a fan driving unit of the outdoor unit, and a fan driving unit of an indoor unit.

As another example, if the home appliance is a cooker, the driving unit 245 may include a microwave driving unit for outputting microwaves into a cavity.

As another example, if the home appliance is a cleaner, the driving unit 245 may include a fan motor driving unit.

The communication unit 222 may include at least an NFC module 217 capable of performing NFC.

Figure 3B:
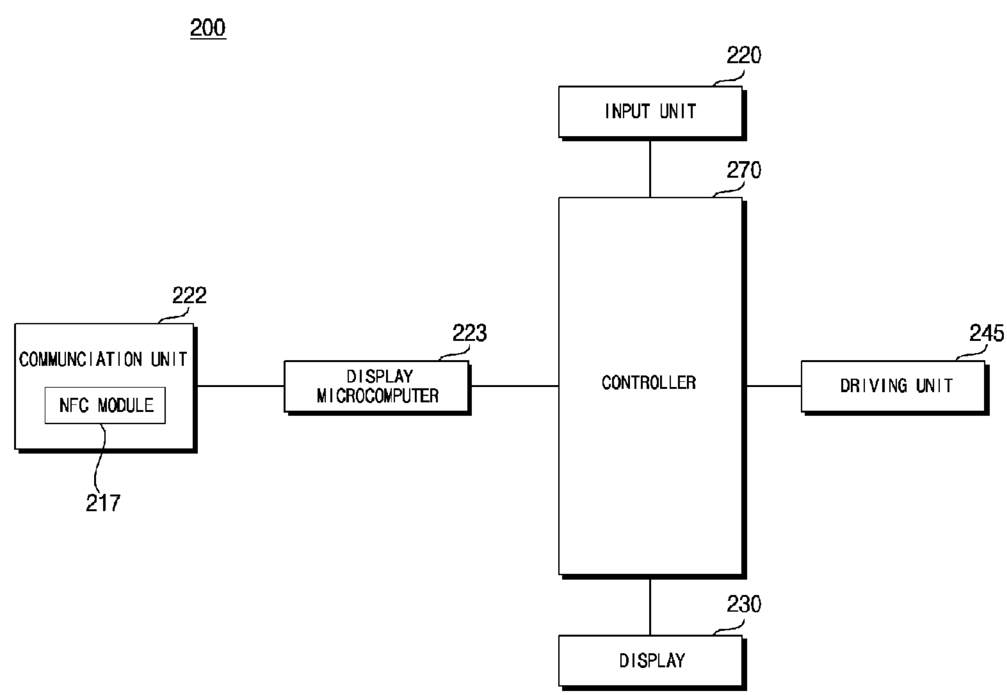
FIG. 3*b* is a block diagram showing the internal configuration of another example of a home appliance of FIG. 1.

FIG. 3*b* is a block diagram showing the internal configuration of another example of a home appliance of FIG. 1.

The home appliance shown in FIG. 3*b* is different from the home appliance shown in FIG. 3*a* in that a display microcomputer 223 is further included.

If the home appliance includes the display 230, the display microcomputer 223 for controlling the display 230 may be included. At this time, the controller 270 is a main microcomputer and may be provided on a circuit board separately from the display microcomputer 223.

In the embodiment of the present invention, if the home appliance includes the NFC module 712 capable of performing NFC, the communication unit 222 and, more particularly the NFC module 217 may be provided on the same circuit board as the display microcomputer 223, for NFC. As shown in FIG. 3*b*, the NFC module 217 is primarily controlled by the display microcomputer 223 and then is controlled by the controller 270, that is, the main microcomputer 270.

Figure 4:
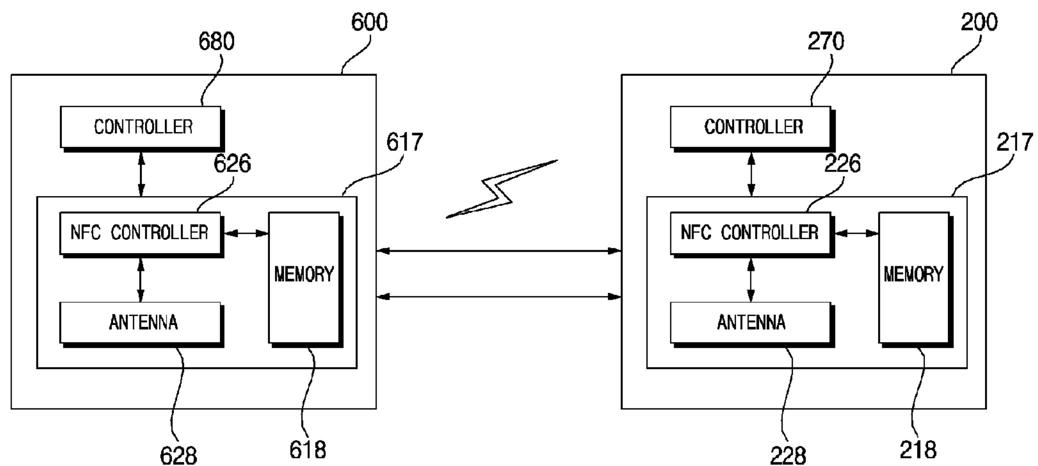
FIG. 4 is a view referred to for describing NFC of FIG. 1.

FIG. 4 is a view referred to for describing NFC of FIG. 1.

Referring to FIG. 4, the mobile terminal 600 and the home appliance 200 may transmit or receive data using an NFC method.

For data transmission or reception, the mobile terminal 600 may include an NFC module 217 including an NFC memory 617, an NFC controller 626 and an antenna 628.

The home appliance 200 may include an NFC module 225 including an NFC memory 218, an NFC controller 226 and an antenna 228.

For example, if a user places the mobile terminal 600 close to the home appliance 200 within a predetermined distance, that is, if tagging is performed, a magnetic field is provided. By change in magnetic field, the mobile terminal 600 may receive related information, e.g., state information or product information from the home appliance 200.

Such information exchange between the mobile terminal 600 and the home appliance 200 may be performed in a read/write mode or peer-to-peer mode among a card emulation (CE) mode, read/write mode and peer-to-peer mode of NFC.

Although an active NFC module including the NFC controller and the antenna is shown in the figure, a passive NFC module including a tag NFC memory and an antenna may be used. Hereinafter, the active NFC module will be focused upon.

For example, if a user places the mobile terminal 600 close to the home appliance 200 within a predetermined distance, that is, if tagging is performed, a magnetic field is provided. By change in magnetic field, the mobile terminal 600 may transmit information related to the screen displayed on the mobile terminal 600 to the home appliance 200.

More specifically, if the mobile terminal 600 is tagged to the home appliance 200, the antenna 628 of the NFC module 617 of the mobile terminal 600 receives product information from the antenna 228 of the NFC module 217 of the home appliance 200.

If the received product information matches predetermined product information, the controller 226 of the NFC module 617 of the mobile terminal 600 controls writing of the information related to the screen displayed on the mobile terminal 600 in the NFC memory 218 of the NFC module 217 of the home appliance 200. Thus, the information related to the screen displayed on the mobile terminal 600 is written in the NFC memory 218 of the NFC module 217 of the home appliance.

If predetermined information is written in the NFC memory 218 of the NFC module 217 of the home appliance 200, the NFC controller 227 of the home appliance may inform the controller 270 of the home appliance that the information has been received. For example, a reception flag is changed from “0” to “1” to inform the controller 270 of the home appliance that the information related to the screen displayed on the mobile terminal 600 has been received.

As another example, if a user places the mobile terminal 600 close to the home appliance 200 within a predetermined distance, that is, if tagging is performed, a magnetic field is provided. By change in magnetic field, the mobile terminal 600 may receive information pre-stored in the home appliance 200.

The controller 270 of the home appliance 200 or the NFC controller 226 of the NFC module 217 may control frequent storage of the related information, e.g., state information or product information, of the home appliance in the NFC memory 218 of the NFC module 217 in a power on state.

More specifically, if the mobile terminal 600 is tagged to the home appliance 200, the antenna 628 of the NFC module 617 of the mobile terminal 600 receives product information from the antenna 228 of the NFC module 217 of the home appliance 200.

If the received product information matches predetermined product information, the controller 226 of the NFC module 617 of the mobile terminal 600 controls reading of the information stored in the NFC memory 218 from the NFC module 217 of the home appliance 200. Thus, the NFC module 617 of the mobile terminal 600 can simply receive the information written in the home appliance 200.

If predetermined information is written in the NFC memory 618 of the NFC module 617 of the mobile terminal 600, the NFC controller 626 of the mobile terminal 600 may inform the controller 680 of the mobile terminal 600 that the information has been received. For example, a reception flag is changed from “0” to “1” to inform the controller 680 of the mobile terminal 600 that the information related to the home appliance 200 has been received.

The controller 670 of the mobile terminal 600 may control reception of the information related to the home appliance 200 and transmission of the received information to the server 500.

Figure 5:
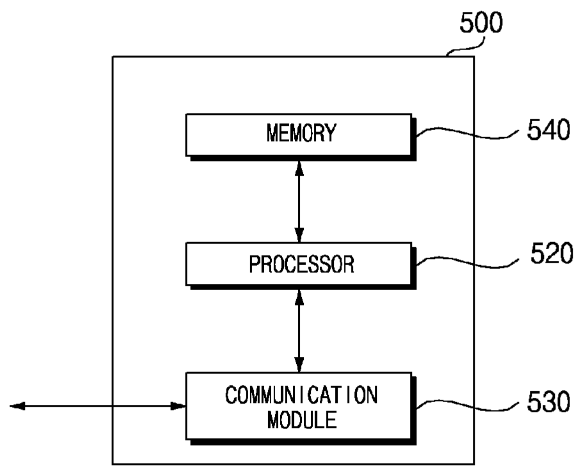
FIG. 5 is a block diagram showing the internal configuration of a server of FIG. 1.

FIG. 5 is a block diagram showing the internal configuration of a server of FIG. 1.

Referring to FIG. 5, the server 500 may include a communication module 530, a memory 540 and a processor 520.

The communication module 530 may receive home appliance related information from the mobile terminal 600. The communication module 530 may transmit result information corresponding to the received home appliance related information to the mobile terminal 600.

The communication module 530 may include an Internet module or a mobile communication module.

The memory 540 may store the received home appliance related information and include data for generating result information corresponding to the home appliance related information.

For example, if the home appliance related information is failure information of the home appliance, the memory 540 may store data for failure diagnosis of the home appliance.

As another example, if the home appliance related information is product information of the home appliance, the memory 540 may store the received product information for product registration of the home application.

As another example, if the home appliance related information is power consumption information of the home appliance, the memory 540 may store power price information, on peak time power information, off peak time power information, real-time power information, etc.

The processor 520 may perform overall control of the server 500.

If the home appliance related information is received from the mobile terminal 600, the processor 520 may control generation of result information corresponding to the home appliance related information. The generated result information may be controlled for transmission to the mobile terminal 600.

For example, if the home appliance related information is failure information of the home appliance, the processor 520 may generate failure diagnosis result information of the home appliance using failure diagnosis data stored in the memory 540.

As another example, if the home appliance related information is product information of the home appliance, the processor 520 may generate product registration result information of the home appliance.

As another example, if the home appliance related information is power consumption information of the home appliance, the processor 520 may control transmission of power information, such as power price information, on peak time power information, off peak time power information, real-time power information, etc. stored in the memory 540, to the mobile terminal 600.

The server 500 may be managed by a manufacturer of the home appliance 200 or an operator of an application store related to the home appliance 200.

Figure 6:
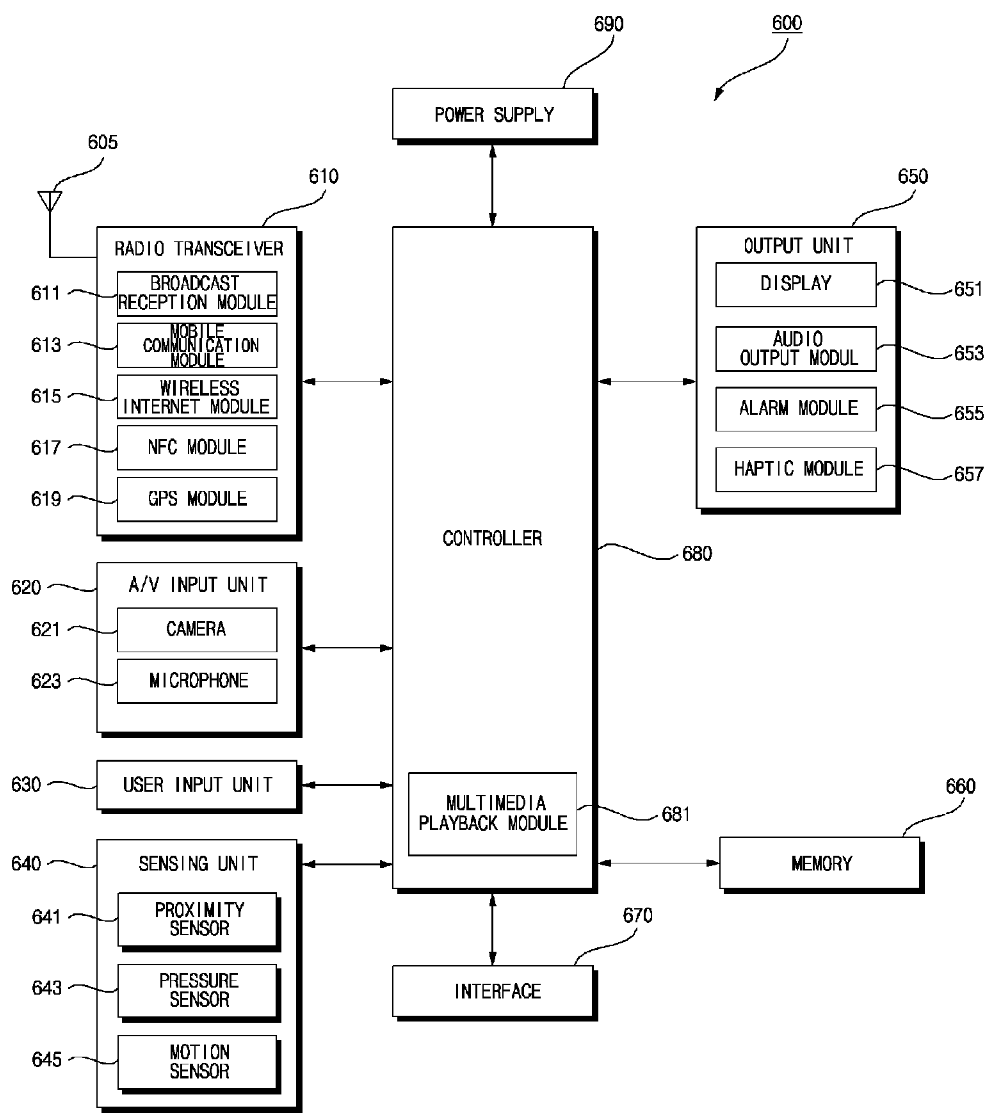
FIG. 6 is a block diagram showing the internal configuration of a mobile terminal of FIG. 1.

FIG. 6 is a block diagram showing the internal configuration of a mobile terminal of FIG. 1.

Referring to FIG. 6, the mobile terminal 600 may include a radio transceiver 610, an audio/video (A/V) input unit 620, a user input unit 630, a sensing unit 640, an output unit 650, a memory 660, an interface 670, a controller 680 and a power supply 690.

The radio transceiver 610 may include a broadcast reception module 611, a mobile communication module 613, a wireless Internet module 615, a near field communication (NFC) module 617, a global positioning system (GPS) module 619, etc.

The broadcast reception module 611 may receive at least one of a broadcast signal and broadcast-related information from an external broadcast management server through a broadcast channel. The broadcast channel may include a satellite channel and a terrestrial channel.

The broadcast signal and/or the broadcast-related information received through the broadcast reception module 611 may be stored in the memory 660.

The mobile communication module 613 transmits or receives a wireless signal to or from at least one of a base station, an external terminal and a server over a mobile communication network. The wireless signal may include a voice call signal, a video call signal or various types of data associated with transmission and reception of a text/multimedia message.

The wireless Internet module 615 is an internal or external module for wireless Internet access which may be provided to the mobile terminal 600. For example, the wireless Internet module 615 may perform Wi-Fi based wireless communication or Wi-Fi Direct based wireless communication.

The NFC module 617 may perform NFC. The NFC module 617 may receive data from the home appliance or transmit data to the home appliance, if approaching the home appliance having an NFC tag or an NFC module within a predetermined distance, that is, upon tagging.

As short-range wireless communication technology, Bluetooth, Radio-Frequency IDentification (RFID), Infrared Data Association (IrDA), Ultra WideBand (UWB), and ZigBee may be used.

The GPS module 619 may receive position information from a plurality of GPS satellites.

The A/V input unit 620 receives an audio signal or a video signal and may include a camera 621 and a microphone 623.

The user input unit 630 generates key input data enabling the user to control the operation of the mobile terminal. The user input unit 630 may include a keypad, a dome switch, a touchpad (static pressure/static electrical), etc. In particular, if the touchpad and the display 651 have a layered structure, this may be called a touchscreen.

The sensing unit 640 detects a current state of the mobile terminal 600 such as whether the mobile terminal 600 is opened or closed, the position of the mobile terminal 600 and contact/non-contact of a user and generates a sensing signal for controlling the operation of the mobile terminal 600.

The sensing unit 640 may include a proximity sensor 641, a pressure sensor 643 and a motion sensor 645. The motion sensor 645 may sense motion or position of the mobile terminal 600 using an acceleration sensor, a gyroscopic sensor and a gravity sensor. In particular, the gyroscopic sensor measures an angular speed and senses a direction (angle) in which the mobile terminal rotates from a reference direction.

The output unit 650 may include a display 651, an audio output module 653, an alarm unit 655 and a haptic module 657.

The display 651 displays information processed by the mobile terminal 600.

As described above, if the display 651 and the touchpad have the layered structure to configure the touchscreen, the display 651 can be used not only as an output device but also as an input device for inputting information via user touch.

The audio output module 653 may output audio data received from the radio transceiver 610 or stored in the memory 660. The audio output module 653 may include a speaker, a buzzer, etc.

The alarm unit 655 outputs a signal notifying the user that an event has occurred in the mobile terminal 600. For example, the alarm unit 655 may output a signal in the form of vibrations.

The haptic module 657 generates a variety of tactile effects that the user can feel. A typical example of the tactile effect generated by the haptic module 657 is vibration.

The memory 660 may store a program for processing and control of the controller 680 and may temporarily store input or output data (for example, a phonebook, messages, audio, still images, and moving images).

The interface 670 serves as an interface with all external devices connected to the mobile terminal 600. The interface 670 may receive data from an external device or receive power and transmit power to the components of the mobile terminal 600 or transmit data of the mobile terminal 600 to an external device.

The controller 680 controls the overall operation of the mobile terminal 600. For example, the controller 680 performs control and processing associated with voice communication, data communication, video communication, and the like. The controller 680 may include a multimedia playback module 681 for multimedia playback. The multimedia playback module 681 may be implemented in the controller 680 in hardware form or may be implemented in software form separately from the controller 680.

The power supply 690 receives external power or internal power and supplies power required for operation to each component under control of the controller 680.

The block diagram of the mobile terminal 600 shown in FIG. 6 is only exemplary. Depending upon the specifications of the mobile terminal 600 in actual implementation, the components of the mobile terminal 100 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Figure 7:
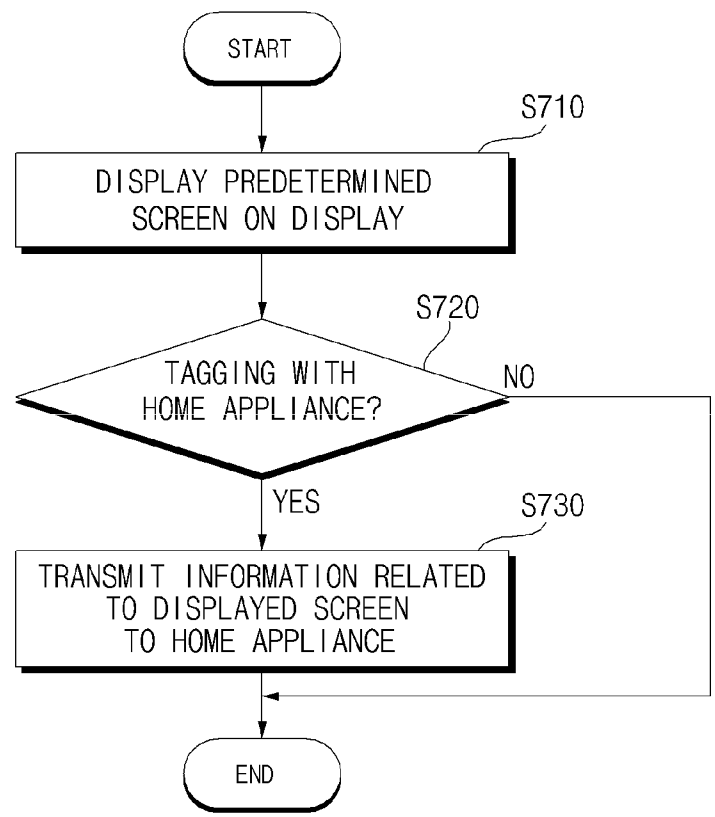
FIG. 7 is a flowchart illustrating a method for operating a mobile terminal according to an embodiment of the present invention.
Figure 8:
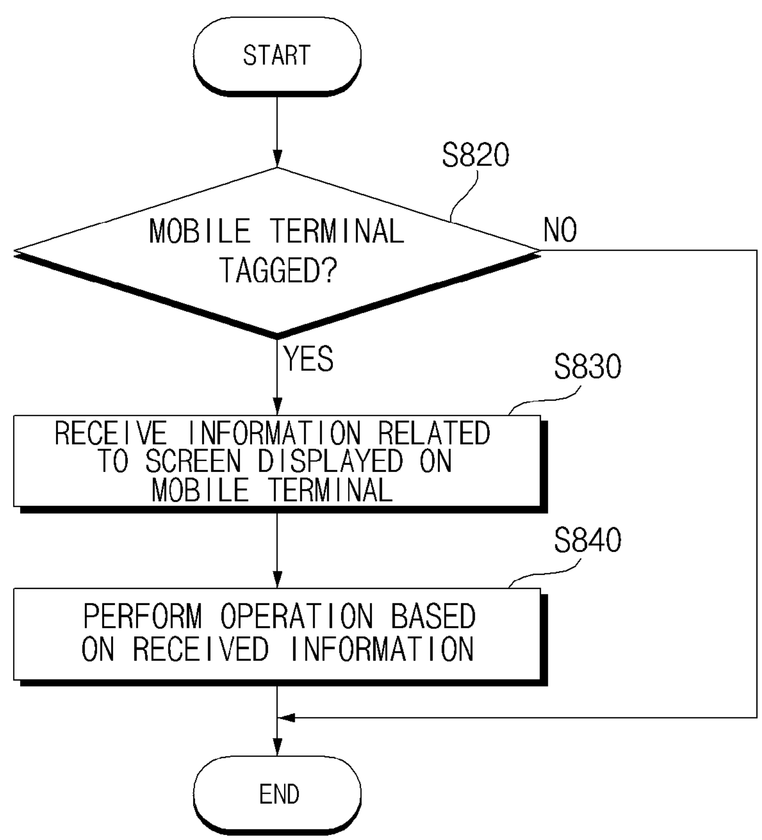
FIG. 8 is a flowchart illustrating a method for operating a home appliance according to an embodiment of the present invention.
Figure 9:
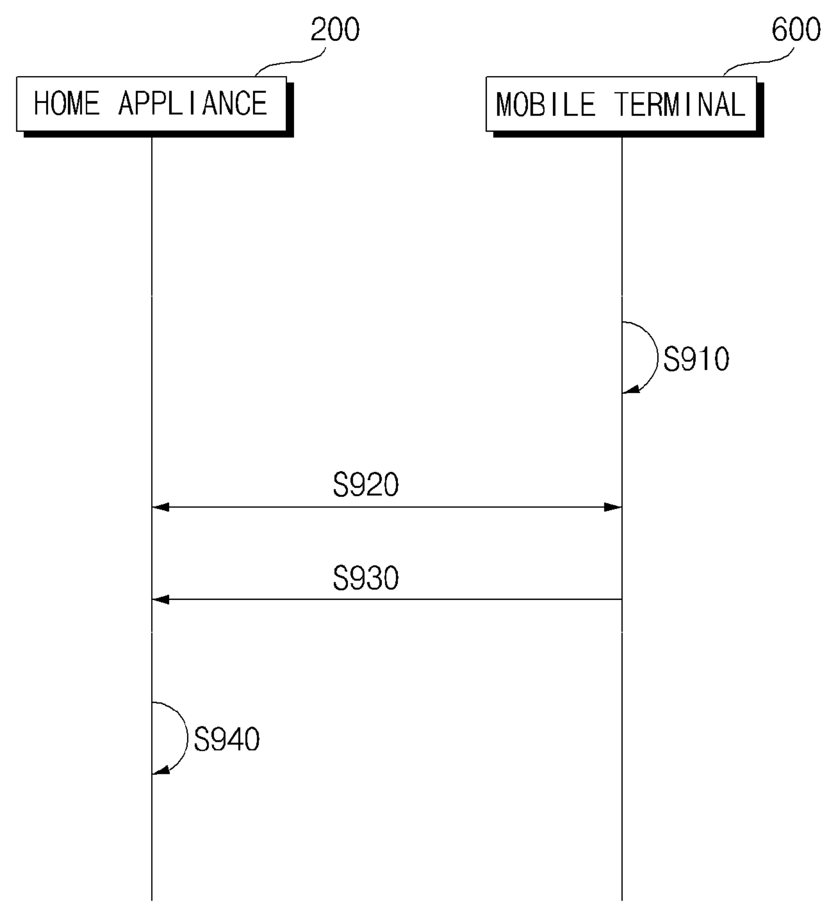
FIG. 9 is a view referred to for describing the operating method of FIG. 7 or 8.

FIG. 7 is a flowchart illustrating a method for operating a mobile terminal according to an embodiment of the present invention, FIG. 8 is a flowchart illustrating a method for operating a home appliance according to an embodiment of the present invention, and FIGS. 9 to 13*e* are views referred to for describing the operating method of FIG. 7 or 8.

First, referring to FIG. 7, the mobile terminal 600 displays a predetermined screen on the display (S710). Step S910 of FIG. 9 corresponds to step S710 of FIG. 7.

In particular, the controller 680 of the mobile terminal controls display of the screen in correspondence with user input.

For example, if a user enters a power information viewing command, a power information screen may be displayed. Although such a power information screen may be displayed after an application related to the home appliance is executed, the present invention is not limited thereto. That is, the power information screen may be a screen displayed when a user directly accesses a power provider server and views power information.

Figure 10A:
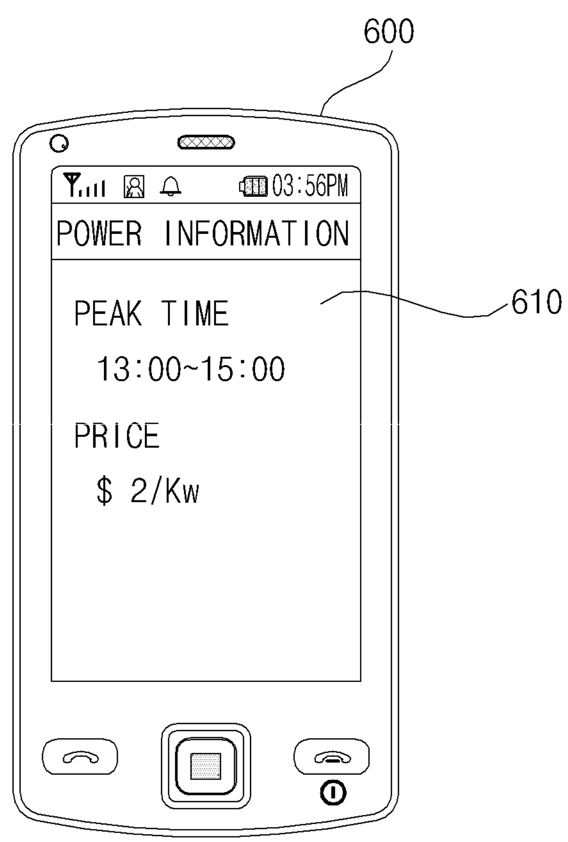
FIG. 10*a* is a view referred to for describing the operating method of FIG. 7 or 8.

FIG. 10*a* shows display of a power information screen 610 on the mobile terminal 600. In FIG. 10*a*, peak time information and price information of a peak time are included in the power information screen 610. The power information screen 610 further includes off peak time information, real-time power information, etc.

Next, the mobile terminal 600 determines whether the mobile terminal is tagged to the home appliance (S720). If so, the information related to the screen displayed on the mobile terminal 600 is transmitted to the home appliance (S730). Step S9820 of FIG. 9 corresponds to step S720 of FIG. 7 and step S820 of FIG. 8 and step S930 of FIG. 9 corresponds to step S730 of FIG. 7 and step S830 of FIG. 8.

Figure 10B:
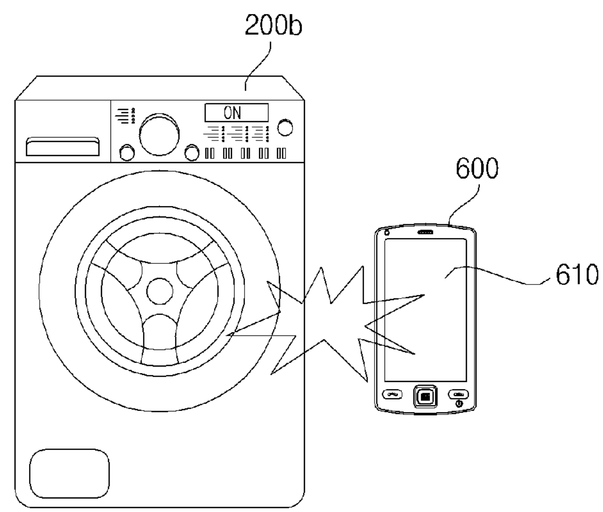
FIG. 10*b* is a view referred to for describing the operating method of FIG. 7 or 8.

FIG. 10*b* shows the case in which the mobile terminal 600 approaches the washing machine 200*b*, that is, the case in which tagging is performed.

If the mobile terminal 600 approaches the washing machine 200*b* within a predetermined distance capable of performing NFC, the NFC module 617 of the mobile terminal 600 provides a magnetic field to the washing machine 200*b*.

Conversely, the NFC module 217 of the washing machine 200*b* may provide a magnetic field to the mobile terminal 600.

The mobile terminal 600 writes or transmits the information related to the screen displayed on the mobile terminal 600 in or to the memory of the NFC module 217 of the home appliance 200 using the magnetic field.

Before the writing or transmission step, the mobile terminal 600 may read or receive product information written in the memory 218 of the NFC module 217 of the home appliance 200 and determine whether the washing machine is pre-registered or is capable of performing NFC using the received product information. If so, as described above, the information related to the screen displayed on the mobile terminal 600 is written in or transmitted to the memory 218 of the NFC module 217 of the home appliance 200.

That is, the mobile terminal 600 may perform authentication using the received product information and write or transmit the information related to the screen displayed on the mobile terminal 600 in or to the memory 218 of the NFC module 217 of the home appliance 200 once authentication is completed.

Figure 10C:
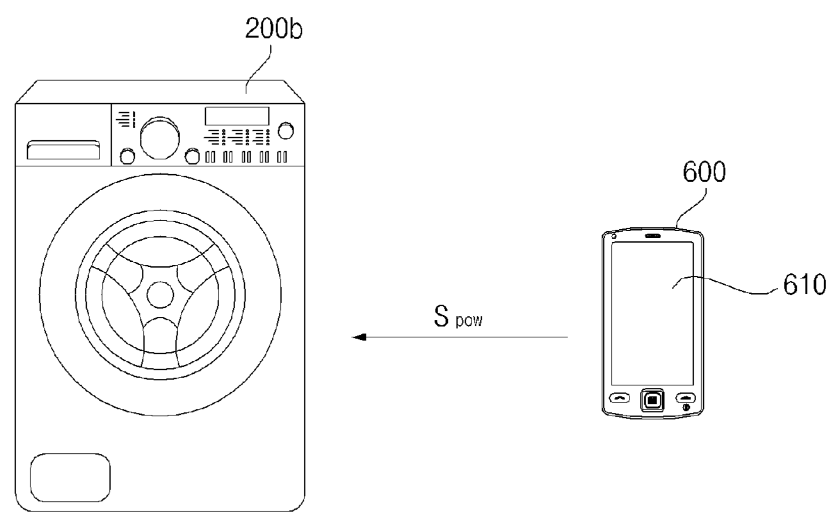
FIG. 10*c* is a view referred to for describing the operating method of FIG. 7 or 8.

FIG. 10*c* shows transmission of power information Spow of the washing machine 200*b* from the mobile terminal 600 to the washing machine 200*b* by tagging. Accordingly, the washing machine 200*b* can conveniently acquire the power information via the mobile terminal 600.

Next, the home appliance 200 operates according to the information related to the screen displayed on the mobile terminal 600 (S840). Step S940 of FIG. 9 corresponds to step S840 of FIG. 8.

Figure 10D:
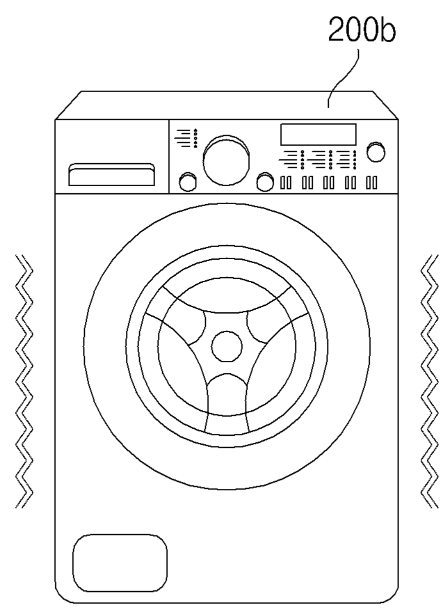
FIG. 10*d* is a view referred to for describing the operating method of FIG. 7 or 8.

FIG. 10*d* shows the case in which the washing machine 200*b* operates in a power-saving mode based on the received power information Spow.

For example, the washing machine 200*b* operates in a time other than a peak time of 13:00 to 15:00 or the washing machine 200*b* operates such that a part of a washing cycle or a rinsing cycle with low power consumption among all cycles of the washing machine is performed in a peak time or a dehydration cycle or a dry cycle with high power consumption is not performed in a peak time.

FIGS. 10*a* to 10*d* shows the case in which, if the mobile terminal is tagged to the washing machine 200*b* in a state in which the power information screen is displayed on the mobile terminal 600, the power information Spow is transmitted to the washing machine 200*b* and power-saving operation is performed in correspondence with the power information Spow received by the washing machine 200*b*.

Unlike FIGS. 10*a* to 10*d*, the embodiment of the present invention may be variously modified.

FIGS. 11*a* to 11*e* show the case in which, if the mobile terminal 600 is tagged to the cooker 200*d* in a state of displaying a recipe related screen on the mobile terminal 600, recipe information Sreci is transmitted to the cooker 200*d* and the cooker 200*d* operates in correspondence with the received recipe information Sreci.

Figure 11A:
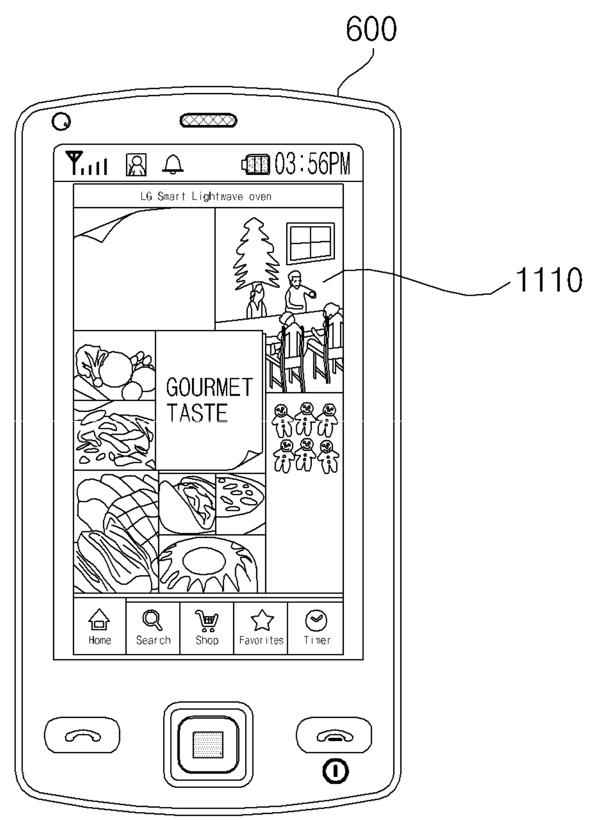
FIG. 11*a* is a view referred to for describing the operating method of FIG. 7 or 8.

FIG. 11*a* shows the case in which an application related to the cooker 200*d* is executed and an application screen 1110 related to the cooker 200*d* is displayed on the mobile terminal 600.

Figure 11B:
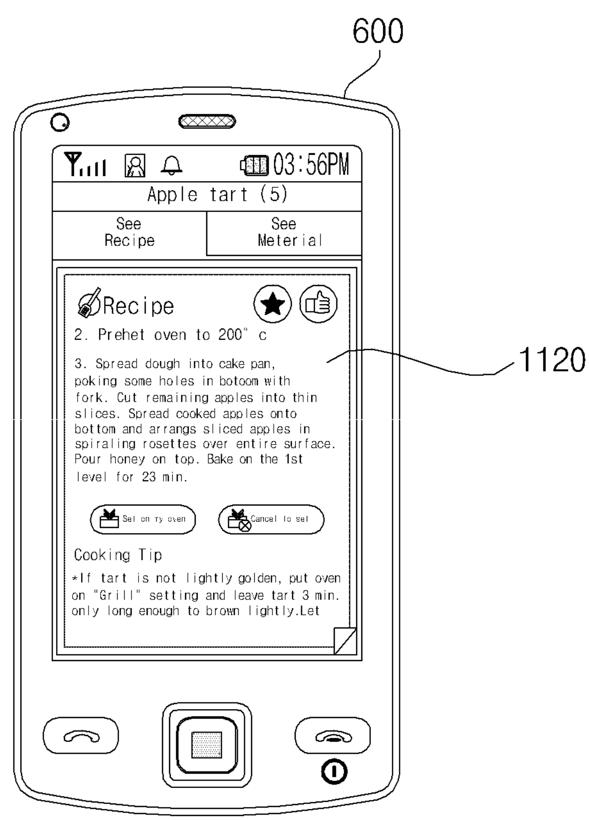
FIG. 11*b* is a view referred to for describing the operating method of FIG. 7 or 8.

FIG. 11*b* shows the case in which the recipe related screen 1120 among the screens of the application related to the cooker 200*d* is displayed on the mobile terminal 600. In the figure, a recipe screen related to "apple tart" is shown.

Figure 11C:
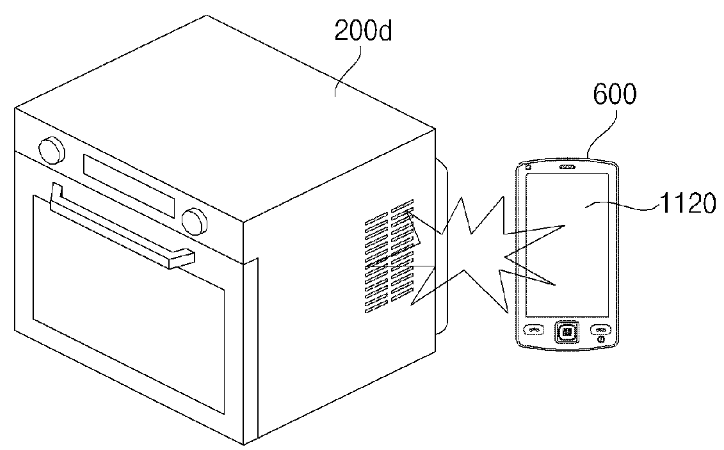
FIG. 11*c* is a view referred to for describing the operating method of FIG. 7 or 8.

Next, FIG. 11*c* shows the case in which the mobile terminal 600 approaches the cooker 200*d* within a predetermined distance in a state in which the recipe related screen 1120 is displayed on the mobile terminal 600, that is, the case in which tagging is performed.

Figure 11D:
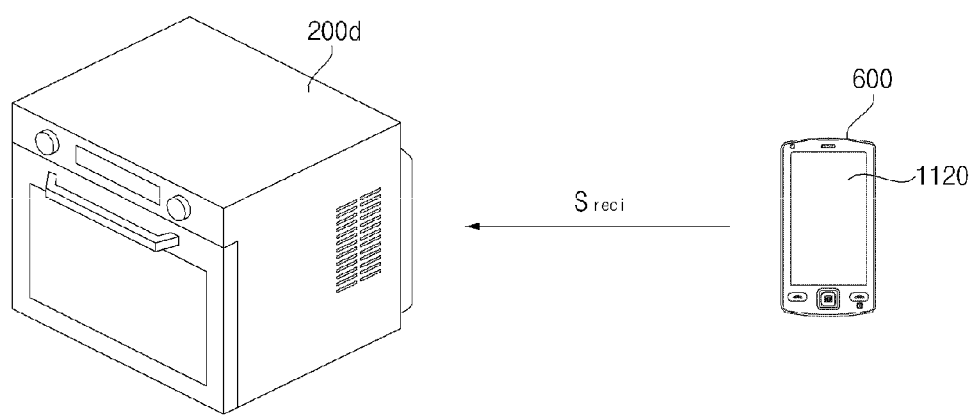
FIG. 11*d* is a view referred to for describing the operating method of FIG. 7 or 8.

Then, as shown in FIG. 11*d*, the mobile terminal 600 may transmit the recipe information Sreci related to "apple tart" to the NFC module 217 of the cooker 200*d*. Here, the recipe information may include cooking time information, cooking course information, recipe type information, etc.

Figure 11E:
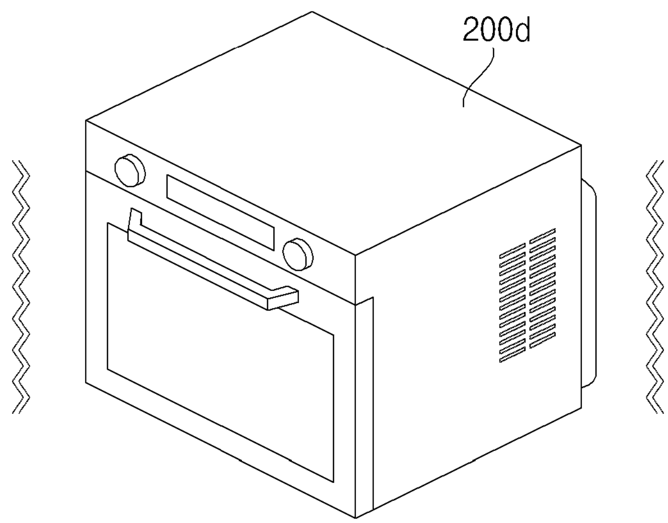
FIG. 11*e* is a view referred to for describing the operating method of FIG. 7 or 8.

FIG. 11*e* shows the case in which the cooker 200*d* performs cooking operation related to "apple tart" based on the received recipe information Sreci related to "apple tart". Thus, the user may immediately press a cooking start button without separate setting or conveniently cook desired food (an apple tart in this example) without pressing the cooking start button.

FIGS. 12*a* to 12*e* show the case in which, if the mobile terminal 600 is tagged to the washing machine 200*b* in a state of displaying a washing course screen on the mobile terminal 600, washing course information Scos is transmitted to the washing machine 200*b* and washing machine 200*b* operates in correspondence with the received washing course information Scos.

Figure 12A:
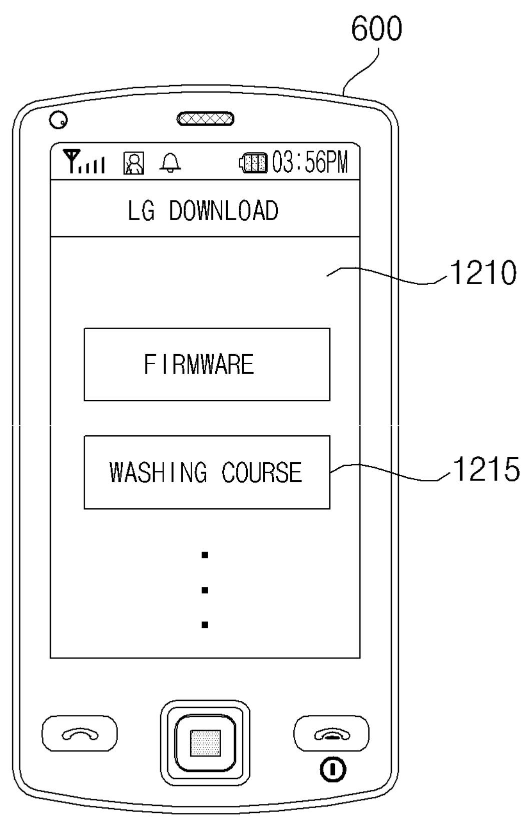
FIG. 12*a* is a view referred to for describing the operating method of FIG. 7 or 8.

FIG. 12*a* shows the case in which an application related to the washing machine 200*b* is executed and an application screen 1210 related to the washing machine 200*b* is displayed on the mobile terminal 600.

Although the application screen 1210 related to the washing machine 200*b* includes a firmware item and a washing course item 1215 in the figure, various modifications are possible.

Figure 12B:
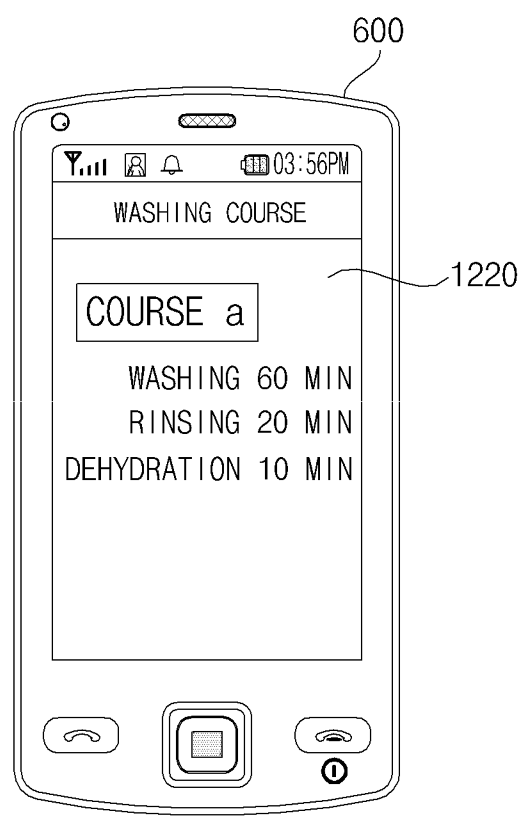
FIG. 12*b* is a view referred to for describing the operating method of FIG. 7 or 8.

If the washing course item 1215 is selected, as shown in FIG. 12*b*, the washing course screen 1220 among the screens of the application related to the washing machine 200*b* may be displayed on the mobile terminal 600. In the figure, the washing course screen 1220 related to "course a" including a washing cycle of 60 min, a rinsing cycle of 20 min and a dehydration cycle of 10 min is shown.

Figure 12C:
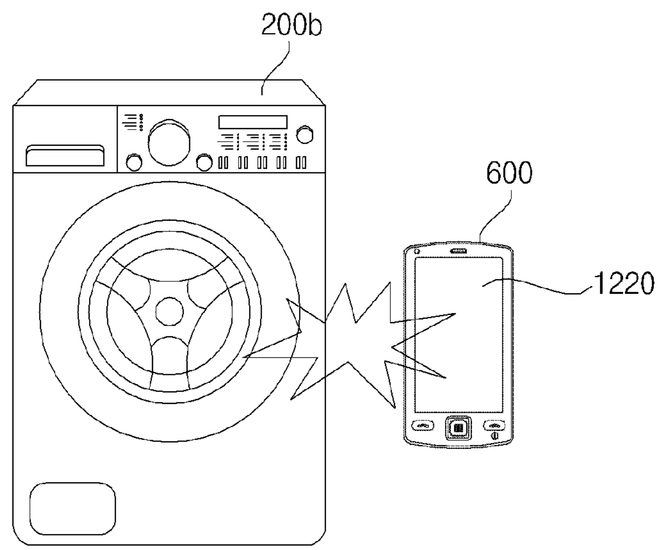
FIG. 12*c* is a view referred to for describing the operating method of FIG. 7 or 8.

Next, FIG. 12*c* shows the case in which the mobile terminal 600 approaches the washing machine 200*b* within a predetermined distance in a state of displaying the washing course screen 1220 on the mobile terminal 600, that is, the case in which tagging is performed.

Figure 12D:
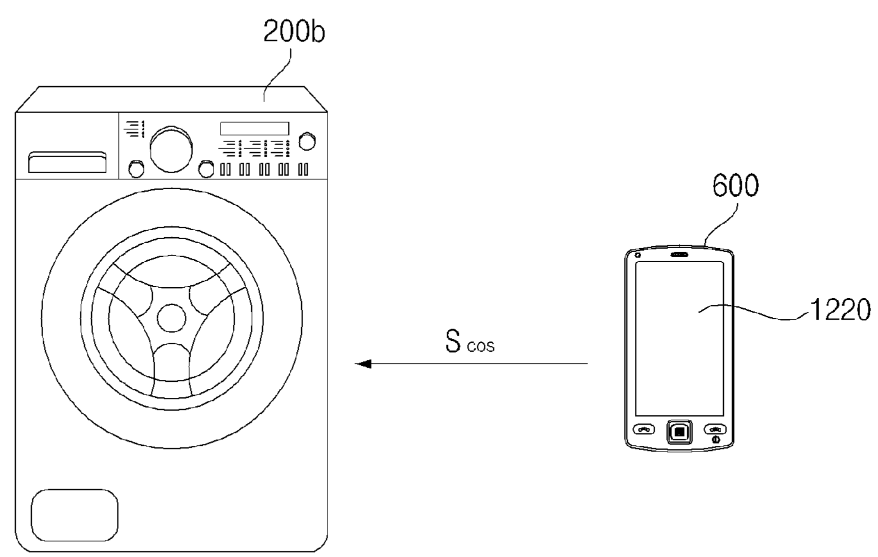
FIG. 12*d* is a view referred to for describing the operating method of FIG. 7 or 8.

Then, as shown in FIG. 12*d*, the mobile terminal 600 may transmit the washing course information Scos related to "course a" to the NFC module 217 of the washing machine 200*b*. The washing course information Scos related to "course a" may include time information such as a washing cycle of 60 min, a rinsing cycle of 20 min and a dehydration cycle of 10 min.

Figure 12E:
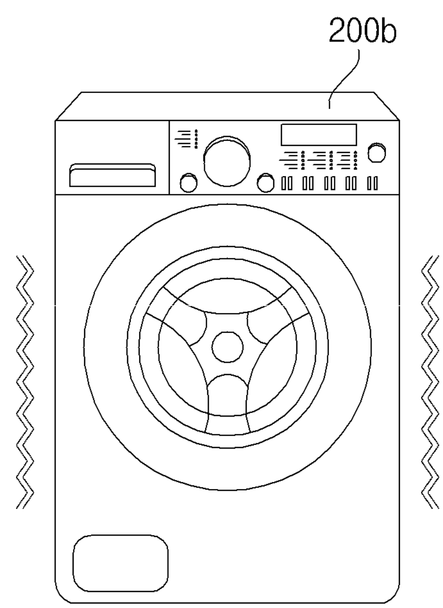
FIG. 12*e* is a view referred to for describing the operating method of FIG. 7 or 8.

FIG. 12*e* shows the case in which the washing machine 200*b* performs the washing course operation related to "course a" based on the received washing course information Scos related to "course a". Thus, the user may immediately press a start button without separate setting or conveniently perform the washing operation of the desired washing course (course a) without pressing the start button.

FIGS. 13*a* to 13*e* show the case in which, if the mobile terminal 600 is tagged to the washing machine 200*b* in a state of displaying a washing course list screen on the mobile terminal 600, washing course list information Scol is transmitted to the washing machine 200*b* and the washing machine 200*b* updates a washing course list is updated in correspondence with the received washing course list information Scol.

Figure 13A:
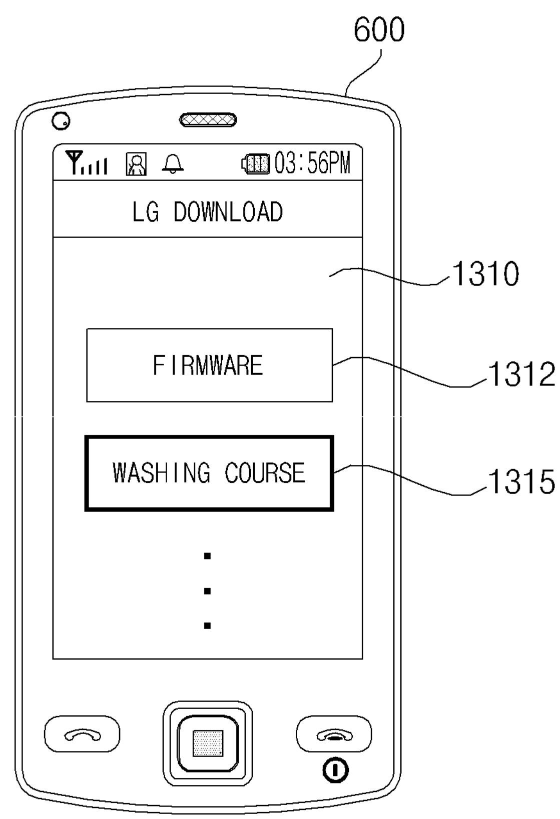
FIG. 13*a* is a view referred to for describing the operating method of FIG. 1 or 8.

FIG. 13*a* shows the case in which an application related to the washing machine 200*b* is executed and an application screen 1310 related to the washing machine 200*b* is displayed on the mobile terminal 600.

Although the application screen 1310 related to the washing machine 200*b* includes a firmware item and a washing course item 1315 in the figure, various modifications are possible.

Figure 13B:
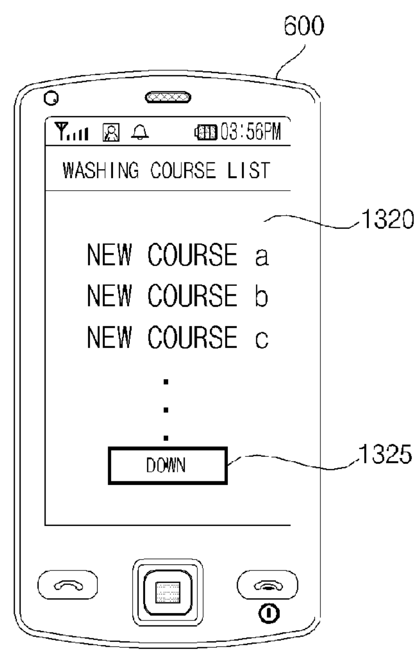
FIG. 13*b* is a view referred to for describing the operating method of FIG. 7 or 8.

If the washing course item 1315 is selected, as shown in FIG. 13*b*, the washing course list screen 1320 among the screens of the application related to the washing machine 200*b* may be displayed on the mobile terminal 600.

At this time, the washing course list screen 1320 may include washing course items newly updated by a manufacturer, such as a new course a item, a new course b item and a new course c item.

Figure 13C:
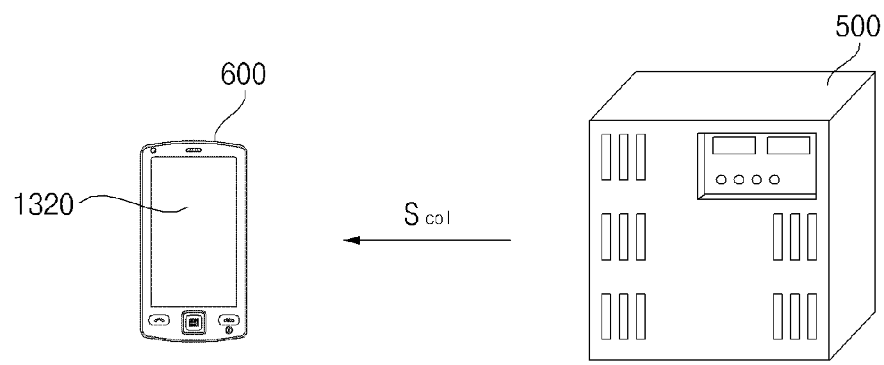
FIG. 13*c* is a view referred to for describing the operating method of FIG. 7 or 8.

If a down item 1325 of the washing course list screen 1320 is selected, as shown in FIG. 13*c*, the mobile terminal 600 may access the server 500 and download the washing course list Scol corresponding to the washing course list screen 1320.

Figure 13D:
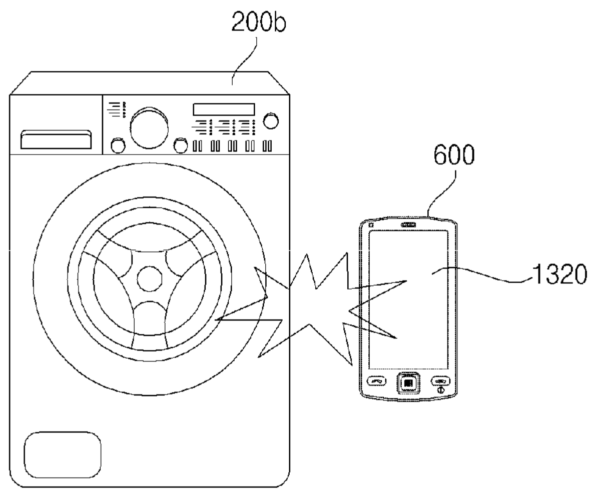
FIG. 13*d* is a view referred to for describing the operating method of FIG. 7 or 8.

Next, FIG. 13*d* shows the case in which the mobile terminal 600 approaches the washing machine 200*b* within a predetermined distance in a state in which the washing course list screen 1320 is displayed on the mobile terminal 600 and the washing course list Scol is downloaded from the server 500, that is, the case in which tagging is performed.

Figure 13E:
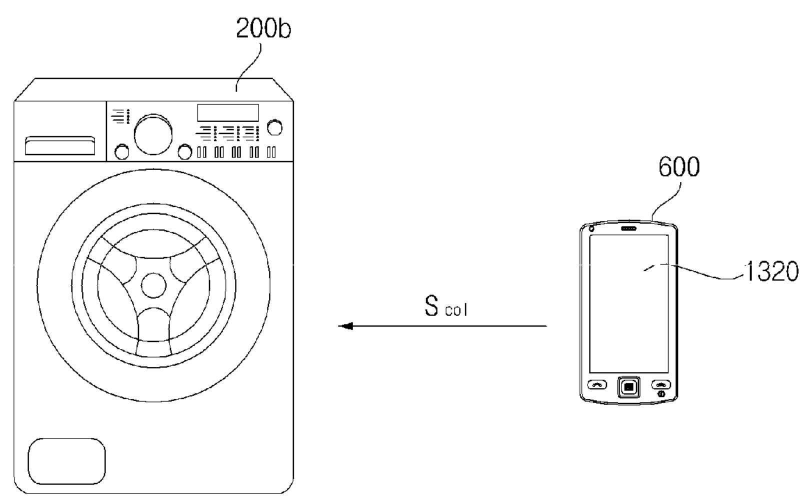
FIG. 13*e* is a view referred to for describing the operating method of FIG. 7 or 8.

Then, as shown in FIG. 13*e*, the mobile terminal 600 may transmit the washing course list Scol to the NFC module 217 of the washing machine 200*b*. The washing course list Scol may include plural pieces of new washing course information.

The washing machine 200*b* may store the received washing course list Scol in a memory (not shown) and update the existing washing course list using the received washing course list Scol. Thus, the user can conveniently update the washing course list of the washing machine 200*b*.

Similarly to the method shown in FIGS. 13*a* to 13*e*, the firmware of the home appliance may be upgraded.

Although not shown in FIGS. 10*a* to 13*e*, if the screen displayed on the mobile terminal 600 is an access point device list screen, the mobile terminal 600 may transmit network information of an access point device to the home appliance 200 via NFC with the home appliance 600.

If the home appliance 200 includes a communication module such as a Wi-Fi module, the home appliance 200 may wirelessly access an adjacent access point (AP) device using the received network information, thereby increasing user convenience.

Figure 13F:
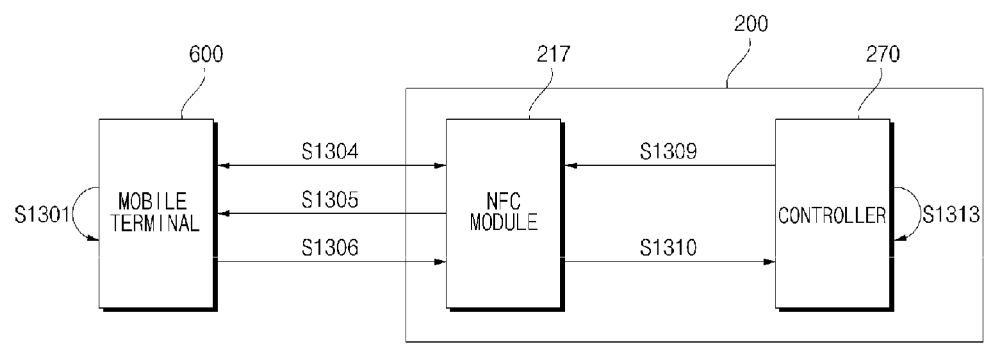
FIG. 13*f* is a view referred to for describing the operating method of FIG. 7 or 8.
Figure 13G:
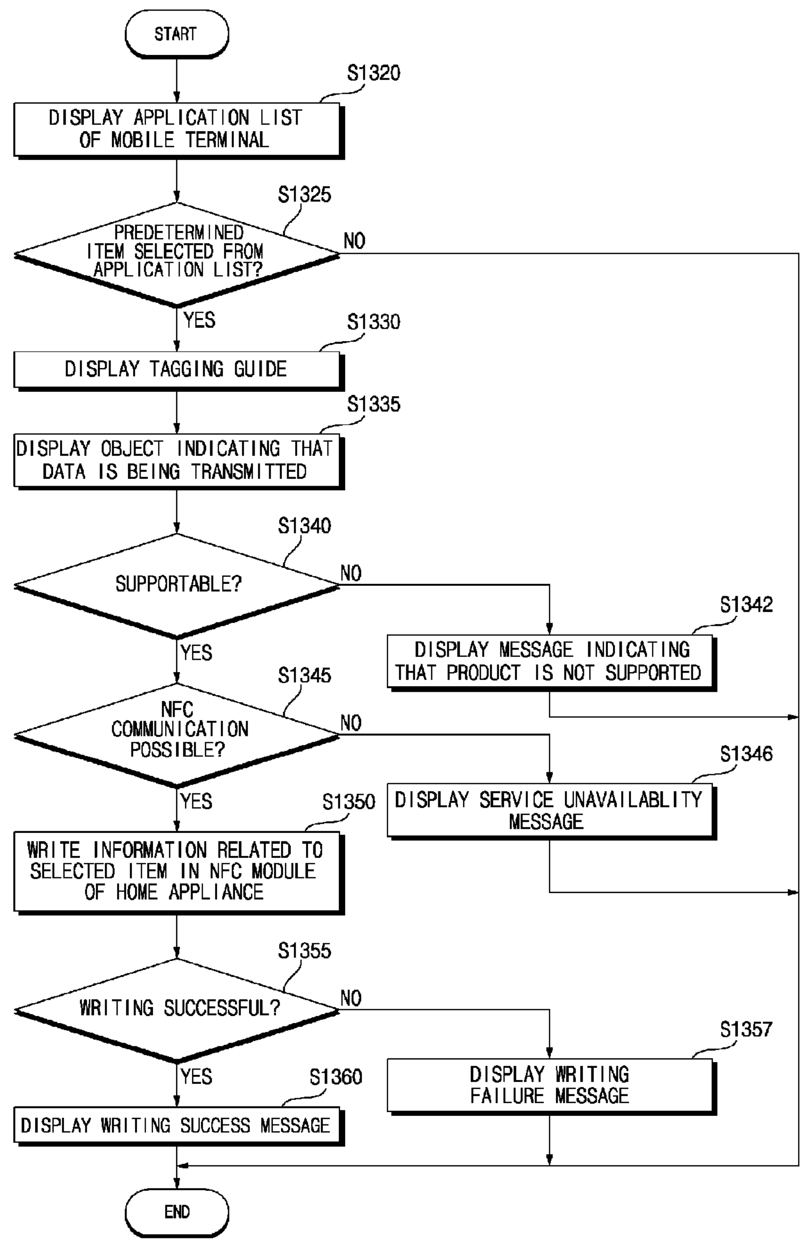
FIG. 13*g* is a view referred to for describing the operating method of FIG. 7 or 8.

FIGS. 13*f* to 13*g* are views referred to for describing transmission of a variety of information from the mobile terminal 600 to the home appliance 200 described with reference to FIGS. 10*a* to 13*e*.

First, FIG. 13*f* is a block diagram showing the internal configuration of the mobile terminal 600 and the home appliance 200.

Referring to FIG. 13*f*, the mobile terminal 600 may execute an NFC application according to user input (S1301). The NFC application may include various items for performing NFC operation. For example, the NFC application may include an easy radio access item, a washing course download item, a washing course setting item, a cooking data setting item, etc. If any one of the various NFC items is selected by user input, the mobile terminal 600 may display a screen corresponding to the selected item.

For example, if the washing course setting item is selected, as shown in FIG. 12*b*, the washing course screen 1220 may be displayed. As another example, if the washing course download item is selected, as shown in FIG. 13*b*, the washing course list screen 1320 may be displayed. As another example, if the cooking data setting item is selected, as shown in FIG. 11*b*, the recipe related screen 1120 may be displayed.

In a state in which the screen is displayed and an NFC transmission item (not shown) displayed on the display of the mobile terminal 600 is selected, the mobile terminal 600 may approach the home appliance 200 within a predetermined distance. That is, NFC tagging may be performed (S1304).

By NFC tagging, the NFC module 217 of the home appliance 200 transmits product information including product type, product state, product name, etc. to the mobile terminal 600 and, more particularly, the NFC module 617 of the mobile terminal (S1305).

The mobile terminal 600 performs authentication if the received product information is pre-registered product information and transmits information related to the NFC transmission item (not shown) displayed on the display of the mobile terminal 600 to the NFC module 217 of the home appliance 200 (S1306). That is, the related information is written in the memory 218 of the NFC module 217 of the home appliance 200.

Then, the NFC module 217 of the home appliance changes the writing flag from “0” to “1”.

The controller 270 of the home appliance 200 checks the writing flag of the NAF module 217 of the home appliance 200 (S1309). The controller 270 of the home appliance 200 determines whether the writing flag is “1”. If the writing flag is “1”, data written in the memory 218 of the NFC module 217 of the home appliance 200 is read (S1310).

The controller 270 of the home appliance 200 may store the read data in a memory (not shown). The controller 270 of the home appliance 200 may set a washing course and update the washing course list or update cooking data settings using the read data.

Next, FIG. 13*g* is a flowchart illustrating a method for operating the mobile terminal 600 upon NFC between the mobile terminal 600 and the home appliance 200.

First, the mobile terminal 600 may execute an NFC application according to user input and display an executed application list (S1320). Steps S1320 may correspond to step S1301 of FIG. 13*f*.

The NFC application list may include various items for performing NFC operation. For example, the NFC application list may include an easy radio access item, a washing course download item, a washing course setting item, a cooking data setting item, etc.

Next, the mobile terminal 600 may determine whether any one of the various NFC items is selected by user input (S1325) and display a tagging guide (S1325).

If tagging is performed, the mobile terminal 600 receives product information including product type, product state, product name, etc. from the NFC module 217 of the home appliance 200. Then, an object indicating that data is being transmitted may be displayed on the display (S1335).

The mobile terminal 600 determines whether a product is capable of performing NFC via the received product information (S1340) and, if not, outputs, on the display, a message indicating that the product is unsupported (S1342). For example, the message indicating that the product is unsupported may be displayed on the display or may be output via the audio output unit as audio. If the product is capable of performing NFC, whether NFC communication is possible is determined (S1345) and, if not, a service unavailability message may be displayed (S1347). If so, information related to the selected NFC item is written in the NFC module 217 of the home appliance 200 (S1350). At this time, CRC data may be transmitted along with the information related to the selected NFC item.

The mobile terminal 600 may receive CRC reply data from the home appliance 200 and determine whether writing is successfully performed using the CRC reply data (S1355). If writing fails, a writing failure message may be output (S1357). If writing is successful, the mobile terminal 600 may output a writing success message (S1360). Thus, the user can conveniently write desired data received from the mobile terminal 600 in the home appliance 200.

Figure 14:
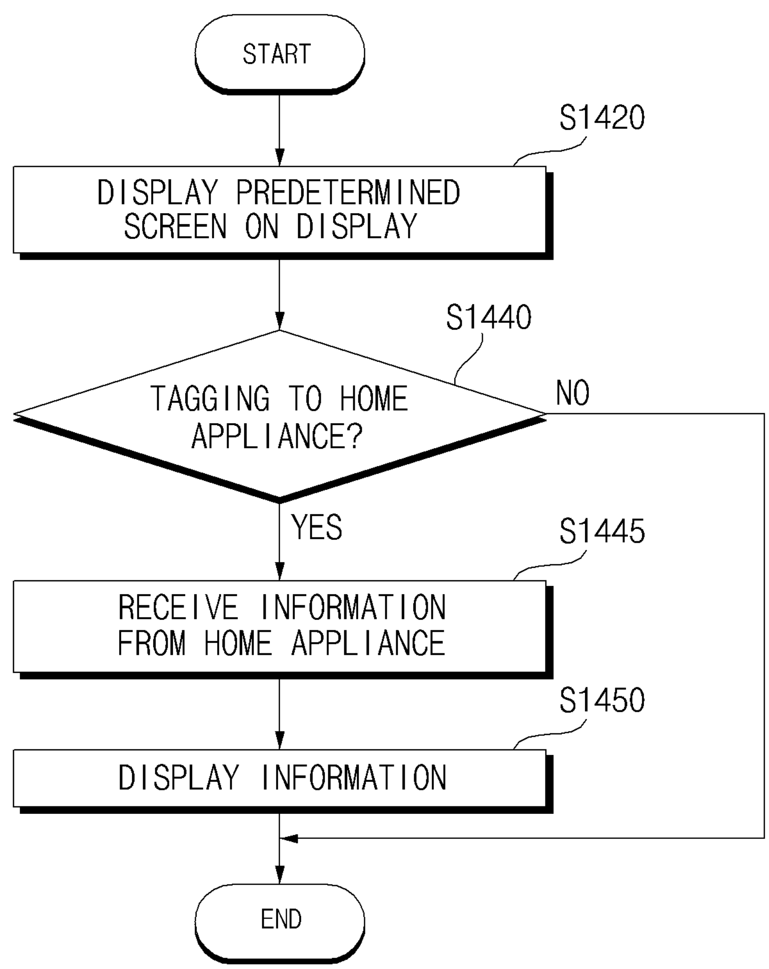
FIG. 14 is a flowchart illustrating a method for operating a mobile terminal according to another embodiment of the present invention.
Figure 15:
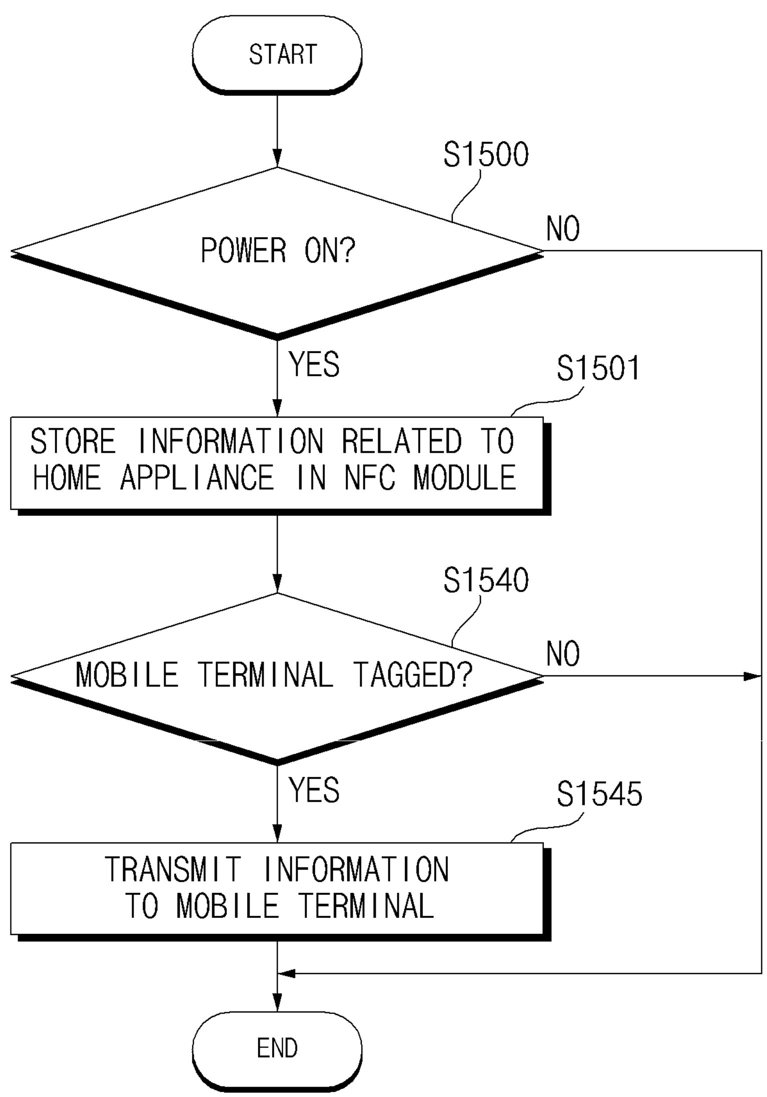
FIG. 15 is a flowchart illustrating a method for operating a home appliance according to another embodiment of the present invention.

FIG. 14 is a flowchart illustrating a method for operating a mobile terminal according to another embodiment of the present invention, FIG. 15 is a flowchart illustrating a method for operating a home appliance according to another embodiment of the present invention, and FIGS. 16*a* to 22*c* are views referred to for describing the operating method of FIG. 14 or 15.

First, referring to FIG. 15, the home appliance 200 determines whether the home appliance is powered on (S1500). If so, home appliance related information is stored in the NFC module (S1501).

If the home appliance 200 is powered on, the controller 200 of the home appliance may store information related to the home appliance, e.g., operation state information, operation history information, product information, failure information, power consumption information, stored article information, recipe information, etc. In particular, the information related to the home appliance may be stored in the memory 218 of the NFC module 217.

For example, if the washing machine 200*b* performs washing operation, washing operation time information, washing operation course information, washing machine failure information, etc. may be stored in the NFC module of the washing machine 200*b*.

If the home appliance 200 operates, the home appliance related information may be periodically stored in the NFC module 217.

As another example, the home application related information may be stored in the NFC module 217 at a first interval in initial operation of the home appliance 200 and then may be stored in the NFC module 217 at a second interval shorter than the first interval.

Next, referring to FIG. 7, the mobile terminal 600 displays a predetermined screen according to user input (S1420). The predetermined screen may include a web page, an application screen, etc. according to user input.

Figure 16A:
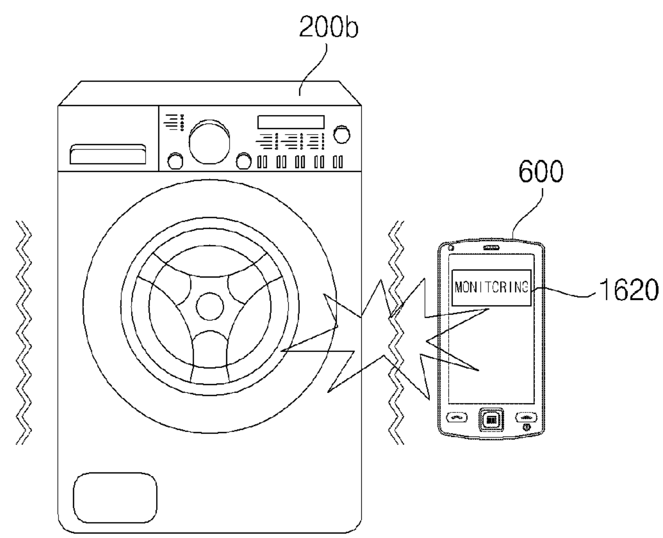
FIG. 16*a* is a view referred to for describing the operating method of FIG. 14 or 15.

FIG. 16*a* shows display of a monitoring screen 1620 on the mobile terminal 600. Such a monitoring screen 1620 may be a screen displayed when a monitoring item is selected from an execution screen of a home appliance related application.

Next, the mobile terminal 600 determines whether tagging to the home appliance is performed (S1440). If so, information related to the screen displayed on the mobile terminal 600 is received from the home appliance (S1445). The mobile terminal 600 displays the received information (S1450).

Step S1540 of FIG. 15 corresponds to step S1440 of FIG. 14 and step S1545 of FIG. 15 corresponds to step S1445 of FIG. 14.

FIG. 16*a* shows the case in which the mobile terminal 600 approaches the washing machine 200*b*, that is, the case in which tagging is performed.

If the mobile terminal 600 approaches the washing machine 200*b* within a predetermined distance capable of performing NFC, the NFC module 617 of the mobile terminal 600 may provide a magnetic field to the washing machine 200*b*. Conversely, the NFC module 217 of the washing machine 200*b* may provide a magnetic field to the mobile terminal 600.

The mobile terminal 600 reads or receives product information from the memory 218 of the NFC module 217 of the washing machine 200*b* using the magnetic field. At this time, the mobile terminal 600 may determine whether the washing machine is pre-registered or is capable of performing NFC using the read or received product information.

That is, the mobile terminal 600 may perform authentication using the received product information and read or receive home appliance related information stored in the memory 218 of the NFC module 217 once authentication is completed.

In particular, the received home appliance related information may be stored in the memory 618 of the NFC module 617 of the mobile terminal 600. The NFC controller 626 of the NFC module 617 of the mobile terminal 600 may inform the controller 228 that the home appliance related information has been stored in the memory 618. For example, the reception flag may be changed from "0" to "1" to inform the controller 228 that the home appliance related information has been received.

The home appliance related information transmitted to the mobile terminal 600 is preferably information related to the screen displayed on the mobile terminal 600.

That is, the mobile terminal 600 may perform authentication using the received product information and read or receive only the information related to the screen displayed on the mobile terminal 600 among the home application related information stored in the memory 218 of the NFC module 217 once authentication is completed.

For example, as shown in FIG. 16*a*, if the monitoring screen 1620 is displayed on the mobile terminal 600, the mobile terminal 600 may read or receive operation state information Sstp of the washing machine 200*b*.

Figure 16B:
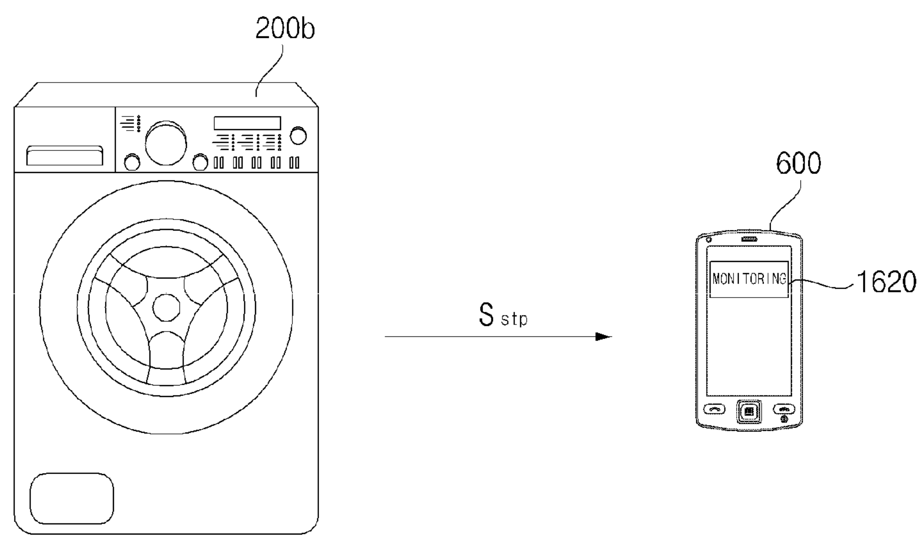
FIG. 16*b* is a view referred to for describing the operating method of FIG. 14 or 15.

FIG. 16*b* shows transmission of the operation state information Sstp of the washing machine 200*b* from the washing machine 200*b* to the mobile terminal 600 by tagging. Thus, the mobile terminal 600 can conveniently acquire the information related to the displayed screen from the washing machine 200*b*.

The mobile terminal 600 displays information received from the home appliance.

Figure 16C:
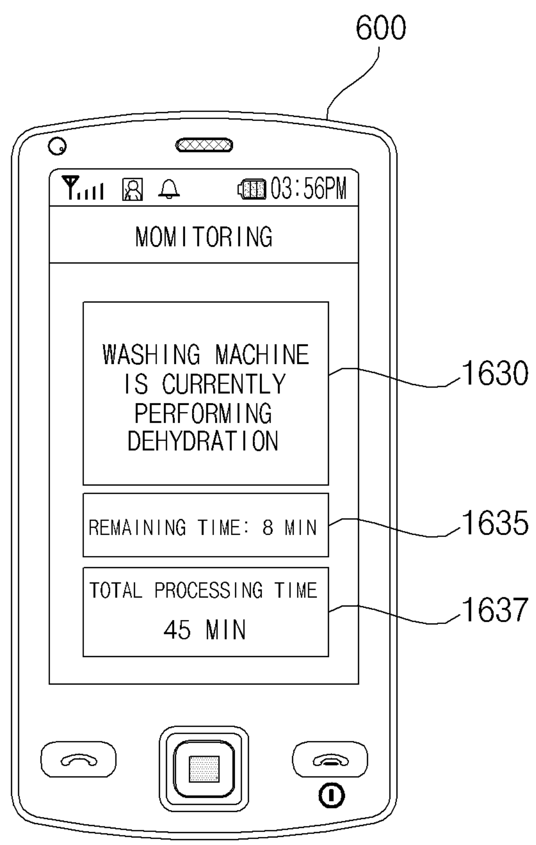
FIG. 16*c* is a view referred to for describing the operating method of FIG. 14 or 15.

FIG. 16*c* shows display of the operation state information Sstp of the washing machine 200*b* on the mobile terminal 600.

Although, in the figure, information 1630 indicating that dehydration is currently being performed, remaining time information 1635 and total processing time information 1637 are displayed on the mobile terminal 600, various modifications are possible.

FIGS. 17*a* to 17*d* show the case in which, if the mobile terminal 600 is tagged to the washing machine 200*b* in a state in which an NFC diagnosis screen is displayed on the mobile terminal 600, failure information Sdia of the washing machine 200*b* is transmitted to the mobile terminal 600 and the mobile terminal 600 accesses the server 500 using the failure information Sdia of the washing machine 200*b* and receives failure diagnosis result information.

Figure 17A:
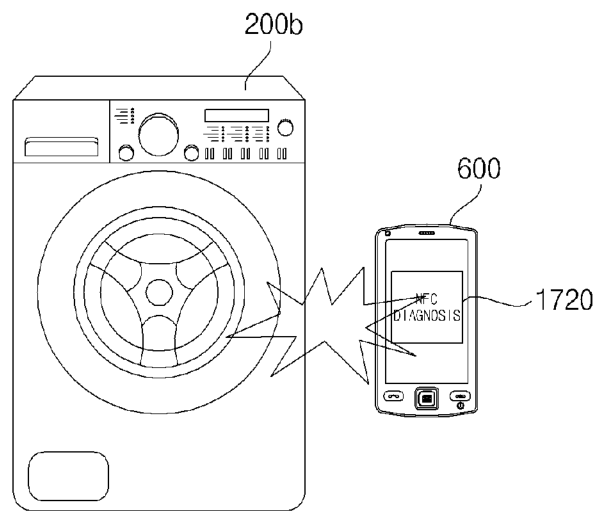
FIG. 17*a* is a view referred to for describing the operating method of FIG. 14 or 15.

FIG. 17*a* shows the case in which the mobile terminal 600 approaches the washing machine 200*b* in a state in which an application related to the washing machine 200*b* is executed and an NFC diagnosis screen 1720 related to the washing machine 200*b* is displayed, that is, the case in which tagging is performed.

Figure 17B:
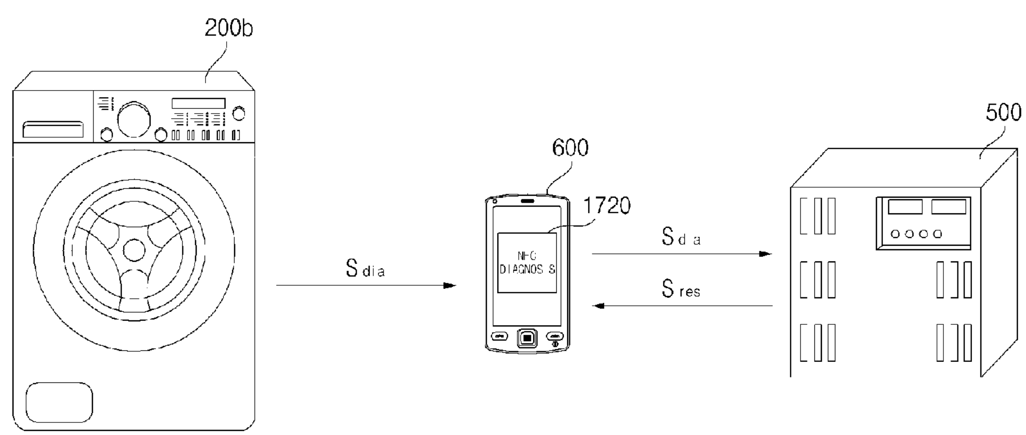
FIG. 17*b* is a view referred to for describing the operating method of FIG. 14 or 15.

As shown in FIG. 17*b*, the failure information Sdia of the washing machine 200*b* may be transmitted to the mobile terminal 600 and the mobile terminal 600 may transmit the failure information Sdia of the washing machine 200*b* to the server 500. Then, the mobile terminal 600 may receive failure diagnosis result information Sres from the server 500.

Figure 17C:
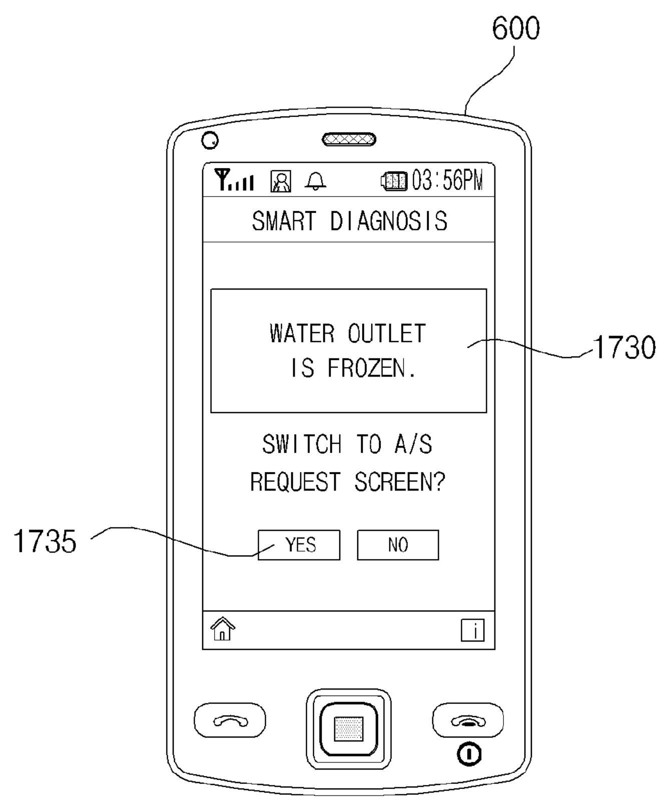
FIG. 17*c* is a view referred to for describing the operating method of FIG. 14 or 15.

FIG. 17*c* shows the case in which the failure result information 1730 based on the washing-machine failure result information Sres is displayed on the display.

In the figure, a message "Water has frozen in water outlet" is displayed as the washing-machine failure result information 1730. Thus, the user can conveniently confirm a cause of washing-machine failure, thereby increasing user convenience.

The mobile terminal 600 may further display an AS request item 1735 in addition to the washing-machine failure result information 1730.

Figure 17D:
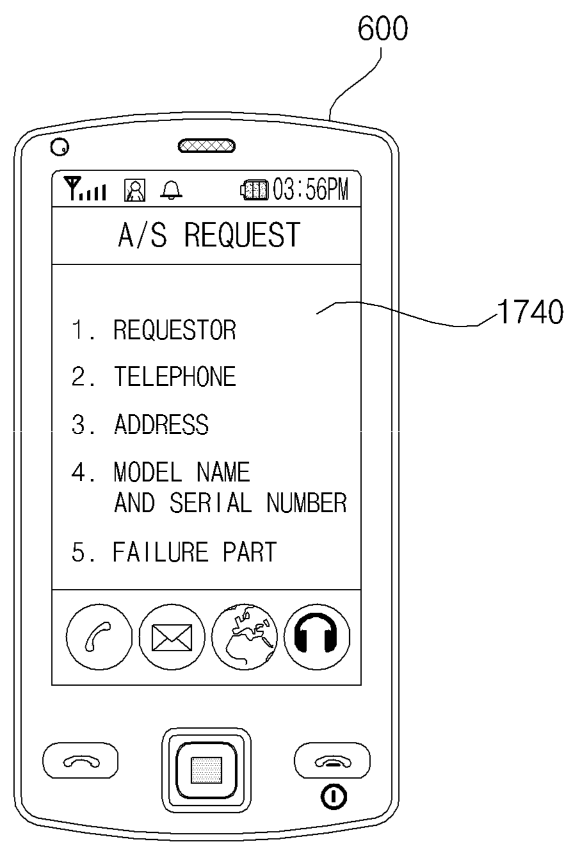
FIG. 17*d* is a view referred to for describing the operating method of FIG. 14 or 15.

In FIG. 17*c*, if the AS request item 1735 is selected by user input, as shown in FIG. 17*d*, an AS request screen 1740 may be displayed. Thus, the user can immediately issue an AS request in addition to the failure result information, thereby increasing user convenience.

Figure 18A:
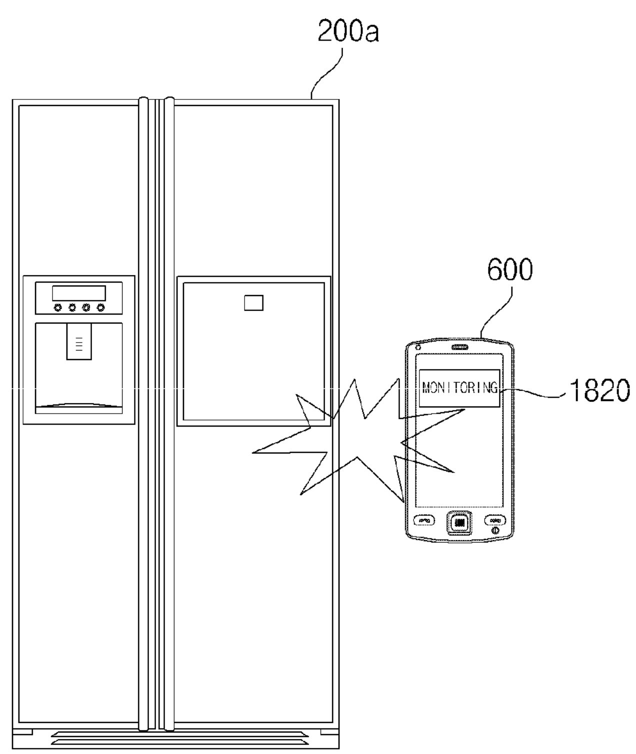
FIG. 18*a* is a view referred to for describing the operating method of FIG. 14 or 15.
Figure 18B:
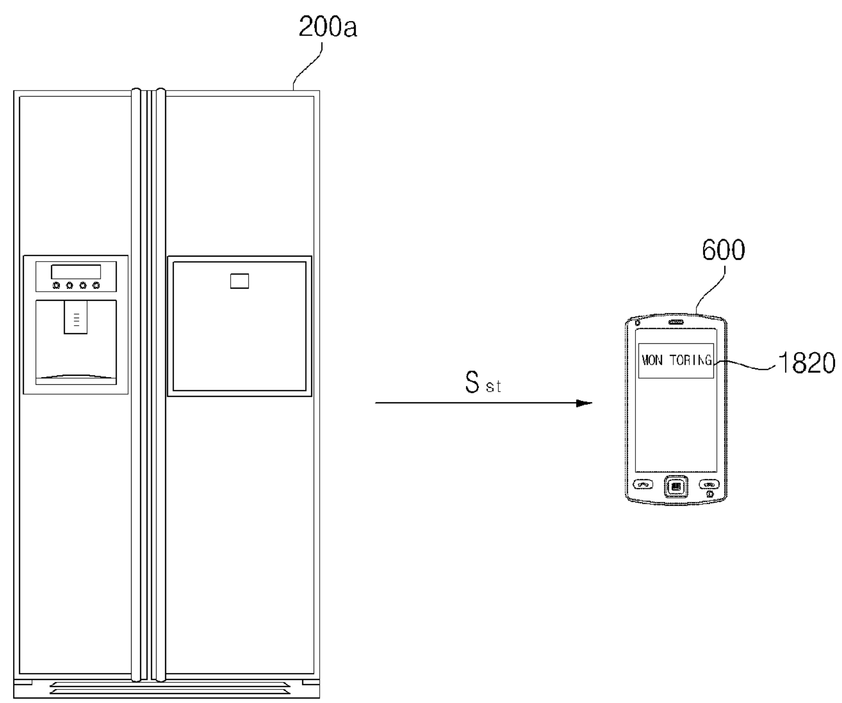
FIG. 18*b* is a view referred to for describing the operating method of FIG. 14 or 15.
Figure 18C:
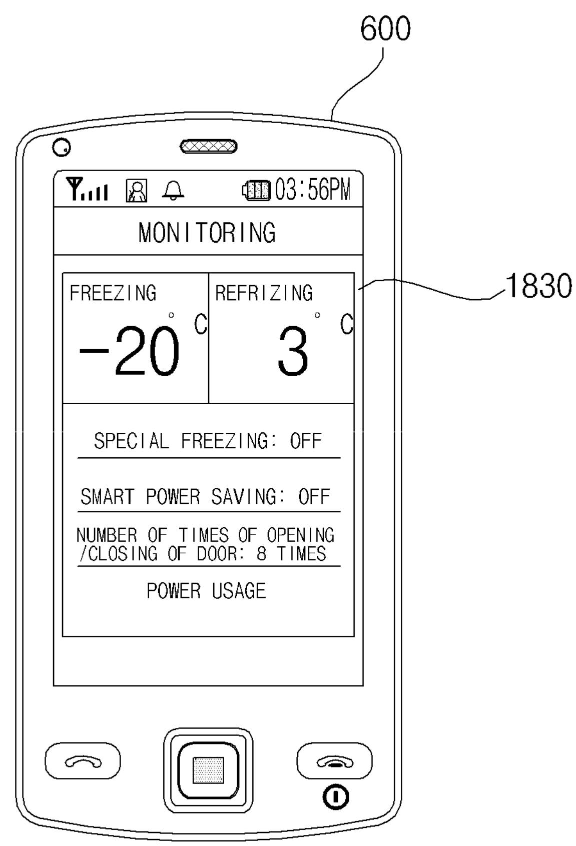
FIG. 18*c* is a view referred to for describing the operating method of FIG. 14 or 15.

FIGS. 18*a* to 18*c* show the case in which, if the mobile terminal 600 is tagged to the refrigerator 220*a* in a state of displaying the monitoring screen on the mobile terminal 600, the operation state information Sst of the refrigerator 200*a* is transmitted to the mobile terminal 600 and the mobile terminal 600 displays the operation state information Sst of the refrigerator 200*a*.

FIG. 18*a* shows the case in which the mobile terminal 600 approaches the refrigerator 200*a* in a state in which an application related to the refrigerator 200*a* is executed and a monitoring screen 1820 related to the refrigerator 200*a* is displayed, that is, the case in which tagging is performed.

As shown in FIG. 18*b*, the operation state information Sst of the refrigerator 200*a* may be transmitted to the mobile terminal 600.

The mobile terminal 600 may display the operation state information Sst of the refrigerator 200*a* as shown in FIG. 18*c*.

FIG. 18*c* shows an operation state information screen 1830 of the refrigerator 200*a*. Here, although the operation state information screen 1830 of the refrigerator 200*a* includes freezer compartment temperature information, refrigerating compartment temperature information, special freezing operation information, smart power-saving operation information, information about the number of times of opening/closing of a door and power usage information, various modifications are possible. Via the operation state information screen 1830 of the refrigerator 200*a*, the user can conveniently confirm the operation state of the refrigerator 200*a*.

Figure 19A:
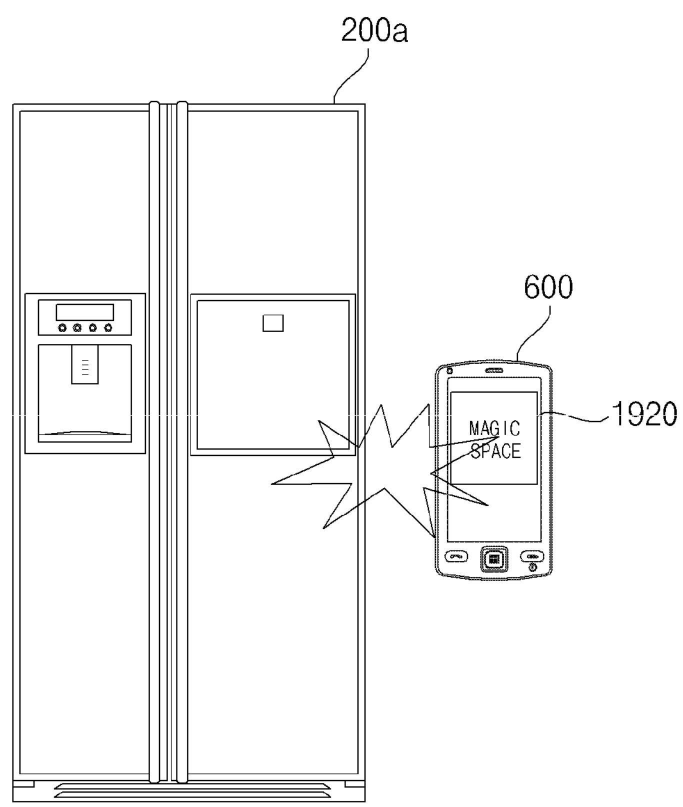
FIG. 19*a* is a view referred to for describing the operating method of FIG. 14 or 15.
Figure 19B:
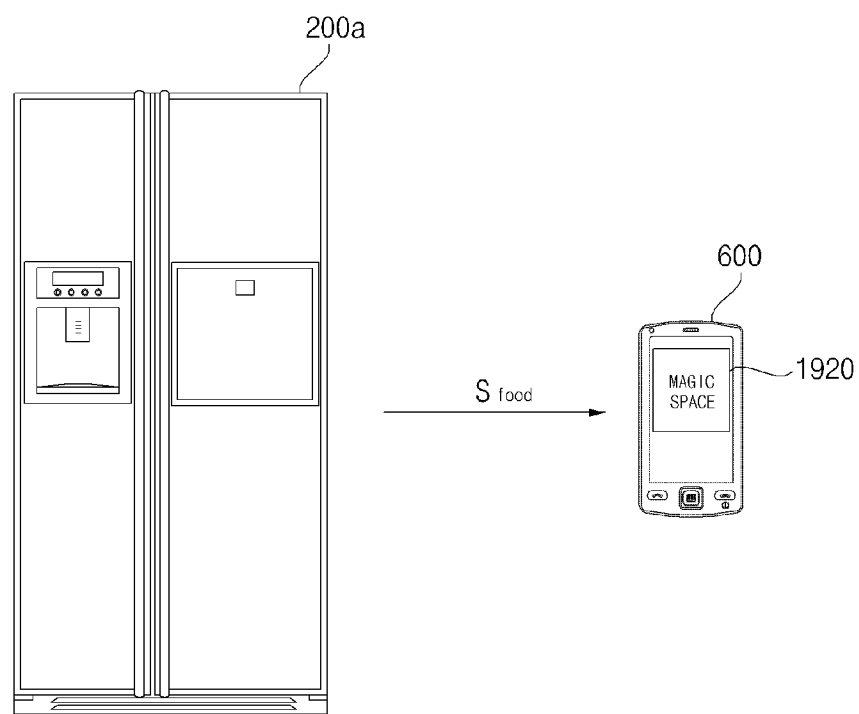
FIG. 19*b* is a view referred to for describing the operating method of FIG. 14 or 15.
Figure 19C:
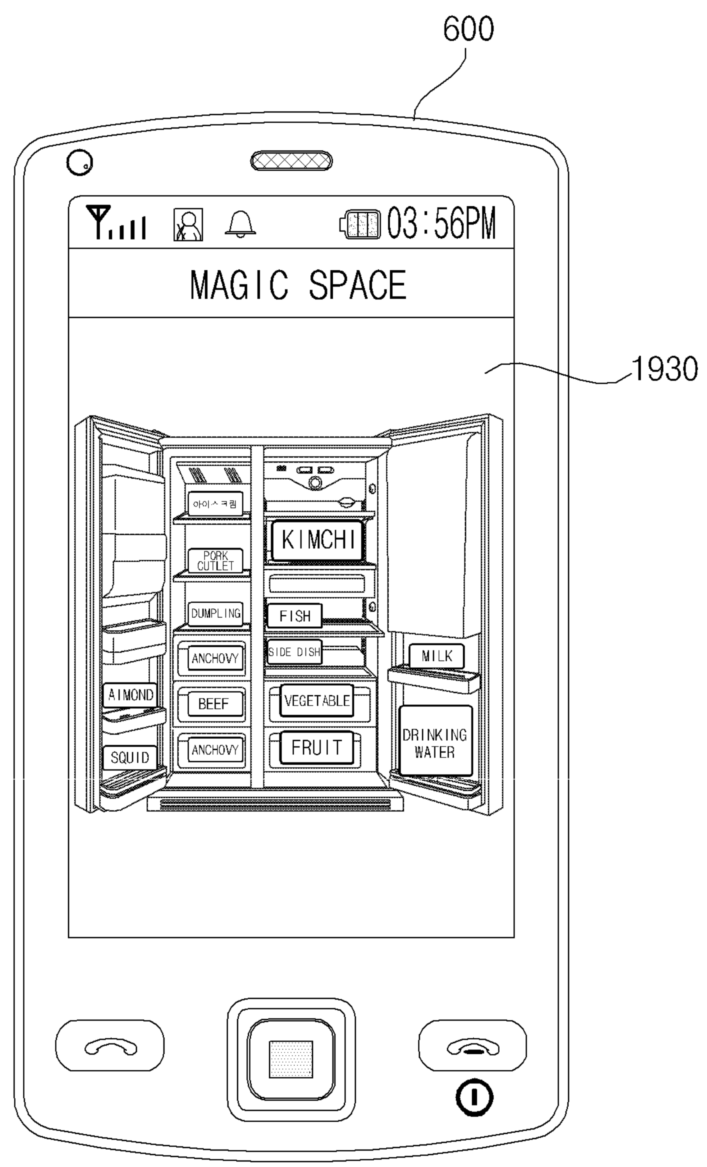
FIG. 19*c* is a view referred to for describing the operating method of FIG. 14 or 15.

FIGS. 19*a* to 19*c* show the case in which, if the mobile terminal 600 is tagged to the refrigerator 200*a* in a state of displaying a magic space screen related to food management on the mobile terminal 600, food storage information Sfood of the refrigerator 200*a* is transmitted to the mobile terminal 600 and the mobile terminal 600 displays the food storage information Sfood of the refrigerator 200*a*.

FIG. 19*a* shows the case in which the mobile terminal 600 approaches the refrigerator 200*a* in a state in which an application related to the refrigerator 200*a* is executed and a magic space screen 1920 related to the refrigerator 200*a* is displayed, that is, the case in which tagging is performed.

As shown in FIG. 19*b*, the food storage information Sfood of the refrigerator 200*a* may be transmitted to the mobile terminal 600.

The food storage information Sfood of the refrigerator 200*a* may include food type information, stored food location information, food amount information, food expiration date information, food storage date information, etc. of the refrigerator 200*a*. The mobile terminal 600 may display the food storage information Sfood of the refrigerator 200*a* as shown in FIG. 19*c*.

FIG. 19*c* shows a magic space screen 1930 of the refrigerator 200*a*. The magic space screen 1930 shows the state, in which the door of the refrigerator is opened, and may be displayed using food type information, storage location information, etc. of the refrigerator. The food expiration date information, food storage date information, etc. may be further displayed. Via the magic space screen 1930 indicating the food storage information Sfood of the refrigerator 200*a*, the user can conveniently confirm the information about the food stored in the refrigerator 200*a*.

Figure 20A:
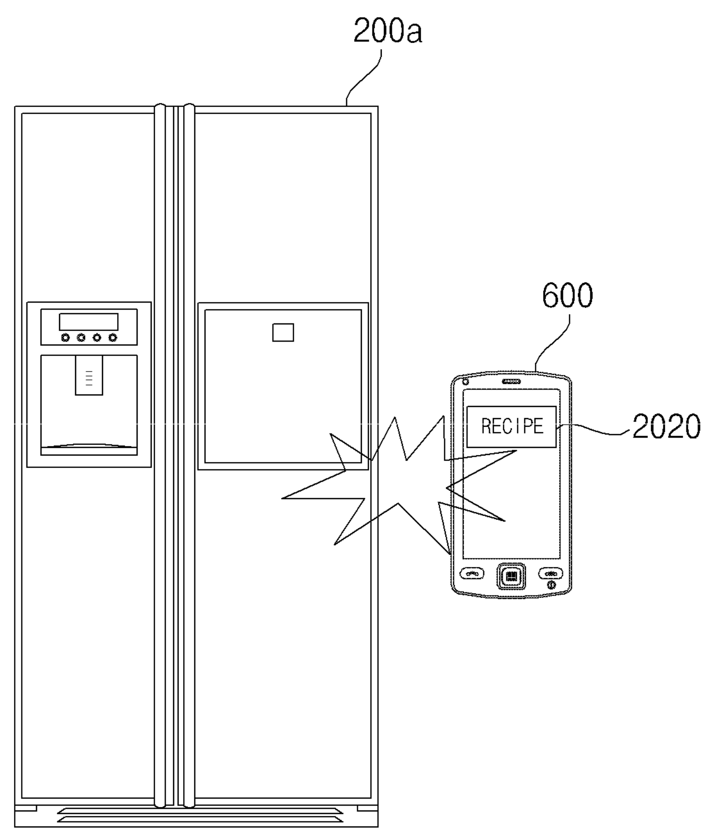
FIG. 20*a* is a view referred to for describing the operating method of FIG. 14 or 15.
Figure 20B:
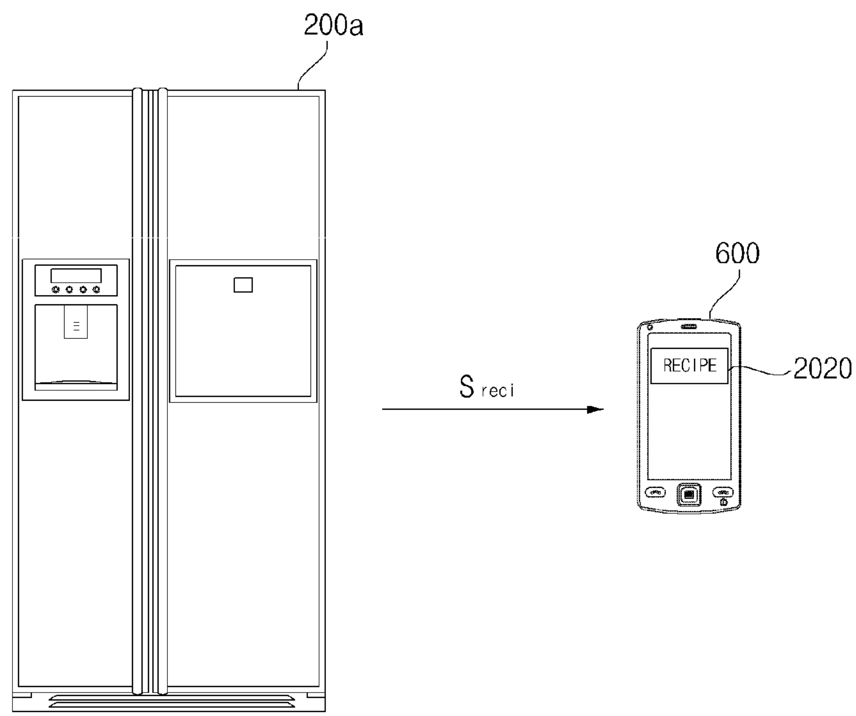
FIG. 20*b* is a view referred to for describing the operating method of FIG. 14 or 15.
Figure 20C:
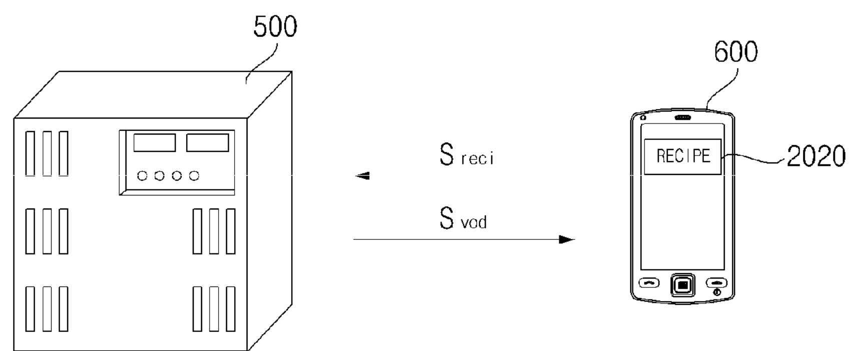
FIG. 20*c* is a view referred to for describing the operating method of FIG. 14 or 15.

FIGS. 20*a* to 20*c* show the case in which, if the mobile terminal 600 is tagged to the refrigerator 200*a* in a state of displaying a recipe related screen on the mobile terminal 600, recipe information Sreci based on food stored in the refrigerator 200*a* is transmitted to the mobile terminal 600 and the mobile terminal 600 transmits the recipe information Sreci to the server 500 and receives content Svod related to the recipe from the server 500.

FIG. 20*a* shows the case in which the mobile terminal 600 approaches the refrigerator 200*a* in a state in which an application related to the refrigerator 200*a* is executed and a recipe related screen 2020 related to the refrigerator 200*a* is displayed, that is, the case in which tagging is performed.

As shown in FIG. 20*b*, the recipe information Sreci based on the information about the food stored in the refrigerator 200*a* may be transmitted to the mobile terminal 600.

Then, the mobile terminal 600 may transmit the received recipe information Sreci to the server 500 and receive the content Svod related to the recipe, as shown in FIG. 20*c*. The received content Svod may be a moving image.

The mobile terminal 600 may play the received content Svod back. Thus, the user can conveniently view the content regarding the recipe when cooking food based on the information about the food stored in the refrigerator 200*a* and immediately refer to the recipe while cooking in a kitchen. Accordingly, it is possible to increase user convenience.

Figure 21A:
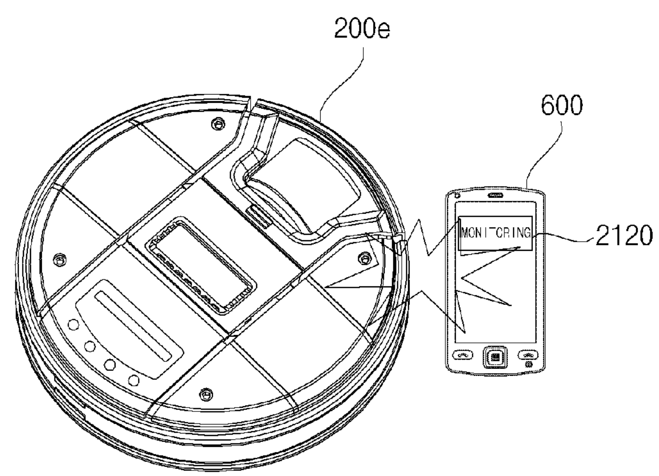
FIG. 21*a* is a view referred to for describing the operating method of FIG. 14 or 15.
Figure 21B:
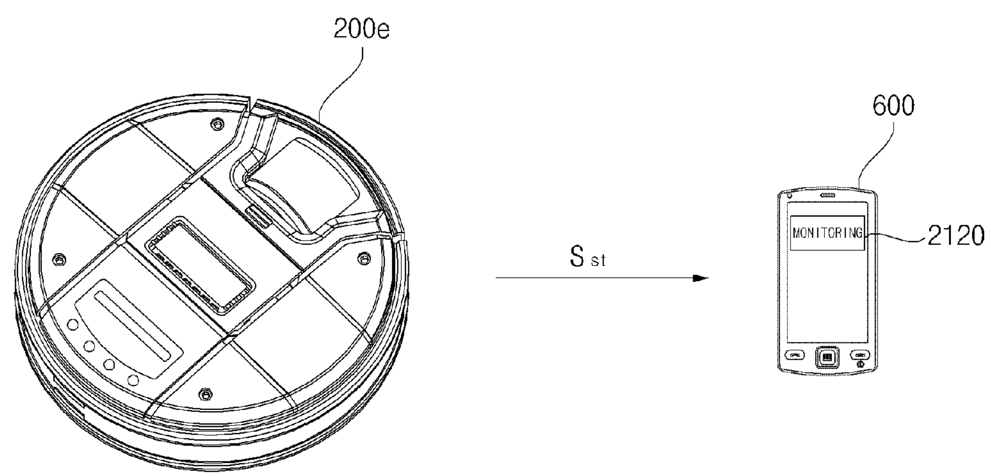
FIG. 21*b* is a view referred to for describing the operating method of FIG. 14 or 15.
Figure 21C:
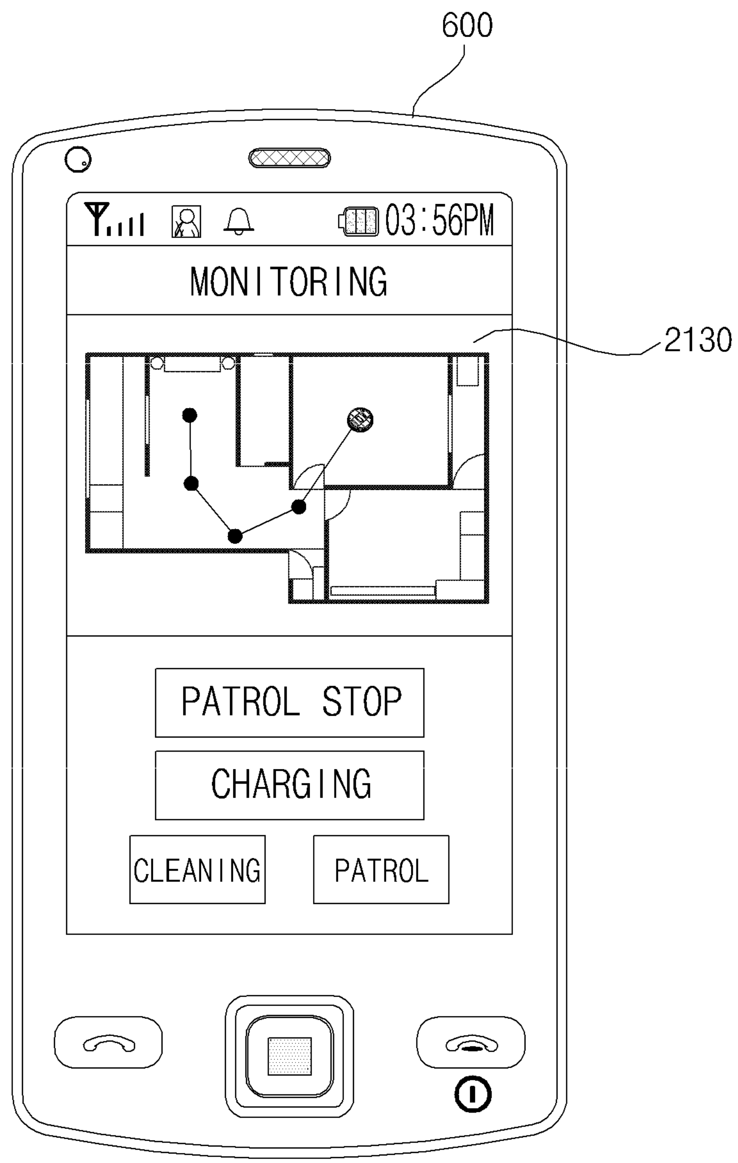
FIG. 21*c* is a view referred to for describing the operating method of FIG. 14 or 15.

FIGS. 21*a* to 21*c* show the case in which, if the mobile terminal 600 is tagged to the cleaner 200*e* in a state of displaying the monitoring screen on the mobile terminal 600, the operation state information Sst of the cleaner 200*e* is transmitted to the mobile terminal 600 and the mobile terminal 600 displays the operation state information Sst of the cleaner 200*e*.

FIG. 21*a* shows the case in which the mobile terminal 600 approaches the cleaner 200*e* in a state in which an application related to the cleaner 200*e* is executed and a monitoring screen 2120 related to the cleaner 200*e* is displayed, that is, the case in which tagging is performed.

As shown in FIG. 21*b*, the operation state information Sst of the cleaner 200*e* may be transmitted to the mobile terminal 600.

As shown in FIG. 21*c*, the mobile terminal 600 may display the operation state information Sst of the cleaner 200*e*.

FIG. 21*c* shows an operation state display screen 2130 of the cleaner 200*e*. Although the operation state display screen 2130 of the cleaner 200*e* includes movement path information of the cleaner, a patrol stop item, a charging item, a cleaning item and a patrol item of the cleaner, various modifications are possible. Via the operation state information screen 2130 of the cleaner 200*e*, the user can conveniently confirm the operation state of the cleaner 200*e*.

Figure 22A:
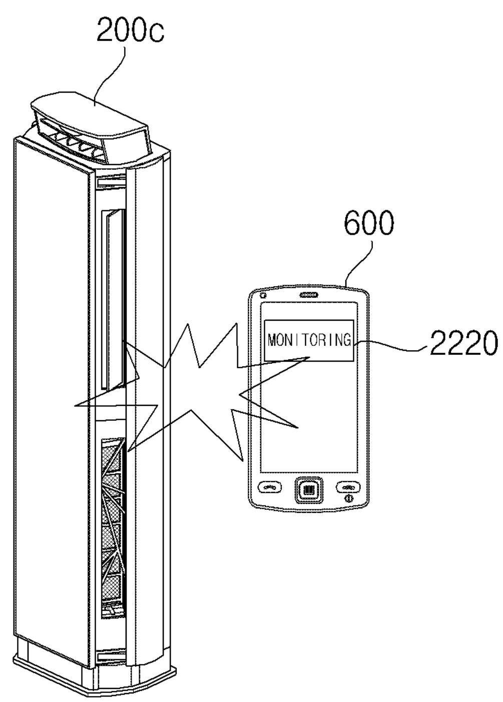
FIG. 22*a* is a view referred to for describing the operating method of FIG. 14 or 15.
Figure 22B:
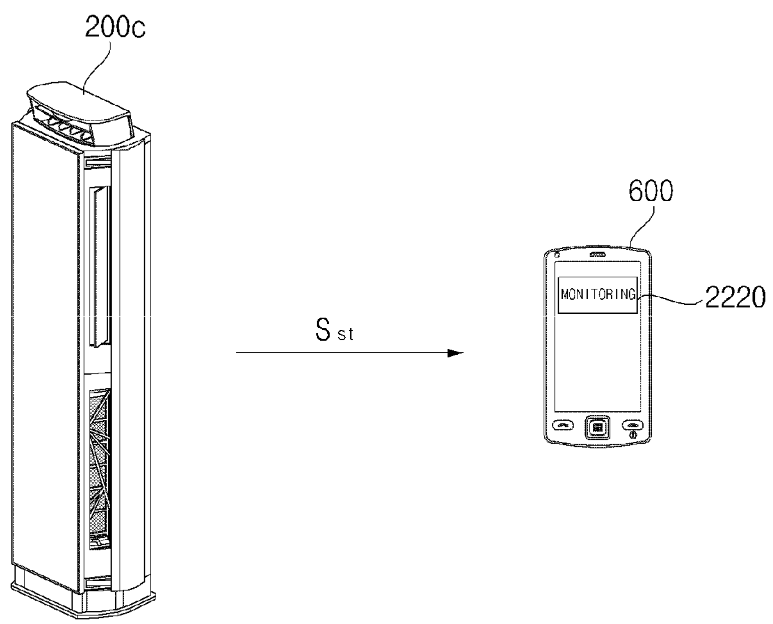
FIG. 22*b* is a view referred to for describing the operating method of FIG. 14 or 15.
Figure 22C:
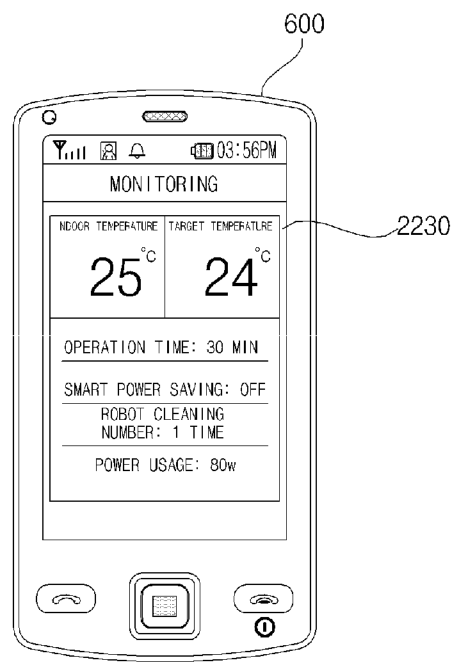
FIG. 22*c* is a view referred to for describing the operating method of FIG. 14 or 15.

FIGS. 22*a* to 22*c* show the case in which, if the mobile terminal 600 is tagged to the air conditioner 200*c* in a state of displaying the monitoring screen on the mobile terminal 600, the operation state information Sst of the air conditioner 200*c* is transmitted and the mobile terminal 600 displays the operation state information Sst of the air conditioner 200*c*.

FIG. 22*a* shows the case in which the mobile terminal 600 approaches the air conditioner 200*c* in a state in which an application related to the air conditioner 200*c* is executed and a monitoring screen 2220 related to the air conditioner 200*c* is displayed, that is, the case in which tagging is performed.

As shown in FIG. 22*b*, the operation state information Sst of the air conditioner 200*c* may be transmitted to the mobile terminal 600.

As shown in FIG. 22*c*, the mobile terminal 600 may display the operation state information Sst of the air conditioner 200*c*.

FIG. 22*c* shows an operation state display screen 2230 of the air conditioner 200*c*. Although the operation state display screen 2230 of the air conditioner 200*c* includes indoor temperature information, target temperature information, operation time information, smart power-saving operation information, information about the number of times of robot cleaning and power usage information, various modifications are possible. Via the operation state information screen 2230 of the air conditioner 200*c*, the user can conveniently confirm the operation state of the air conditioner 200*c*.

Figure 22D:
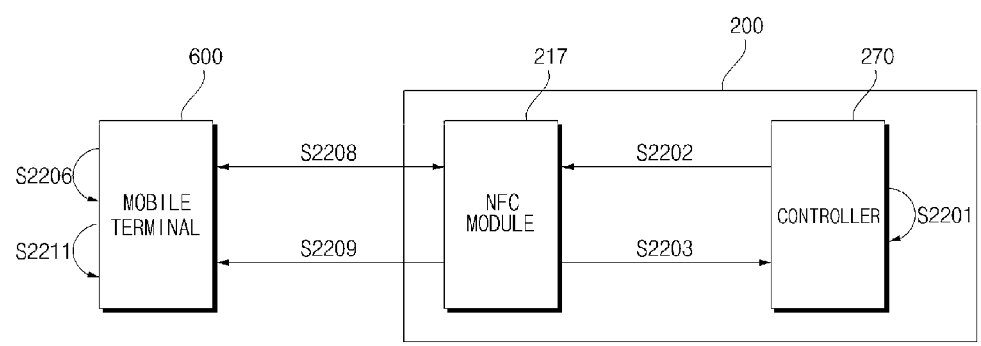
FIG. 22*d* is a view referred to for describing the operating method of FIG. 14 or 15.
Figure 22E:
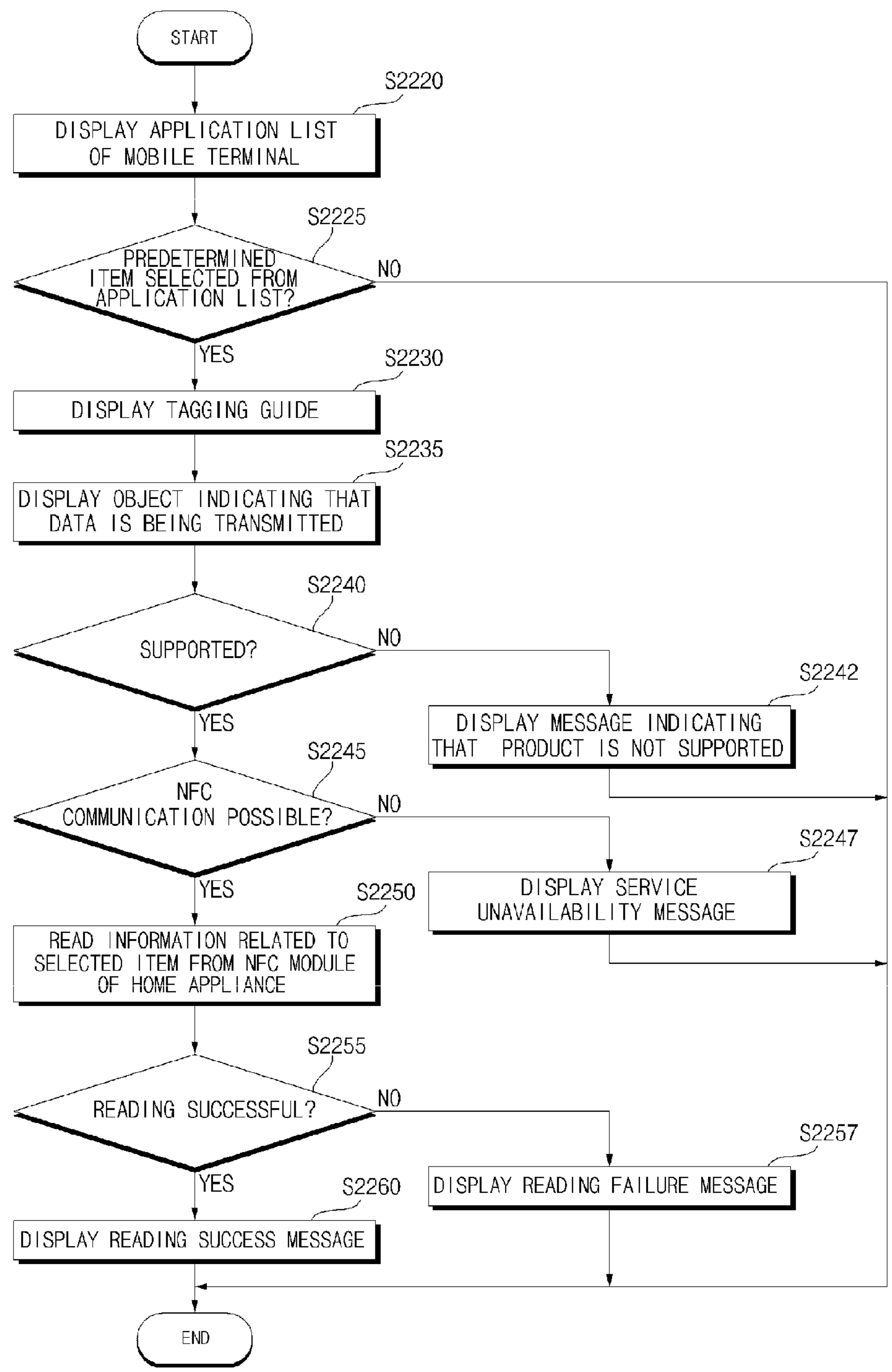
FIG. 22*e* is a view referred to for describing the operating method of FIG. 14 or 15.

FIGS. 22*d* to 22*e* are views referred to for describing transmission of a variety of information from the home appliance 200 to the mobile terminal 600 described with reference to FIGS. 16*a* to 22*c*.

First, FIG. 22*d* is a block diagram showing the internal configuration of the mobile terminal 600 and the home appliance 200.

Referring to FIG. 22*d*, the controller 270 of the home appliance 200 confirms the state of the home appliance (S2201). For example, failure of the home appliances or the monitoring state of the home appliance is confirmed to obtain state information.

Next, the controller 2870 of the home appliance 200 writes the obtained state information in the memory 218 of the NFC module 217 of the home appliance (S2202). Then, the written result is received (S2203).

Next, the mobile terminal 600 may execute a NFC application by user input (S2206). The NFC application may include various items for performing NFC operation. For example, the NFC application may include an NFC diagnosis item, a monitoring item, etc. If any one of the various NFC items is selected by user input, the mobile terminal 600 may display a screen corresponding to the selected item.

For example, if the NFC diagnosis item is selected, as shown in FIG. 17*b*, the NFC diagnosis screen 1720 may be displayed. As another example, if the monitoring item is selected, as shown in FIG. 16*b*, the monitoring screen 1620 may be displayed.

In a state in which the screen is displayed and an NFC transmission item (not shown) displayed on the display of the mobile terminal 600 is selected, the mobile terminal 600 may approach the home appliance 200 within a predetermined distance. That is, NFC tagging may be performed (S2204).

By NFC tagging, the NFC module 217 of the home appliance 200 transmits product information including product type, product state, product name, etc. to the mobile terminal 600, more particularly, to the NFC module 617 of the mobile terminal 600 (S1305).

The mobile terminal 600 performs authentication if the received product information is pre-registered product information and reads the information written in the memory 210 of the NFC module 217 of the home appliance 200 (S2209). Then, the mobile terminal 600 displays the read information on the display (S2211).

Next, FIG. 22*e* is a flowchart illustrating a method for operating the mobile terminal 600 upon NFC between the mobile terminal 600 and the home appliance 200.

First, the mobile terminal 600 may execute an NFC application by user input and display an executed application list (S2220). Step S2220 may correspond to step S2206 of FIG. 22*d*.

The NFC application list may include various items for performing NFC operation. For example, the NFC application list may include an NFC diagnosis item, a monitoring item, etc.

Next, the mobile terminal 600 may determine whether any one of the various NFC items is selected by user input (S2225) and display a tagging guide (S2225).

If tagging is performed, the mobile terminal 600 receives product information including a product type, a product state, a product name, etc. from the NFC module 217 of the home appliance 200. Then, an object indicating that data is being transmitted may be displayed on the display (S2235).

The mobile terminal 600 determines whether a product is capable of performing NFC via the received product information (S2240) and, if not, outputs, on the display, a message indicating that the product is unsupported (S2242). For example, the message indicating that the product is unsupported may be displayed on the display or may be output via the audio output unit as audio. If the product is capable of performing NFC, it is determined whether NFC communication is possible (S2245) and, if not, a service unavailability message may be displayed (S2247). If so, information related to the selected NFC item is read from the NFC module 217 of the home appliance 200 (S2250). At this time, CRC data may be transmitted along with the information related to the selected NFC item.

The mobile terminal 600 may determine whether reading is successful by checking the received CRC data (S2255). If reading fails, a reading failure message may be output (S2257). If reading is successful, the mobile terminal 600 may output a reading success message (S2260). Thus, the user can conveniently read desired data of the home appliance 200 from the mobile terminal 600.

Although not shown in the figure, by tagging between the washing machine 200*b* and the mobile terminal 600, a detergent type or a fabric softener type used for the washing machine 200*b* may be determined.

Although not shown in the figure, by tagging between the air conditioner 200*c* and the mobile terminal 600, reserved operation setting of the air conditioner 200*c* using a calendar may be determined.

Although not shown in the figure, by tagging between the cooker 200*d* and the mobile terminal 600, a shopping list of food to be cooked using the cooker 200*d* may be determined.

The mobile terminal, the home appliance and the method for operating the same according to the foregoing embodiments are not restricted to the embodiments set forth herein. Therefore, variations and combinations of the exemplary embodiments set forth herein may fall within the scope of the present invention.

The method for operating the mobile terminal or the home appliance of present invention may be implemented as code that can be written to a computer-readable recording medium and can thus be read by a processor included in an image display apparatus. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Figure 23:
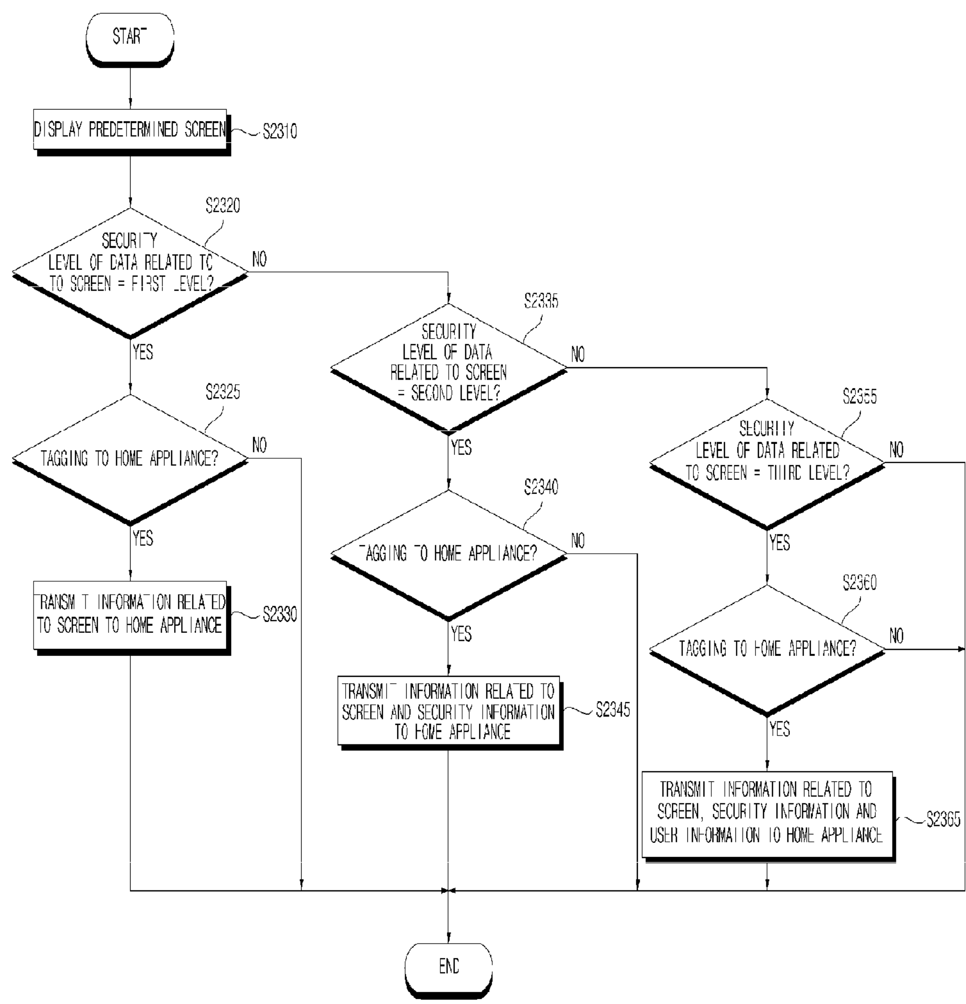
FIG. 23 is a flowchart illustrating a method for operating a mobile terminal according to another embodiment of the present invention.
Figure 24:
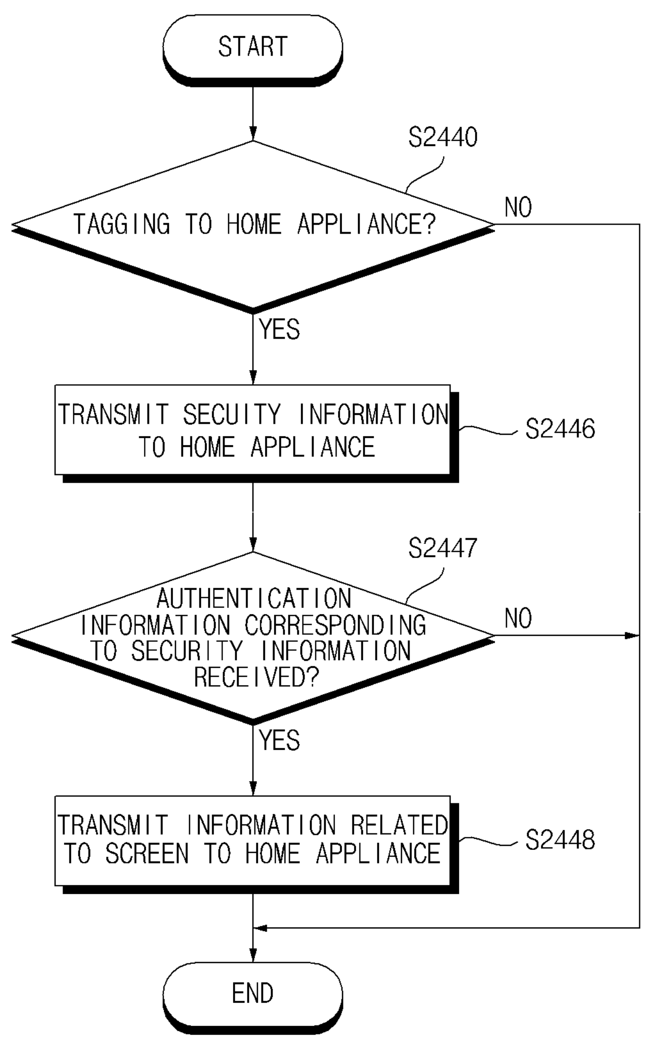
FIG. 24 is a flowchart illustrating a method for operating a home appliance according to another embodiment of the present invention.
Figure 25:
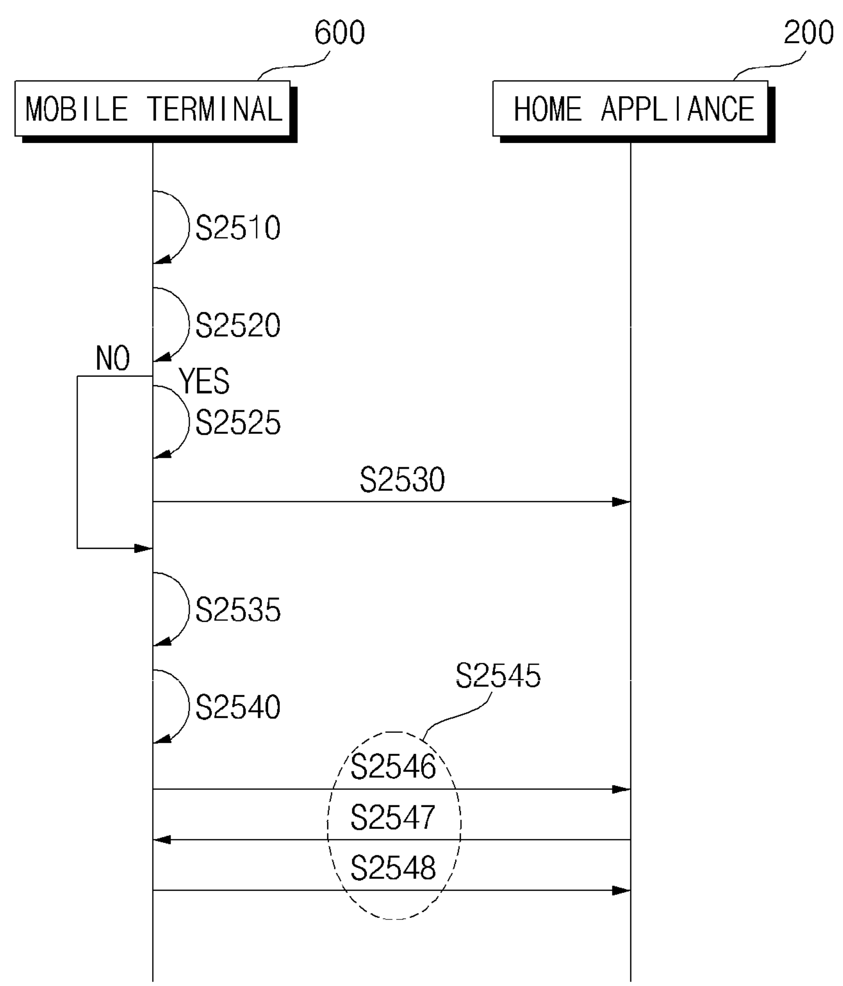
FIG. 25 is a view referred to for describing the operating method of FIG. 23 or 24.

FIG. 23 is a flowchart illustrating a method for operating a mobile terminal according to another embodiment of the present invention, FIG. 24 is a flowchart illustrating a method for operating a home appliance according to another embodiment of the present invention, and FIGS. 25 to 27*c* are views referred to for describing the operating method of FIG. 23 or 24.

First referring to FIG. 23, the mobile terminal 600 displays a predetermined screen on the display (S2310). Step 2510 of FIG. 25 corresponds to step S2310 of FIG. 23. For step S2310, refer to description of step S710 of FIG. 7.

Next, the mobile terminal 100 determines whether a security level of data related to the displayed screen is a first level (S2320). If so, whether tagging to the home appliance is performed is determined (S2325). If so, information related to the screen displayed on the mobile terminal 600 is transmitted to the home appliance (S2330). Step S2520 of FIG. 25 corresponds to step S2320 of FIG. 23, step S2525 of FIG. 25 corresponds to step S2325 of FIG. 23, and step S2530 of FIG. 25 corresponds to step S2330 of FIG. 23.

The controller 680 of the mobile terminal 600 may determine the security level of the data related to the displayed screen in correspondence with the displayed screen.

For example, if the screen displayed on the mobile terminal 600 is a power information screen or a recipe related screen related to the home appliance, the controller 680 of the mobile terminal 600 may determine that the security level of the power information or recipe information related to the home appliance 200 is the lowest first level.

The NFC module 617 of the mobile terminal 600 may transmit the power information or the recipe information related to the home appliance 200 to the home appliance 200 without transmitting separate security information, if tagging to the home appliance is performed in a state in which the security level of the data related to the displayed screen is the first level.

Next, if the security level of the data related to the displayed screen is not the first level in step S2320, step S2335 and subsequent steps thereof will be performed.

That is, the mobile terminal 600 determines whether the security level of the data related to the displayed screen is a second level (S2335). If so, it is determined whether tagging to the home appliance is performed (S2340). If so, the information related to the screen displayed on the mobile terminal 600 and the security information are transmitted to the home appliance (S2345). Step S2535 of FIG. 25 corresponds to step S2335 of FIG. 23, step S2540 of FIG. 25 corresponds to step S2440 of FIG. 24 and step S2340 of FIG. 23, and step S2545 of FIG. 25 corresponds to step S2445 of FIG. 24 and step S2345 of FIG. 23.

The controller 680 of the mobile terminal 600 may determine the security level of the data related to the displayed screen in correspondence with the displayed screen.

For example, if the screen displayed on the mobile terminal 600 is an operation course screen or operation course list screen related to the home appliance, a firmware screen related to the home appliance or an access point device list screen, the controller 680 of the mobile terminal 600 may determine that the security level of the operation course screen or operation course list screen related to the home appliance 200, the firmware screen information related to the home appliance or the access point device list screen information is a high second level.

Then, if tagging to the home appliance is performed in a state in which the security level of the data related to the displayed screen is the second level, the NFC module 617 of the mobile terminal 600 first transmits the security information to the home appliance 200 before transmitting the information related to the home appliance (S2446). Then, if authentication information corresponding to the security information is received from the home appliance 200 (S2447), the NFC module 617 of the mobile terminal 600 transmits the information related to the screen to the home appliance (S2248). Step S2546 of FIG. 25 corresponds to step S2446 of FIG. 24, step S2547 of FIG. 25 corresponds to step S2447 of FIG. 24, and step S2548 of FIG. 25 corresponds to step S2448 of FIG. 24.

At this time, if the authentication information corresponding to the security information is not received from the home appliance 200 after transmitting the security information to the home appliance 200, the NFC module 617 of the mobile terminal 600 does not transmit the information related to the screen to the home appliance. Thus, it is possible to selectively transmit the information between the home appliance 200 and the mobile terminal 600.

If the mobile terminal 600 is tagged to the washing machine 200*b* in a state of displaying a washing course screen on the mobile terminal 600, first the security information Ssea is transmitted to the washing machine 200*b*, the authentication information Soka corresponding to the security information Ssea is transmitted to the mobile terminal 600, the washing course information Scos is transmitted to the washing machine 200*b*, and the washing machine 200*b* may operate in correspondence with the washing course information Scos.

The operation based on tagging between the mobile terminal 600 and the washing machine 200*b* in a state of displaying the washing course screen on the mobile terminal 600 is similar to FIGS. 12*a* to 12*e*. Unlike FIG. 12*d*, the mobile terminal 600 may transmit the security information and the washing machine 200*b* may receive the security information and transmit the washing course information to the washing machine 200*b*.

Figure 26:
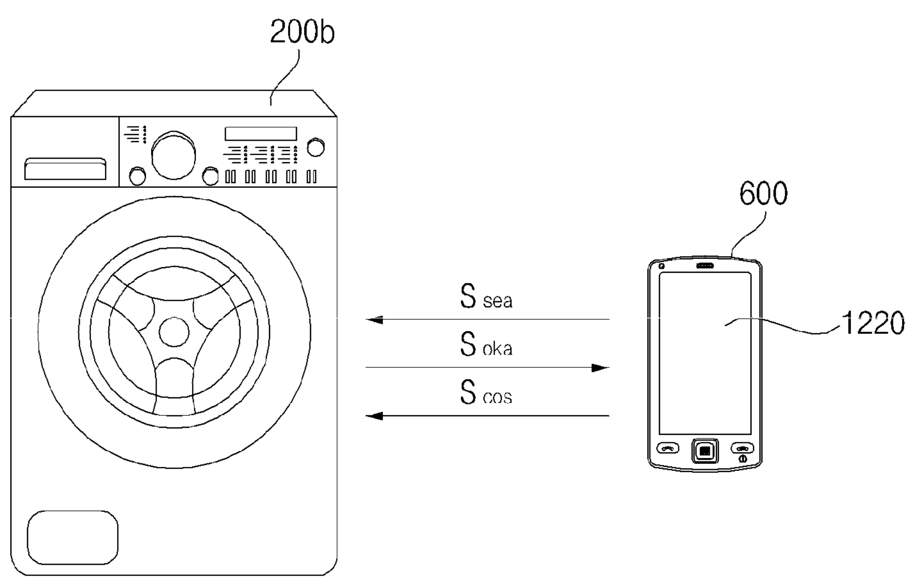
FIG. 26 is a view referred to for describing the operating method of FIG. 23 or 24.

As shown in FIG. 26, the mobile terminal 60 may first transmit the security information Ssea to the washing machine 200*b*, receive the authentication information Soka corresponding to the security information Ssea from the washing machine 200*b*, and transmit the washing course information Scos to the washing machine 200*b*.

If the authentication information corresponding to the security information is not received from the home appliance 200 after transmitting the security information to the home appliance 200, the mobile terminal 600 does not transmit the information related to the screen to the home appliance. Thus, it is possible to selectively transmit the information between the home appliance 200 and the mobile terminal 600.

Here, the security information may be encrypted code information and the authentication information may be encrypted code information corresponding to the security information. For security information transmission and authentication information reception, the mobile terminal

600 and the home appliance 200 may pre-store the security information and the authentication information, respectively. The mobile terminal 600 may transmit the security information as necessary and the home appliance 200 may transmit the authentication information as necessary.

The mobile terminal 600 may transmit the washing course information Scos related to "course a" to the NFC module 217 of the washing machine 200*b* after receiving the authentication information Soka. Here, the washing course information Scos related to "course a" includes time information such as a washing cycle of 60 min, a rinsing cycle of 20 min and a dehydration cycle of 10 min.

Figure 27A:
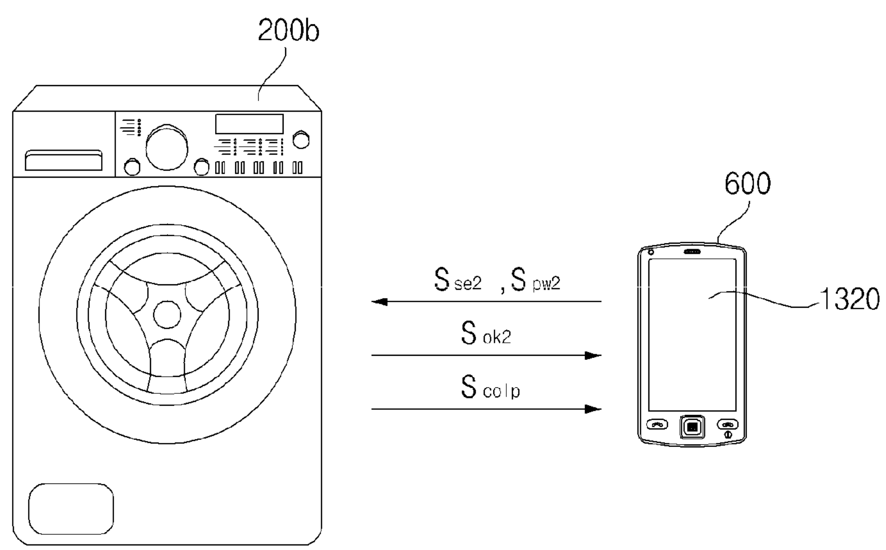
FIG. 27*a* is a view referred to for describing the operating method of FIG. 23 or 24.

The operation based on tagging between the mobile terminal 600 and the washing machine 200*b* in a state of displaying the washing course list screen on the mobile terminal 600 is similar to FIGS. 13*a* to 13*d*. After the operation of FIG. 13*d*, the operation of FIG. 27*a* is performed instead of the operation of FIG. 13*e* and operations of FIG. 27*b* to FIG. 27*c* may be further performed after the operation of FIG. 27*a*. Since FIGS. 13*a* to 13*d* have been described above, FIGS. 27*a* to 27*c* will now be described.

As shown in FIG. 13*d*, if the mobile terminal 600 approaches the washing machine 200*b* within a predetermined distance in a state in which the washing course list screen 1320 is displayed on the mobile terminal 600 and the washing course list Scol is downloaded from the server 500, that is, if tagging is performed, the operation of FIG. 27*a* may be performed.

That is, as shown in FIG. 27*a*, the mobile terminal 600 may first transmit security information Sse1 to the washing machine 200*b* via NFC, receive authentication information Sok1 corresponding to the security information Sse1 from the washing machine 200*b*, and transmit washing course list information Scol to the washing machine 200*b*. The washing course list Scol may include plural pieces of new washing course information.

At this time, if the authentication information corresponding to the security information is not received from the home appliance 200 after transmitting the security information to the home appliance 200, the mobile terminal 600 does not transmit the information related to the screen to the home appliance. Thus, it is possible to selectively transmit the information between the home appliance 200 and the mobile terminal 600.

The washing machine 200*b* may store the received washing course list Scol in a memory (not shown) and update an existing washing course list using the received washing course list Scol. Thus, the user can conveniently update the washing course list of the washing machine 200*b*.

Similarly, the firmware of the home appliance may be upgraded.

Similarly, network information of an access point device may be transmitted to the home appliance 200. That is, after security information transmission and authentication information reception, the network information of the access point device may be transmitted to the home appliance 200.

If the home appliance 200 includes a communication module such as a Wi-Fi module, the home appliance 200 may wirelessly access an adjacent access point (AP) device using the received network information, thereby increasing user convenience.

Figure 27B:
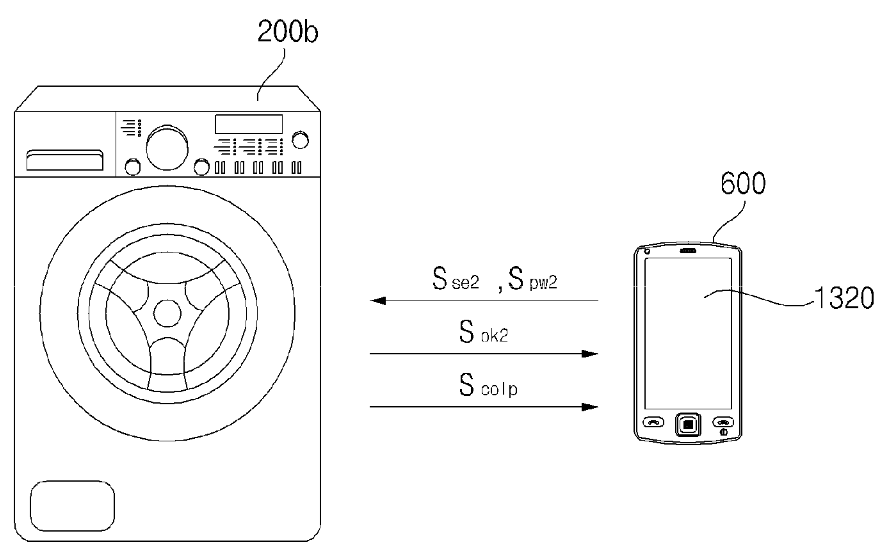
FIG. 27*b* is a view referred to for describing the operating method of FIG. 23 or 24.
Figure 27C:
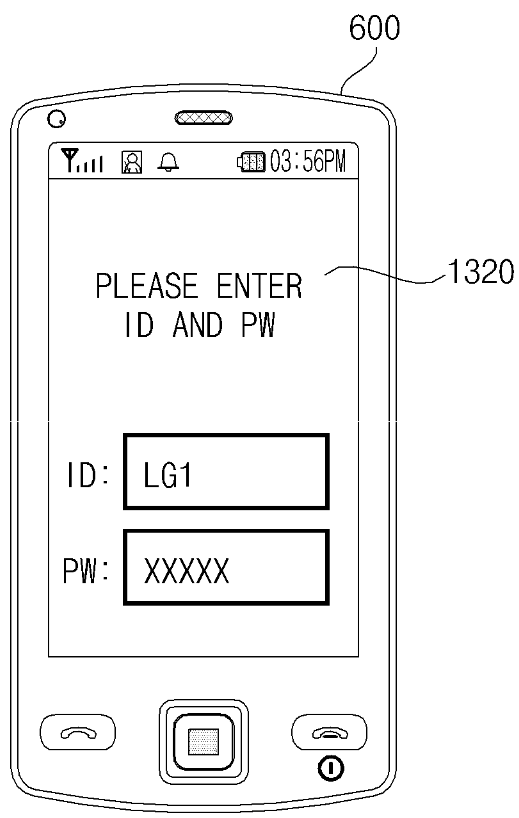
FIG. 27*c* is a view referred to for describing the operating method of FIG. 23 or 24.

FIG. 27*b* and FIG. 27*c* show the case in which, if tagging to the home appliance 200 is performed in a state in which the security level of the data related to the screen displayed on the mobile terminal 600 is a third level, security information and user information are first transmitted to the home appliance 200, authentication information corresponding thereto is received from the home appliance 200, and the data related to the screen is transmitted to the home appliance 200.

That is, in FIG. 13*d*, on the assumption that the mobile terminal 600 is tagged to the washing machine 200*b* in a state of displaying the washing course list screen 1320 for a specific user on the mobile terminal 600, as shown in FIG. 27, the mobile terminal 600 may first transmit security information Sse2 and user information Spw2 to the washing machine 200*b* via NFC, receives authentication information Sok2 corresponding to the security information Sse2 and the user information Spw2 from the washing machine 200*b*, and transmit washing course list information Scolp for the specific user to the washing machine 200*b*. The washing course list information may include plural pieces of new washing course information for the specific user.

At this time, if the authentication information corresponding to the security information Sse2 and the user information Spw2 are not received from the home appliance 200 after transmitting the security information Sse2 and the user information Spw2 to the home appliance 200, the mobile terminal 600 does not transmit the information related to the screen to the home appliance. Thus, it is possible to selectively transmit the information between the home appliance 200 and the mobile terminal 600.

The user information Spw2 may be pre-stored individual user information as shown in FIG. 27*c*. The user information Spw2 may include ID information and password information. FIG. 27*c* shows an individual user information input screen 1320 for inputting ID information and password information. Thus, the user information SPw2 of FIG. 27*b* may be transmitted upon tagging.

Figure 28:
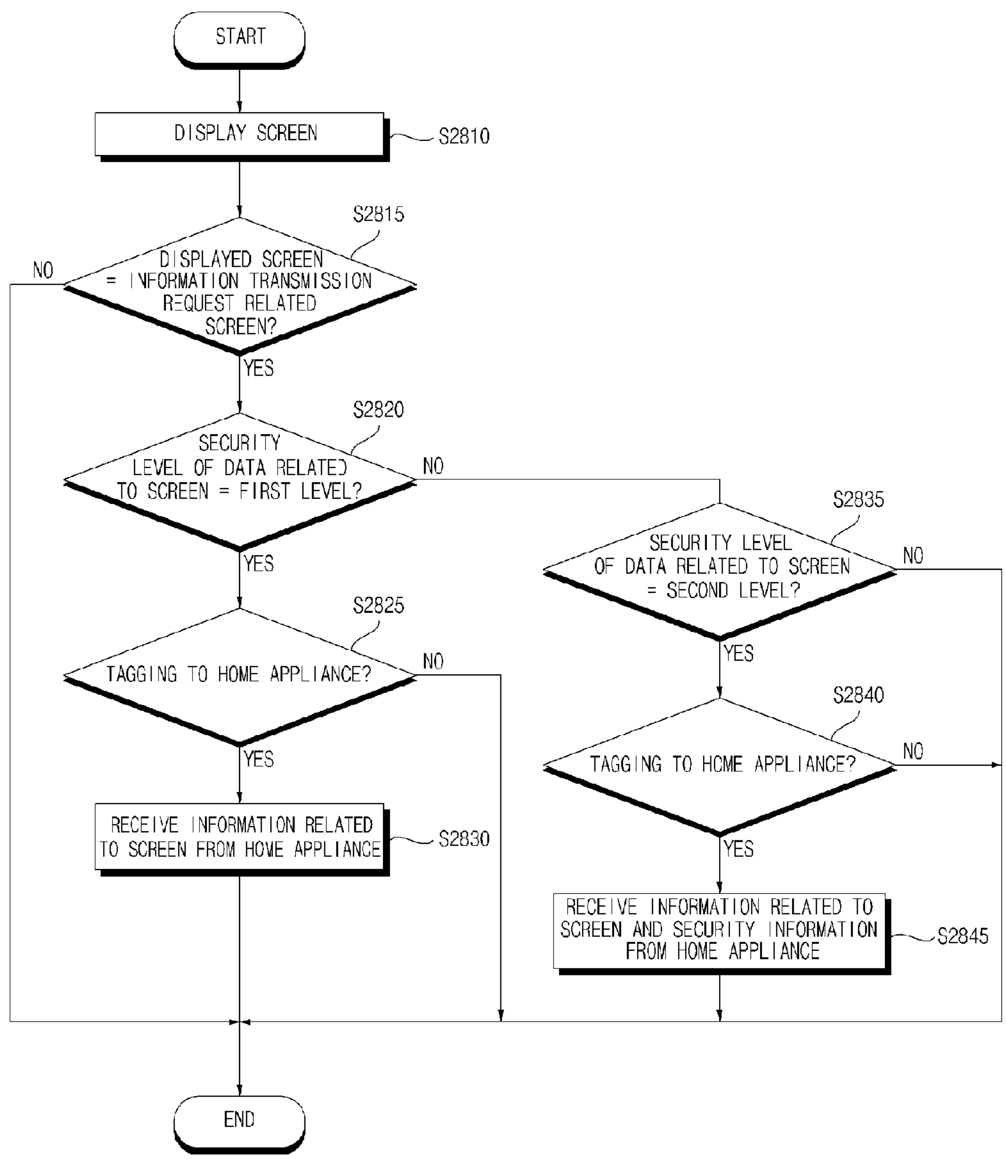
FIG. 28 is a flowchart illustrating a method for operating a mobile terminal according to another embodiment of the present invention.
Figure 29:
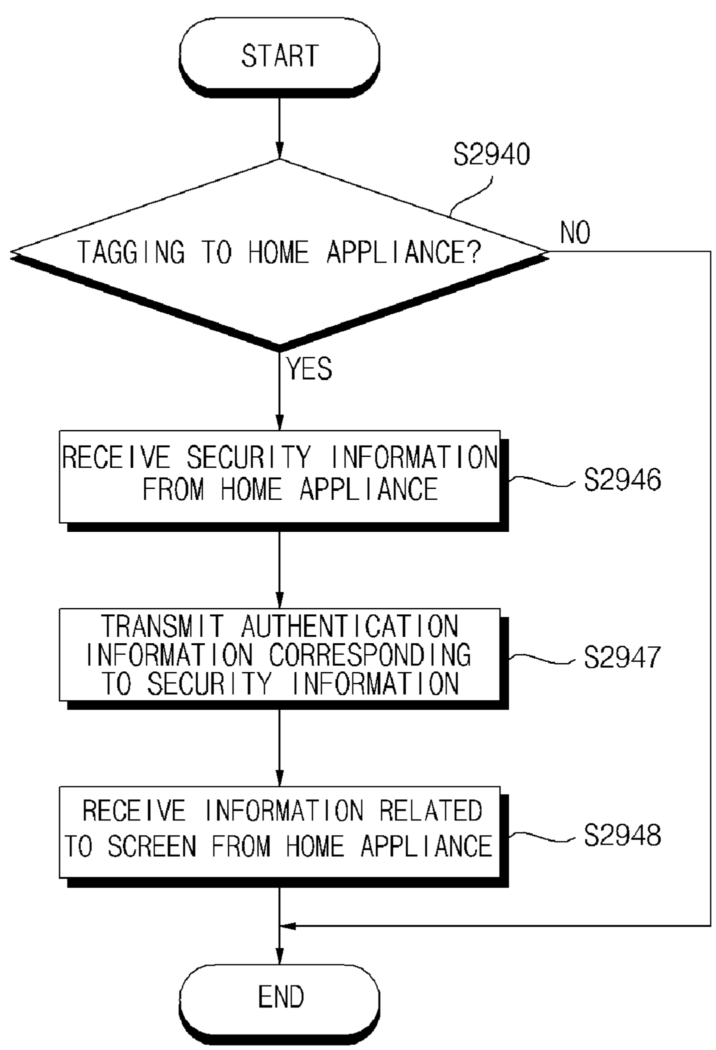
FIG. 29 is a flowchart illustrating a method for operating a home appliance according to another embodiment of the present invention.
Figure 30:
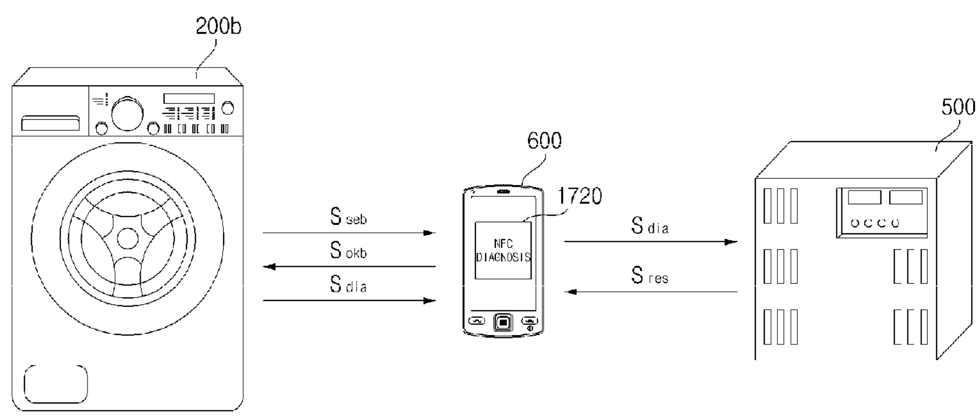
FIG. 30 is a view referred to for describing the operating method of FIG. 28 or 29.

FIG. 28 is a flowchart illustrating a method for operating a mobile terminal according to another embodiment of the present invention, FIG. 29 is a flowchart illustrating a method for operating a home appliance according to another embodiment of the present invention, and FIG. 30 is a view referred to for description of the operating method of FIG. 28 or 29.

The method for operating the mobile terminal of FIG. 28 is different from the method for operating the mobile terminal of FIG. 23 in that the data related to the screen is transmitted from the home appliance 200 to the mobile terminal 600.

First, referring to FIG. 28, the mobile terminal 600 displays a predetermined screen on the display (S2810). In particular, the controller 680 of the mobile terminal controls display of the screen such as a web page or an application screen in correspondence with user input.

For example, the mobile terminal 600 may display a monitoring screen for monitoring the home appliance or a failure diagnosis screen for failure diagnosis of the home appliance according to user input.

Next, the mobile terminal 600 determines whether the displayed screen is an information transmission request related screen which needs to receive information from the home appliance (S2815). If so, whether the security level of the data related to the displayed screen is a first level is determined (S2820). If so, whether tagging to the home appliance is performed is determined (S2825). If so, information related to the screen displayed on the mobile terminal 600 is received from the home appliance (S2830).

The controller 680 of the mobile terminal 600 determines whether the displayed screen is an information transmission request related screen which needs to receive the information from the home appliance. For example, if the displayed screen is a monitoring screen or a failure diagnosis screen for failure diagnosis of the home appliance, it may be determined that the displayed screen is the information transmission request related screen which needs to receive the information from the home appliance.

The controller 680 of the mobile terminal 600 may determine the security level of the data related to the displayed screen.

For example, if the screen displayed on the mobile terminal 600 is a monitoring screen, it may be determined that the security level of the monitoring information to be received from the home appliance is a lowest first level.

As another example, if the screen displayed on the mobile terminal 600 is a failure diagnosis screen, it may be determined that the failure diagnosis information to be received from the home appliance is a high second level.

If tagging to the home appliance is performed in a state in which the security level of the data related to the displayed screen is the first level, the NFC module 617 of the mobile terminal 600 may receive, from the home appliance 200, the monitoring information related to the home appliance 200 without receiving separate security information.

Unlike FIG. 28, the determination as to whether the security level of the data related to the screen is the first level may be made by the controller 270 of the home appliance 200.

That is, upon tagging between the mobile terminal and the home appliance, the mobile terminal 600 may transmit an information request related to the screen to the home appliance 200 and the home appliance 200 may determine that the security level of the information related to the screen is the first level if the information related to the screen is a monitoring information request and immediately transmit the monitoring information to the mobile terminal 600 without transmitting separate security information.

Next, if the security level of the data related to the displayed screen is not the first level in step S2820, step S2825 and subsequent steps thereof are performed.

That is, the mobile terminal 600 determines whether the security level of the data related to the displayed screen is a second level (S2835). If so, whether tagging to the home appliance is performed is made (S2840). If so, the information related to the screen displayed on the mobile terminal 600 and the security information are transmitted to the home appliance (S2845).

The controller 680 of the mobile terminal 600 may determine the security level of the data related to the displayed screen, in correspondence with the displayed screen.

For example, if the screen displayed on the mobile terminal 600 is a failure diagnosis screen related to the home appliance, the controller 680 of the mobile terminal 600 may determine that the security level of the failure diagnosis information related to the home appliance is a high second level.

Then, if tagging to the home appliance is performed in a state in which the security level of the data related to the displayed screen is the second level, the NFC module 617 of the mobile terminal 600 first receives the security information from the home appliance (S2846) before receiving the related information from the home appliance. Then, the authentication information corresponding to the security information is transmitted to the home appliance 200 (S2847). After transmitting the authentication information, the NFC module 617 of the mobile terminal 600 receives the information related to the screen from the home appliance (S2848).

At this time, if the authentication information is not transmitted to the home appliance 200 after receiving the security information from the home appliance 200, the NFC module 617 of the mobile terminal 600 does not receive the information related to the screen from the home appliance. Thus, it is possible to selectively transmit the information between the home appliance 200 and the mobile terminal 600.

Unlike FIG. 28, a determination as to whether the security level of the data related to the screen is the second level may be made by the controller 270 of the home appliance.

That is, upon tagging between the mobile terminal and the home appliance, the mobile terminal 600 may transmit an information request related to the screen to the home appliance 200 and the home appliance 200 may determine that the security level is the second level if the information related to the screen is a failure diagnosis information request, transmit the security information and transmit failure diagnosis information to the mobile terminal 600 once the authentication information is received.

As shown in FIG. 17*a*, if the mobile terminal 600 is tagged to the washing machine 220*b* in a state in which the an NFC diagnosis screen is displayed on the mobile terminal 600, first, security information Sseb may be transmitted to the mobile terminal 600, authentication information Sokb corresponding to the security information Sseb may be transmitted from the mobile terminal 600 to the washing machine 200*b*, and failure diagnosis information Sdia may be transmitted to the mobile terminal 600.

If the mobile terminal 600 approaches the washing machine 200*b* in a state of displaying the NFC diagnosis screen 1720 related to the washing machine 200*b*, as shown in FIG. 30, the washing machine 200*b* may transmit the security information Sseb to the mobile terminal 600, receive the authentication information Soka corresponding to the security information Sseb from the mobile terminal 600, and transmit the failure diagnosis information Sdia to the mobile terminal 600.

If the authentication information corresponding to the security information is not received from the mobile terminal 600 after transmitting the security information to the mobile terminal 600, the home appliance 200 does not transmit the information related to the screen to the mobile terminal 600. Thus, it is possible to selectively transmit the information between the home appliance 200 and the mobile terminal 600.

Here, the security information may be encrypted code information and the authentication information may be encrypted code information corresponding to the security information. For security information transmission and authentication information reception, the mobile terminal 600 and the home appliance 200 may pre-store the security information and the authentication information, respectively. The mobile terminal 600 may transmit the security information as necessary and the home appliance 200 may transmit the authentication information as necessary.

According to FIG. 30, the failure information Sdia of the washing machine 200*b* may be transmitted to the mobile terminal 600 and the mobile terminal 600 may transmit the failure information Sdia of the washing machine 200*b* to the server 200. The mobile terminal 600 may receive the failure diagnosis result information Sres from the server 500.

The failure result information 1730 based on the washing machine failure result information Sres of FIG. 30 may be displayed on the display as shown in FIG. 17*c*.

Upon tagging between the mobile terminal 600 and the refrigerator 200*a*, the information may be transmitted without transmitting separate security information or authentication information. This has been described above with reference to FIGS. 18*a* to 18*c*.

Although not shown in the figure, if a monitoring screen or failure diagnosis screen for a specific user is displayed on the mobile terminal 600, it may be determined that the security level is the third level and separate security information and user information may be transmitted from the home appliance 200 to the mobile terminal 600 for screen related information reception, similarly to FIGS. 27*b* and 27*c*.

Figure 31:
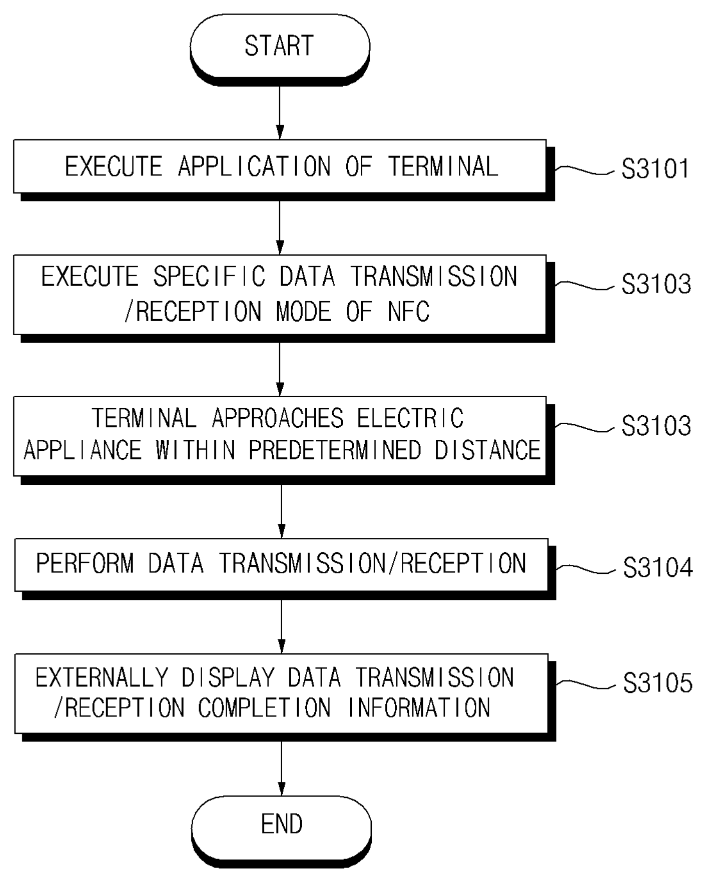
FIG. 31 is a flowchart illustrating a method for controlling a home appliance according to another embodiment of the present invention.

FIG. 31 is a flowchart illustrating a method for controlling a home appliance according to another embodiment of the present invention. Referring to FIG. 31, the method for controlling the home appliance using the terminal will be described.

First, an application of the terminal 600 may be executed. The application may be executed in a state in which an "NFC mode" among a plurality of communication modes defined in the terminal 600 is ON. If the application is attempted to be executed in a state in which the "NFC mode" is OFF, a message (screen or audio) indicating that the "NFC mode" should be turned on may be output via the terminal 600.

If the application is executed, the terminal 600 may receive internally generated information of the home appliance 200 or transmit information (externally generated information) necessary to operate the home appliance 200 to the home appliance 200 (S3101).

Then, the application includes a plurality of modes capable of transmitting or receiving data using an NFC method.

Among the plurality of modes, a specific data transmission/reception mode may be performed.

A first transmission/reception mode may be a mode for transmitting internally generated information (internal information) of the home appliance 200 to the terminal 600.

For example, if errors occur in operation of the home appliance 200, the first transmission/reception mode may be a mode for transmitting information about errors or information about an error diagnosis result to the terminal 600.

A second transmission/reception mode may be a mode for receiving externally generated information (external information) necessary to operate the home appliance from the terminal 600.

For example, the second transmission/reception mode may be a mode for transmitting information about an operation course of the home appliance 200 from the terminal 600 to the home appliance 200. If the home appliance 200 is a washing machine, information about the operation course is information about a washing course and, if the home appliance 200 is a cooker, the information about the operation course is information about a cooking course (S3102).

In a state of executing the specific data transmission/reception mode, the terminal 600 approaches the home appliance 200 within a predetermined distance such that a module recognizer 211 recognizes the first communication module 617. That is, the terminal 600 may be tagged to the home appliance 200 (S3103).

If the module recognizer 211 recognizes the first communication module 617, data transmission/reception may be performed. That is, the internally generated information of the home appliance 200 may be transmitted from the home appliance 200 to the terminal 600 or the externally generated information may be transmitted from the terminal 600 to the home appliance 200.

In the process of transmitting the data, that is, the internally generated information or the externally generated information, information about the progress of data transmission or reception may be displayed on the display 6510 of the terminal 600 (S3104).

If transmission of the internally generated information or the externally generated information has been completed, information indicating that data transmission/reception has been completed may be externally displayed. For example, a transmission completion message may be displayed on the display 206 of the home appliance 200 or the display 651 of the terminal 600 or sound (beeper) may be externally output.

For example, if transmission of the information about errors or the information about the error diagnosis result in the internally generated information to the terminal 600 has been completed, information about the error diagnosis result or a diagnosis completion message may be displayed on the display 651 of the terminal 600 (S3105).

Hereinafter, the control methods which differ according to the type of transmitted information will be described in detail with reference to the drawings.

Figure 32:
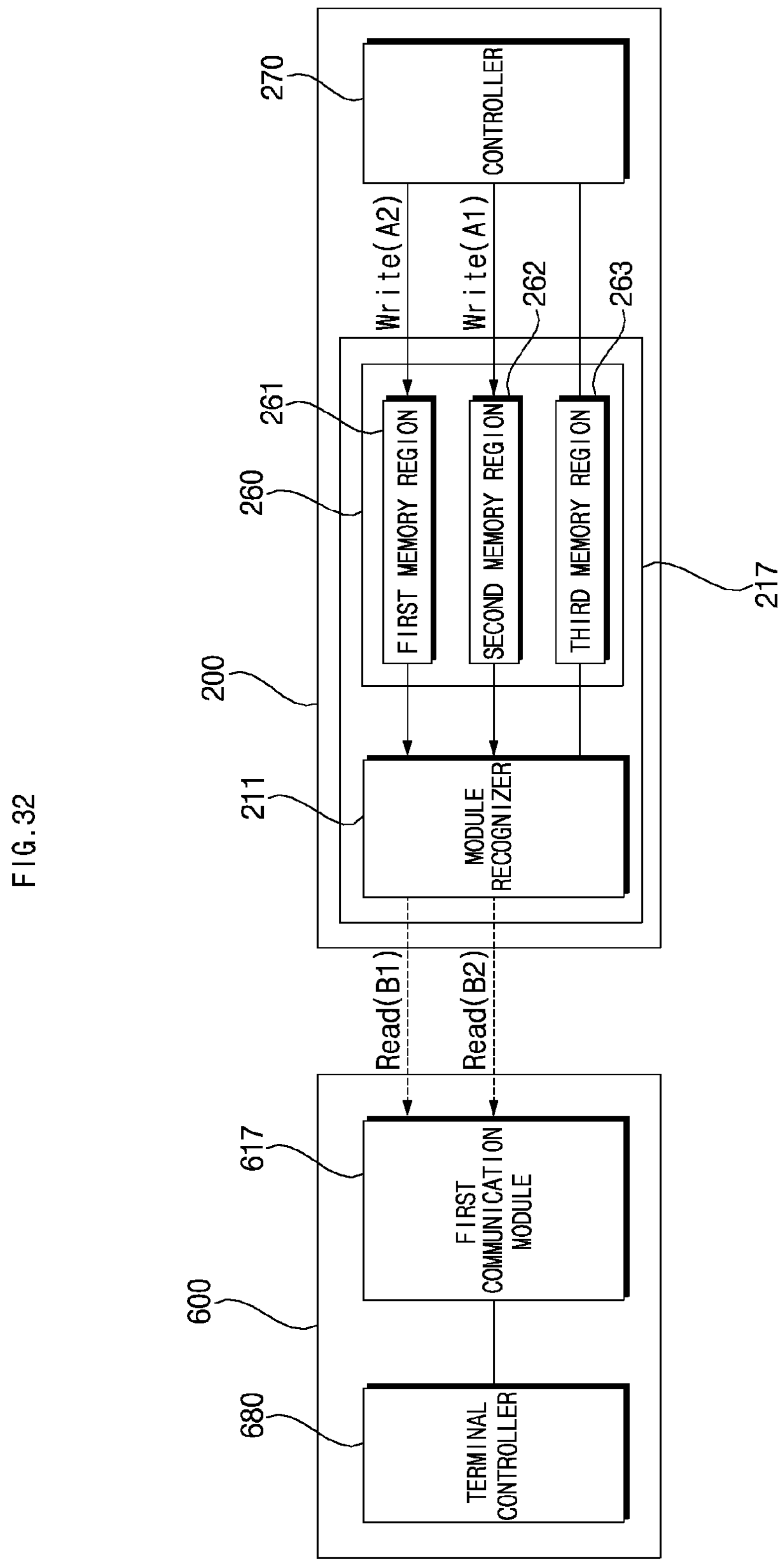
FIG. 32 is a block diagram showing a state in which internal information of a home appliance according to another embodiment of the present invention is transmitted to a terminal.

FIG. 32 is a block diagram showing a state in which internal information of a home appliance according to another embodiment of the present invention is transmitted to a terminal.

First, referring to FIG. 32, the first communication module 617 and the second communication module 217 may perform an NFC function, may have the same configuration, and may be NFC modules, for example.

A second interface 320 may be defined between the second communication module 217 and the controller 270 as another communication method. For example, an inter-integrated circuit (I2C) method is included in the second interface 320.

The second communication module 217 may include the module recognizer 211 for recognizing approach of the first communication module 617 if the first communication module 617 approaches the second communication module 217 within a predetermined distance. For example, the module recognizer 211 may be an antenna.

The second communication module 217 further includes a memory 260 for storing information about the home appliance 200. The memory 260 includes a plurality of memory regions 261, 262 and 263 for storing different information.

The plurality of memory regions 261, 262 and 263 includes a first memory region 261 for storing unique information of the home appliance and communication information or mount information, a second memory 262 for storing internally generated information of the home appliance 200 and a third memory region 263 for storing externally received information as information related to operation of the home appliance 200.

In the first memory region 261, unique information of the home appliance, e.g., type information (a washing machine, a cooker, a refrigerator, etc.) of the home appliance, information about a model name of the home appliance, a unique ID (ID may be changed even in the same model name) of the home appliance, and information about a program (operation course software) necessary to drive the home appliance.

The communication information includes information about the first interface 310 or the second interface 320. The mount information may include information about a country or a region in which the home appliance 200 is mounted.

The second memory region 262 may store information generated in the process of driving the home appliance 200, e.g., information about errors or information about an error diagnosis result when errors occur while driving the home appliance 200.

If errors occur in the home appliance 200, the controller 270 may write the information about errors or the information about the error diagnosis result in the second memory region 262 at a predetermined time. Accordingly, the second memory region 262 may be understood as a memory region in which data can be written by the controller 270.

If the controller 270 performs writing, the terminal 600 may read the information stored in the second memory region 262.

The predetermined time may be any one of when errors occur in the home appliance, when an operation course is completed if errors occur in a process of, at the home appliance 200, performing the operation course, and when the home appliance 200 is powered off.

For example, if errors occur in the home appliance 200 and the predetermined time is reached, error occurrence information may be displayed on the display 206 of the home appliance 200. If the error occurrence information is displayed on the display 206, information about errors of the home appliance 200 may be confirmed using the terminal 600.

More specifically, if the mobile terminal 600 approaches the home appliance 200 such that the module recognizer 211 recognizes the first communication module 617, the internally generated information (error occurrence information) may be transmitted from the second memory region 262 to the terminal 600. That is, the terminal 600 may read the internally generated information stored in the second memory region 262.

If the information about errors is stored in the second memory region 262, the information about errors may be transmitted to the terminal 600 such that the terminal 600 performs error diagnosis.

In contrast, if the information about the error diagnosis result is stored in the second memory region 262, the controller 270 may perform error diagnosis and store the diagnosis result in the second memory region 262.

In addition, the second memory region 262 may store information about power consumption while driving the home appliance 200. The terminal 600 may approach the home appliance 200 within the predetermined distance to read information about power.

The third memory region 263 may store externally generated information transmitted from the terminal 600.

The externally generated information includes information about the operation course of the home appliance 200. For example, if the home appliance 200 is a washing machine, the externally generated information may be washing course information of the washing machine. If the home appliance 200 is a cooker, the externally generated information may be cook data of the cooker.

The home appliance 200 operates using the driving unit 260 according to a predetermined course and the home appliance may store one or more operation courses. The operation course may be updated via the terminal 600.

More specifically, the terminal 600 may store information about the operation course of the home appliance 200 or update information, that is, externally generated information. For example, the terminal 600 may be connected to a predetermined server (not shown) and may download and store information stored in the server.

If the terminal 600 approaches the home appliance 200 within the predetermined distance, the module recognizer 211 recognizes the first communication module 617 and the information stored in the terminal 600 may be stored in the third memory region 263. That is, the terminal 600 may write the information in the third memory region 263.

The controller 270 may read the externally generated information stored in the third memory region 263. The read information may be stored in a main memory (not shown) of the home appliance 200. As a result, the third memory region 263 may be understood as a memory region from which data may be read by the controller 270.

The externally generated information (operation course information) transmitted from the terminal 600 to the home appliance 200 may be applied to operation of the home appliance as update information of the home appliance 200.

The internally generated information stored in the second memory region 262 or the externally generated information stored in the third memory region 263 may be overwritten with new information.

That is, since the internally generated information or the externally generated information is continuously generated with the elapse of time, if new information generated, existing information may be deleted and the new information may be stored in the second memory region 262 or the third memory region 263.

FIG. 32 shows a control method for transmitting internally generated information of the home appliance 200 to the terminal 600.

First, if predetermined information is internally generated in the home appliance, the controller 270 writes the internally generated information in the second memory region 262. The internally generated information may include error information of the home appliance or power consumption information of the home appliance. A transmission or reception mode of data generated in this process may be referred to as "first transmission/reception mode"

For example, if the internally generated information is error information of the home appliance, when the operation course of the home appliance is completed immediately after when errors occur or when the home appliance is powered off, the controller 270 checks whether the second communication module 217 is in an NFC writing mode.

If the second communication module 217 is in the NFC writing mode, the error information may be written in the second memory region 262.

At this time, the controller 270 writes verification information along with the error information. The controller 270 reads the verification information from the second memory region 262 again after writing to complete writing (Write (A1)).

The controller 270 may check unique information of the home appliance 200, communication information or mount information (hereinafter, referred to as unique information) and update the first memory region 261. At this time, if information to be changed or updated is present, the controller 270 may write change or update information in the first memory region 261 (Write (A2)).

If the terminal 600 approaches the home appliance 200 within the predetermined distance in a state of executing an application and a specific data transmission/reception mode, the terminal 600 reads the unique information of the home appliance, the communication information or the mount information. In this process, the terminal 600 checks whether the home appliance 200 can perform communication (Read (B1)).

The terminal 600 may read the error information. At this time, the terminal 600 may also read the verification information (Read (B2)).

Since the internally generated information of the home appliance is confirmed or diagnosed using the terminal, it is possible to increase user convenience.

Figure 33:
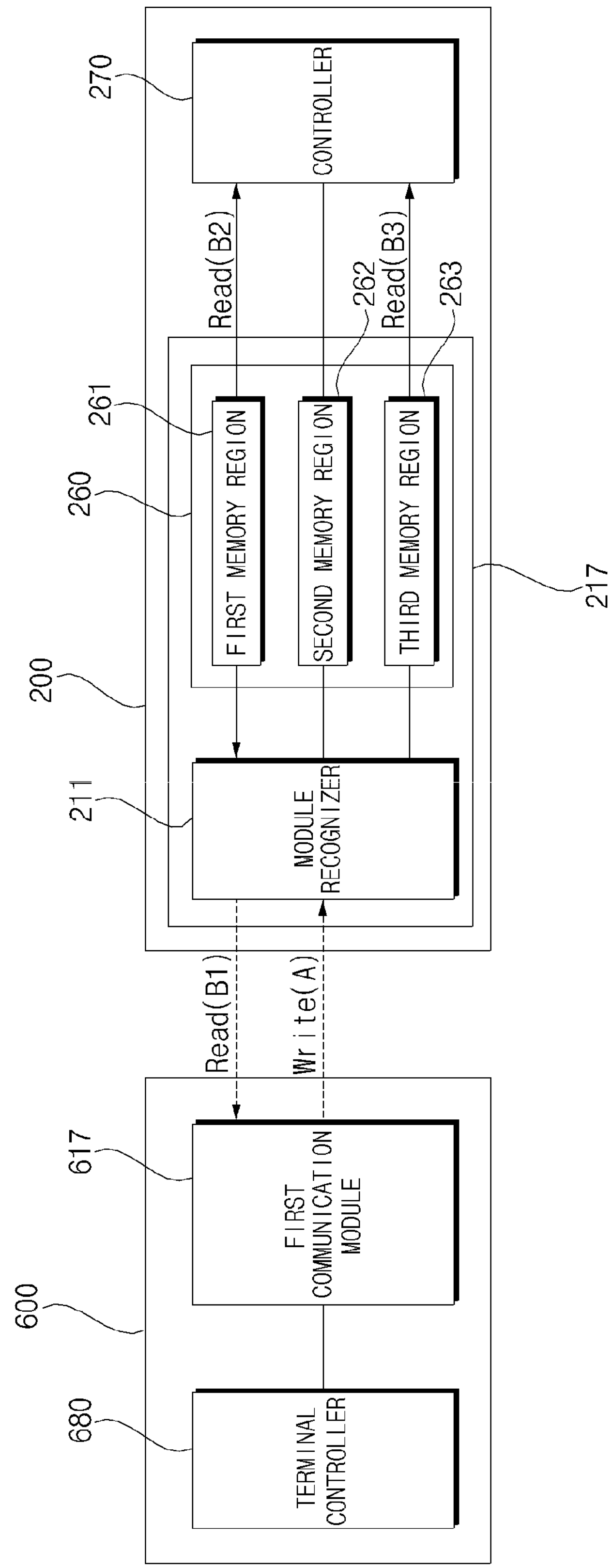
FIG. 33 is a block diagram showing a state in which external information is transmitted to a home appliance according to another embodiment of the present invention.

FIG. 33 is a block diagram showing a state in which external information is transmitted to a home appliance according to another embodiment of the present invention. FIG. 33 shows a control method for transmitting the externally generated information of the home appliance 200 from the terminal 600 to the home appliance 200.

The terminal 600 may write the externally generated information in the home appliance 200. For example, the externally generated information includes information about the operation course necessary to operate the home appliance. More specifically, if the home appliance 200 is a washing machine, the externally generated information is washing course information and, if the home appliance 200 is a cooker, the externally generated information may be cook course information.

A transmission or reception mode of data generated in this process may be referred to as "second transmission/reception mode".

First, if the terminal 600 approaches the home appliance 200 within the predetermined distance in a state of executing an application and a specific transmission/reception mode, the terminal 600 reads unique information of the home appliance 200, communication information or mount information. In this process, the terminal 600 checks whether the home appliance 200 can communication (Read (B1)).

Then, the terminal 600 writes the externally generated information in the third memory region 262 along with verification information. The terminal 600 reads the verification information from the third memory region 263 again after writing to complete writing (Write (A)).

The controller 270 checks whether the second communication module 218 is in an NFC reading mode. If the second communication module 217 is in the NFC reading mode, the controller 270 reads the unique information of the home appliance stored in the first memory region 261 and checks a communication state (Read (B2)).

Then, the controller 270 reads the externally generated information stored in the third memory region 263 along with the verification information to compete reading (Read (B3)). The read externally generated information may be applied as information necessary for operation of the home appliance.

Since the home appliance may receive predetermined information from the terminal and update information about a course necessary to operate the home appliance, it is possible to use a smart home appliance.

Hereinafter, other embodiments of the present invention will be described. Since the present embodiments are different from the previous embodiments in some configurations, a difference therebetween will be focused upon. For the same configuration, refer to description of the previous embodiments and drawings thereof.

Figure 34:
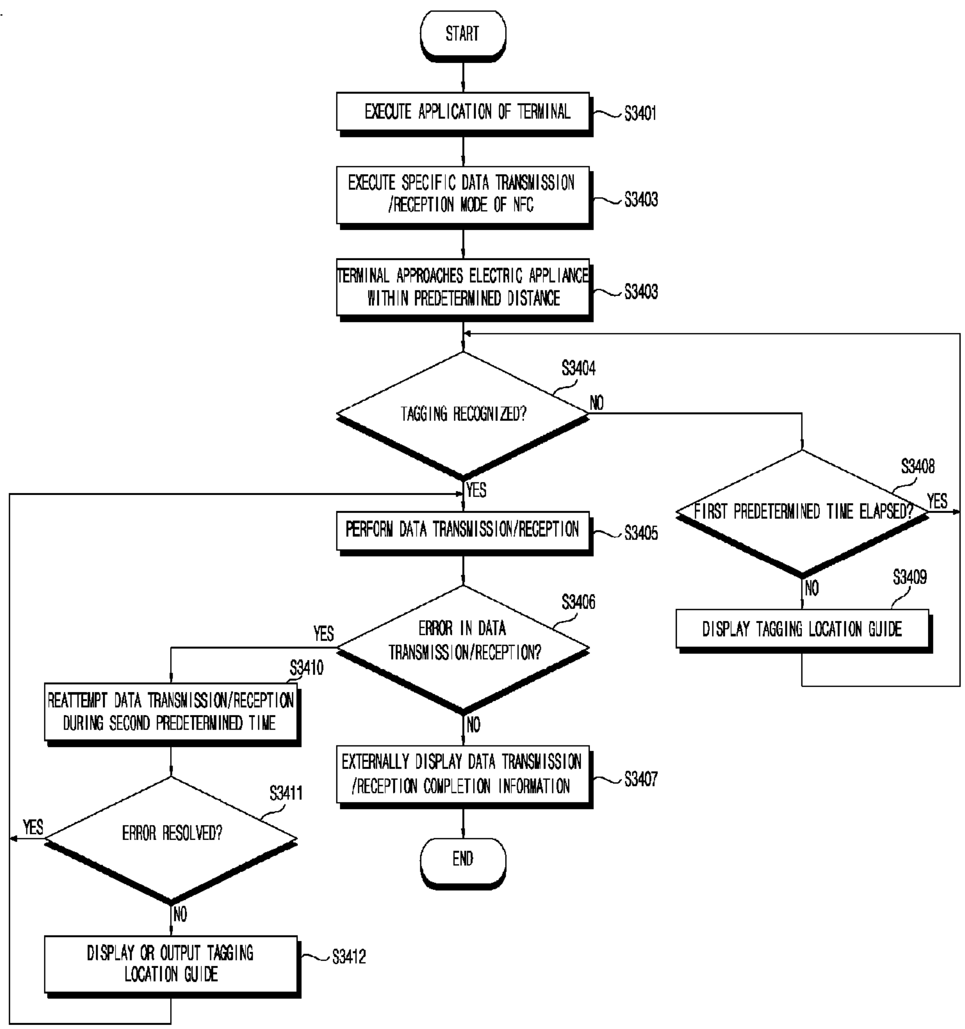
FIG. 34 is a flowchart showing a method for controlling a home appliance according to another embodiment of the present invention.

FIG. 34 is a flowchart showing a method for controlling a home appliance according to another embodiment of the present invention. Referring to FIG. 34, a control method when errors occur in a process of tagging the terminal to the home appliance will be described.

First, in a state in which an NFC mode among a plurality of communication modes included in the terminal is ON, an application of the terminal 600 may be executed.

If the application is executed, the terminal 600 may receive internally generated information of the home appliance 200 or transmit information (externally generated information) necessary to operate the home appliance 200 to the home appliance 200 (S3401).

Then, if the application is executed, a specific data transmission/reception mode may be executed. For the specific data transmission/reception mode, refer to description of FIG. 31 (S3402).

The terminal 600 approaches the home appliance 200 within the predetermined distance in a state of executing the specific data transmission/reception mode such that the terminal 600 is tagged to the home appliance 200 (S3403).

If tagging of the terminal 600 is recognized, data transmission or reception is performed according to the specific data transmission/reception mode (S3404 and S3405).

In a process of performing tagging of the terminal 600 to perform data transmission or reception, a determination as to whether errors occur is made (S3406). Here, "errors" indicate that the first communication module 617 and the second communication module 217 are in an incommunicable state or a communication restriction state, for example, that the terminal 600 is separated from the home appliance 200 at greater than the predetermined distance.

If errors do not occur, data transmission or reception is continuously performed. If data transmission/reception is completed, completion information may be externally displayed. For example, the completion information may be displayed on the display of the terminal 600 or the home appliance 200 (S3406 and S3407).

In contrast, if tagging of the terminal 600 is not recognized in step S3404, a determination as to whether a first predetermined time has elapsed is made. The first predetermined time may be about 10 seconds, for example. That is, the determination as to whether tagging is recognized is made during the first predetermined time after executing the specific data transmission/reception mode (S3408).

If the first predetermined time has elapsed, a message for guiding a tagging location may be displayed on the display of the terminal 600 or the home appliance 200 or may be output as audio. For example, a message "Please place the terminal at an accurate location" may be displayed or output as audio (S3409).

If errors occur in data transmission/reception in step S3406, data transmission/reception is reattempted during a second predetermined time. Here, the second predetermined time may be about 3 seconds, for example (S3410).

A determination as to whether errors have been resolved is made after the second predetermined time. If errors have been resolved, the step S3405 and subsequent steps thereof are performed. If errors have not been resolved, the message for guiding the tagging location may be displayed on the display of the terminal 600 or the home appliance 200 or may be output as audio (S3412).

If errors occur in the process of tagging the terminal 600 to the home appliance 200 or in a data transmission/reception process after tagging recognition, error occurrence may be externally displayed to guide the tagging location to the user. Thus, it is possible to easily perform data transmission or reception according to the specific data transmission/reception mode.

According to an embodiment of the present invention, a mobile terminal may transmit information related to a displayed screen to a home appliance via NFC. Accordingly, it is possible to conveniently transmit information desired by a user to the home appliance. Thus, it is possible to increase user convenience.

According to an embodiment of the present invention, a home appliance may receive information related to a screen displayed on a mobile terminal via NFC and operate according to the received information. Accordingly, a user can conveniently operate the home appliance.

According to another embodiment of the present invention, a mobile terminal may receive information related to a displayed screen from a home appliance via NFC. Accordingly, it is possible to conveniently receive information desired by a user from the home appliance. Thus, it is possible to increase user convenience.

According to another embodiment of the present invention, a home appliance may store information related to the home appliance during operation and transmit the stored information to a mobile terminal via NFC. Accordingly, it is possible to conveniently transmit information desired by a user.

According to another embodiment of the present invention, a mobile terminal transmits information related to a screen to a home appliance via NFC if tagging to the home appliance is performed in a state in which a security level of data related to the screen is a first level and transmits the information related to the screen and security information to the home appliance via NFC if tagging to the home appliance is performed in a state in which a security level of data related to the screen is a second level. Accordingly, it is possible to selectively transmit information between the home appliance and the mobile terminal.

The mobile terminal transmits security information to the home appliance via NFC based on tagging to the home appliance, transmits the information related to the screen in response to authentication information reception if authentication information corresponding to the security information is received from the home appliance, and does not transmit the information related to the screen if authentication information corresponding to the security information is not received from the home appliance. Accordingly, it is possible to selectively transmit the information related to the screen according to authentication information reception.

The mobile terminal transmits the information related to the screen, the security information and user information to the home appliance via NFC if tagging to the home appliance is performed in a state in which the security level of the data related to the screen is a third level. Accordingly, it is possible to selectively transmit information between the home appliance and the mobile terminal.

According to another embodiment of the present invention, a home appliance receives security information from a mobile terminal via NFC based on tagging of the mobile terminal, transmits authentication information to the mobile terminal in response to the security information, and receives, from the mobile terminal, information related to the screen displayed on the mobile terminal. Accordingly, it is possible to receive the information related to the screen from the mobile terminal.

Since the home appliance and the mobile terminal can perform communication via NFC, a separate configuration for communication is not necessary and thus communication environment setting costs can be reduced.

Since a memory including memory regions for storing internally generated information of the home appliance and eternally generated information of the home appliance is provided to the NFC module, it is possible to easily perform transmission and reception of specific data.

What is claimed is:

1. A mobile terminal comprising:

a display configured to display a predetermined screen;

a communication module configured to perform data communication with a server;

a near field communication (NFC) module configured to transmit or receive information related to the screen to or from a home appliance by tagging to the home appliance; and a controller configured to control display of the information received from the home appliance on the display, wherein the controller controls transmission of the information received from the home appliance to the server, wherein the case in which tagging between the mobile terminal and a washing machine is performed, in a state in which an application related to the washing machine is executed and an NFC diagnosis screen related to the washing machine is displayed, the NFC module receives failure information of the washing machine, and the communication module transmits the failure information to the server and receives failure result information from the server, and the display displays the failure result information and an AS request item for the washing machine, wherein the case in which tagging between the mobile terminal and a robot cleaner is performed, in a state in which an application related to the robot cleaner is executed and monitoring screen related to the robot cleaner is displayed, the NFC module receives operation state information of the robot cleaner, wherein the operation state information of the robot cleaner includes movement path information of the robot cleaner, a patrol stop item, a charging item, a cleaning item and a patrol item of the robot cleaner.

2. The mobile terminal according to claim 1, wherein the NFC module transmits the information related to the screen to the home appliance if the screen is a power information screen related to the home appliance, an operation course screen or operation course list screen related to the home appliance, a firmware screen related to the home appliance or an access point device list screen, or wherein the NFC module receives at least one of operation state information related to the home appliance, operation history information, product information, failure information, power consumption information, stored article information, or recipe information.

3. The mobile terminal according to claim 1, wherein the NFC module receives recipe information from the home appliance, wherein the communication module receives corresponding content from the server based on the received recipe information, and wherein the display displays the received content.

4. The mobile terminal according to claim 1, wherein the NFC module transmits the information related to the screen to the home appliance if tagging to the home appliance is performed in a state in which a security level of data related to the screen is a first level and transmits the information related to the screen and security information to the home appliance if tagging to the home appliance is performed in a state in which the security level of the data related to the screen is a second level.

5. The mobile terminal according to claim 4, wherein the NFC module transmits the security information to the home appliance if tagging to the home appliance is performed in a state in which the security level of the data related to the screen is a second level and transmits the information related to the screen to the home appliance if authentication information corresponding to the security information is received from the home appliance.

6. The mobile terminal according to claim 1, wherein the NFC module receives the information related to the screen from the home appliance if the displayed screen is an information transmission request related screen and tagging to the home appliance is performed in a state in which a security level of data related to the screen is a first level and receives the information related to the screen and security information from the home appliance if the displayed screen is an information transmission request related screen and tagging to the home appliance is performed in a state in which the security level of the data related to the screen is a second level.

7. The mobile terminal according to claim 1, wherein the NFC module receives product information from the home appliance by tagging to the home appliance, wherein the controller is configured to determine whether a product is capable of performing NFC based on the received product information, and, if not, to control to output a service unavailability message regarding the home appliance.

8. The mobile terminal according to claim 1, wherein the NFC module includes an NFC memory, an NFC controller and an antenna, wherein if the information received from the home appliance is written in the NFC memory of the NFC module of the mobile terminal, the NFC controller of the mobile terminal informs the controller of the mobile terminal that the information received from the home appliance has been received by changing value of a reception flag, and wherein the controller of the mobile terminal reads the information received from the home appliance written in the NFC memory based on the changed value of reception flag.

9. The mobile terminal according to claim 1, wherein when an NFC item on the display is selected, the controller is configured to transmit error check data along with information related to the selected NFC item through the NFC module of the mobile terminal to the home appliance, wherein the controller is configured to receive error check response data corresponding to the error check data through the NFC module of the mobile terminal from the home appliance, and check whether writing the information related to the selected NFC to the home appliance is successfully performed based on error check response data, and wherein if the writing is successful, the controller is configured to output a writing success message.

10. A home appliance comprising:

a driving unit;

a near field communication (NFC) module configured to transmit stored information to a mobile terminal or receive information related to a screen displayed on the mobile terminal, if the mobile terminal is tagged; and a controller configured to control the driving unit according to the received information, wherein the case in which the home appliance is a robot cleaner, and tagging between the mobile terminal and the robot cleaner is performed, in a state in which an application related to the robot cleaner is executed in the mobile terminal and monitoring screen related to the robot cleaner is displayed on a display of the mobile terminal, the NFC module transmits operation state information of the robot cleaner to the mobile terminal, wherein the operation state information of the robot cleaner includes movement path information of the robot cleaner, a patrol stop item, a charging item, a cleaning item and a patrol item of the robot cleaner.

11. The home appliance according to claim 10, wherein the NFC module includes a memory for storing information related to the home appliance if the home appliance is operating.

12. The home appliance according to claim 10, wherein the stored information includes operation state information related to the home appliance, operation history information, product information, failure information, power consumption information, stored article information or recipe information.

13. The home appliance according to claim 10, wherein the NFC module receives at least one of power information related to the home appliance, recipe information, operation course information or operation course list information related to the home appliance, firmware information related to the home appliance and network information of an access point device.

14. The home appliance according to claim 13, wherein the controller performs power-saving operation of the home appliance based on the power information.

15. The home appliance according to claim 13, wherein the controller controls access to the access point device using the network information.

16. The home appliance according to claim 13, wherein the NFC module receives security information from the mobile terminal based on tagging if the mobile terminal is tagged, transmits authentication information to the mobile terminal in response to the security information, and receives, from the mobile terminal, the information related to the screen displayed on the mobile terminal.

17. The home appliance according to claim 13, wherein the NFC module receives a request for transmission of the information related to the displayed screen from the mobile terminal based on tagging if the mobile terminal is tagged, transmits the information related to the screen to the mobile terminal if a security level of the information related to the screen is a first level, transmits the information related to the screen and security information to the mobile terminal if the security level of the information related to the screen is a second level.

18. The home appliance according to claim 17, wherein the NFC module transmits the security information to the mobile terminal if the security level of the information related to the screen is the second level and transmits the information related to the screen to the mobile terminal in response to authentication information reception if authentication information corresponding to the security information is received from the mobile terminal.

19. The home appliance according to claim 17, wherein the NFC module includes a memory, wherein the memory includes:

a first memory region including information about the home appliance;

a second memory region for storing internally generated information of the home appliance related to operation of the home appliance; and a third memory region for storing externally generated information transmitted from the terminal in association with operation of the home appliance, and wherein the second memory region is a writable memory region and the third memory region is a readable memory region.

20. The home appliance according to claim 19, wherein the information about the home appliance includes unique information of the home appliance, communication information or mount information, and wherein the internally generated information of the home appliance includes information about operation errors of the home appliance and power consumption information of the home appliance.

21. The home appliance according to claim 10, wherein the NFC module includes an NFC memory, an NFC controller and an antenna, wherein if the information received from mobile terminal is written in the NFC memory of the NFC module of the home appliance, the NFC controller of home appliance informs the controller of the home appliance that the information received from the home appliance has been received by changing value of a written flag, and wherein the controller of the home appliance reads the information received from mobile terminal written in the NFC memory based on the changed value of written flag.

22. The home appliance according to claim 10, wherein when an NFC item displayed on a display of the display is selected, the controller is configured to receive error check data along with information related to the selected NFC item through the NFC module of the home appliance from the mobile terminal, and wherein the controller is configured to transmit error check response data corresponding to the error check data through the NFC module of the home appliance to the mobile terminal, if writing the information related to the selected NFC to the home appliance is successfully performed.

* * * * *